(12) United States Patent
Cross et al.

(10) Patent No.: US 10,455,894 B2
(45) Date of Patent: Oct. 29, 2019

(54) AUXETIC STRUCTURES AND FOOTWEAR WITH SOLES HAVING AUXETIC STRUCTURES

(71) Applicant: NIKE, Inc., Beaverton, OR (US)

(72) Inventors: Tory M. Cross, Portland, OR (US); Kevin W. Hoffer, Portland, OR (US); David P. Jones, Beaverton, OR (US); Patrick B. Kirschner, Beaverton, OR (US); Elizabeth Langvin, Sherwood, OR (US); James C. Meschter, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 481 days.

(21) Appl. No.: 15/389,844

(22) Filed: Dec. 23, 2016

(65) Prior Publication Data
US 2017/0105478 A1 Apr. 20, 2017

Related U.S. Application Data

(60) Division of application No. 14/643,427, filed on Mar. 10, 2015, now Pat. No. 9,549,590, which is a
(Continued)

(51) Int. Cl.
*B29D 35/12* (2010.01)
*A43B 13/14* (2006.01)
(Continued)

(52) U.S. Cl.
CPC .......... *A43B 13/141* (2013.01); *A43B 1/0009* (2013.01); *A43B 3/0073* (2013.01);
(Continued)

(58) Field of Classification Search
CPC .................................................... B29D 35/122
See application file for complete search history.

(56) References Cited

U.S. PATENT DOCUMENTS 6,000,082 A * 12/1999 Nguyen .................. A43B 7/28
12/142 N
2009/0151195 A1* 6/2009 Forstrom ............... A43B 13/20
36/29
(Continued)

FOREIGN PATENT DOCUMENTS

WO 2014152367 A1 9/2014

*Primary Examiner* — Matthew J Daniels
*Assistant Examiner* — Patrick Butler
(74) *Attorney, Agent, or Firm* — Quinn IP Law

(57) ABSTRACT

A method of customizing the sole structure of an article of footwear includes providing a sole structure with a sole component having an inner surface and an opposite-facing outer surface. The sole component includes a plurality of inner recesses extending from the inner surface and a plurality of outer recesses extending from the outer surface, the plurality of inner recesses include a blind-hole inner recess, the plurality of outer recesses include a blind-hole outer recess, and the blind-hole inner recess is generally aligned with the blind hole outer recess along a vertical direction. The plurality of inner recesses and the plurality of outer recesses provide the sole component with an auxetic structure. The method further includes adjusting the flexibility of the sole component by selectively cutting or removing material from one or both of the blind-hole inner recess and the blind-hole outer recess.

12 Claims, 54 Drawing Sheets

Related U.S. Application Data continuation-in-part of application No. 14/030,002, filed on Sep. 18, 2013, now Pat. No. 9,402,439.

(51) Int. Cl.
| | |
|---|---|
| *A43B 13/18* | (2006.01) |
| *A43B 13/04* | (2006.01) |
| *A43B 1/00* | (2006.01) |
| *A43B 3/00* | (2006.01) |
| *A43B 5/00* | (2006.01) |
| *A43B 13/02* | (2006.01) |
| *A43B 13/12* | (2006.01) |
| *B29C 44/34* | (2006.01) |
| *A43B 5/06* | (2006.01) |
| *A43B 5/10* | (2006.01) |
| *B29D 35/00* | (2010.01) |
| *B29L 31/50* | (2006.01) |

(52) U.S. Cl.
CPC .................. *A43B 5/00* (2013.01); *A43B 5/06* (2013.01); *A43B 5/10* (2013.01); *A43B 13/02* (2013.01); *A43B 13/04* (2013.01); *A43B 13/122* (2013.01); *A43B 13/14* (2013.01); *A43B 13/181* (2013.01); *A43B 13/186* (2013.01); *A43B 13/187* (2013.01); *A43B 13/188* (2013.01); *B29C 44/357* (2013.01); *B29D 35/0063* (2013.01); *B29D 35/122* (2013.01)

(56) References Cited

U.S. PATENT DOCUMENTS

| | | | | |
|---|---|---|---|---|
| 2009/0178301 | A1* | 7/2009 | Dojan | A43B 13/20 36/29 |
| 2012/0021167 | A1* | 1/2012 | Plant | A41D 13/0156 428/116 |
| 2012/0096745 | A1* | 4/2012 | Donato | A43B 7/1425 36/174 |

* cited by examiner

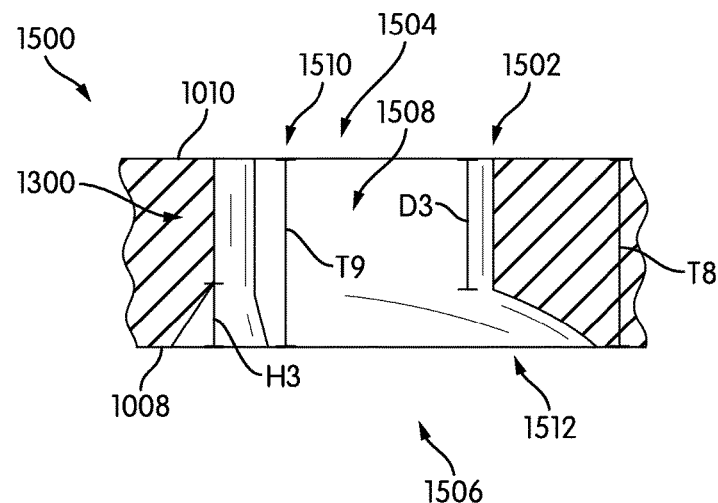
FIG. 54
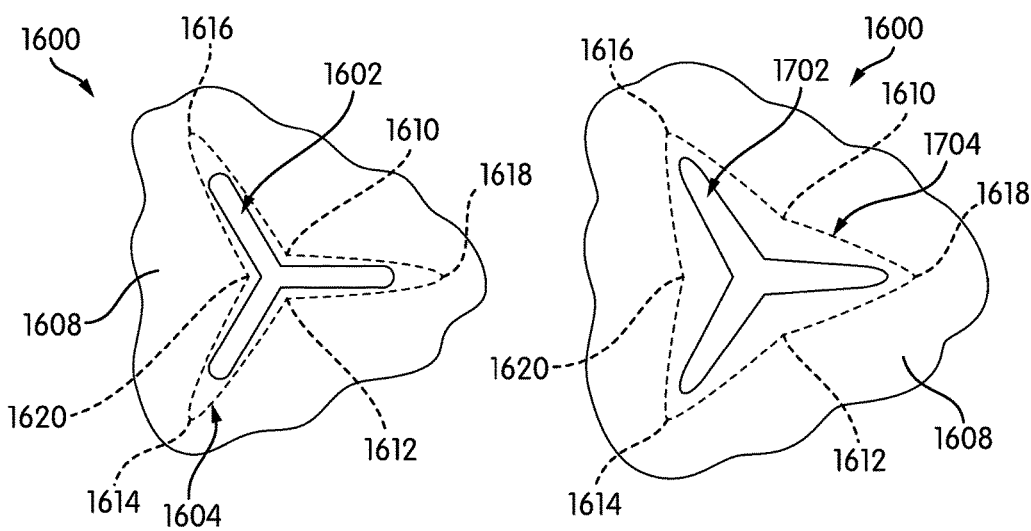
FIG. 55  FIG. 56

AUXETIC STRUCTURES AND FOOTWEAR WITH SOLES HAVING AUXETIC STRUCTURES

CROSS-REFERENCE TO RELATED APPLICATION(S)

This application is a Divisional of U.S. patent application Ser. No. 14/643,427, filed 10 Mar. 2015 and published as U.S. Patent Publication No. 2015/0245685, which is a Continuation-in-Part of U.S. patent application Ser. No. 14/030,002, filed on 18 Sep. 2013 and issued as U.S. Pat. No. 9,402,439. The disclosure of both applications is hereby incorporated by reference in their entirety.

BACKGROUND

Articles of footwear typically have at least two major components, an upper that provides the enclosure for receiving the wearer's foot, and a sole secured to the upper that is the primary contact to the ground or playing surface. The footwear may also use some type of fastening system, for example, laces or straps or a combination of both, to secure the footwear around the wearer's foot. The sole may comprise three layers—an inner sole, a midsole and an outer sole. The outer sole is the primary contact to the ground or the playing surface. The outer sole generally carries a tread pattern and/or cleats or spikes or other protuberances that provide the wearer of the footwear with improved traction suitable to the particular athletic, work or recreational activity, or to a particular ground surface.

SUMMARY

In one aspect, the present disclosure is directed to an article of footwear with an upper and a sole structure. The sole structure can include a sole component that may at least partially comprise an auxetic structure. The sole component includes a plurality of inner recesses on an inner surface of the sole component where the plurality of inner recesses includes at least a first inner recess. The sole component also includes a plurality of outer recesses on an outer surface of the sole component, where the plurality of outer recesses includes at least a first outer recess. The plurality of inner recesses and the plurality of outer recesses are arranged to provide the sole component with the auxetic structure.

In another aspect, the present disclosure is directed to a method of making a sole component for an article of footwear. The method includes selecting a first mold, where the first mold includes one or more first projections for forming apertures associated with a first depth. The method also includes selecting a second mold, where the second mold includes one or more second projections for forming apertures with a second depth. The method further includes associating the first projections of the first mold with a first side of the sole component, where the heights of the first projections are less than a thickness of the portion of the sole component they are associated with. The method additionally includes forming a first pattern of apertures on the first side of the sole component, and associating the second projections of the second mold with a second side of the sole component, where the height of the second projections are less than the thickness of the portion of the sole component they are associated with. The method also includes forming a second pattern of apertures on the second side of the sole component, removing the first mold from the sole component, and removing the second mold from the sole component, where the first pattern and the second pattern provide the sole component with one or more auxetic portions.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 54 is a cross-sectional view of a portion of an embodiment of an outsole with a through-hole aperture;

FIG. 55 is a top down view of an embodiment of a portion of an outsole;

FIG. 56 is a bottom up view of an embodiment of a portion of an outsole;

DETAILED DESCRIPTION

For clarity, the detailed descriptions herein describe certain exemplary embodiments, but the disclosure herein may be applied to any article of footwear comprising certain of the features described herein and recited in the claims. In particular, although the following detailed description discusses exemplary embodiments, in the form of footwear such as running shoes, jogging shoes, tennis, squash or racquetball shoes, basketball shoes, sandals and flippers, the disclosures herein may be applied to a wide range of footwear.

For consistency and convenience, directional adjectives are employed throughout this detailed description corresponding to the illustrated embodiments. The term "longitudinal direction" as used throughout this detailed description and in the claims refers to a direction extending a length (or longest dimension) of an article of footwear such as a sports or recreational shoe. Also, the term "lateral direction" as used throughout this detailed description and in the claims refers to a direction extending along a width of an article of footwear. The lateral direction may generally be perpendicular to the longitudinal direction. The term "vertical direction" as used with respect to an article of footwear throughout this detailed description and in the claims refers to the direction that is normal to the plane of the sole of the article of footwear.

The term "sole structure", also referred to simply as "sole", herein shall refer to any combination that provides support for a wearer's foot and bears the surface that is in direct contact with the ground or playing surface, such as a single sole; a combination of an outsole and an inner sole; a combination of an outsole, a midsole and an inner sole, and a combination of an outer covering, an outsole, a midsole and an inner sole.

Figure 1:
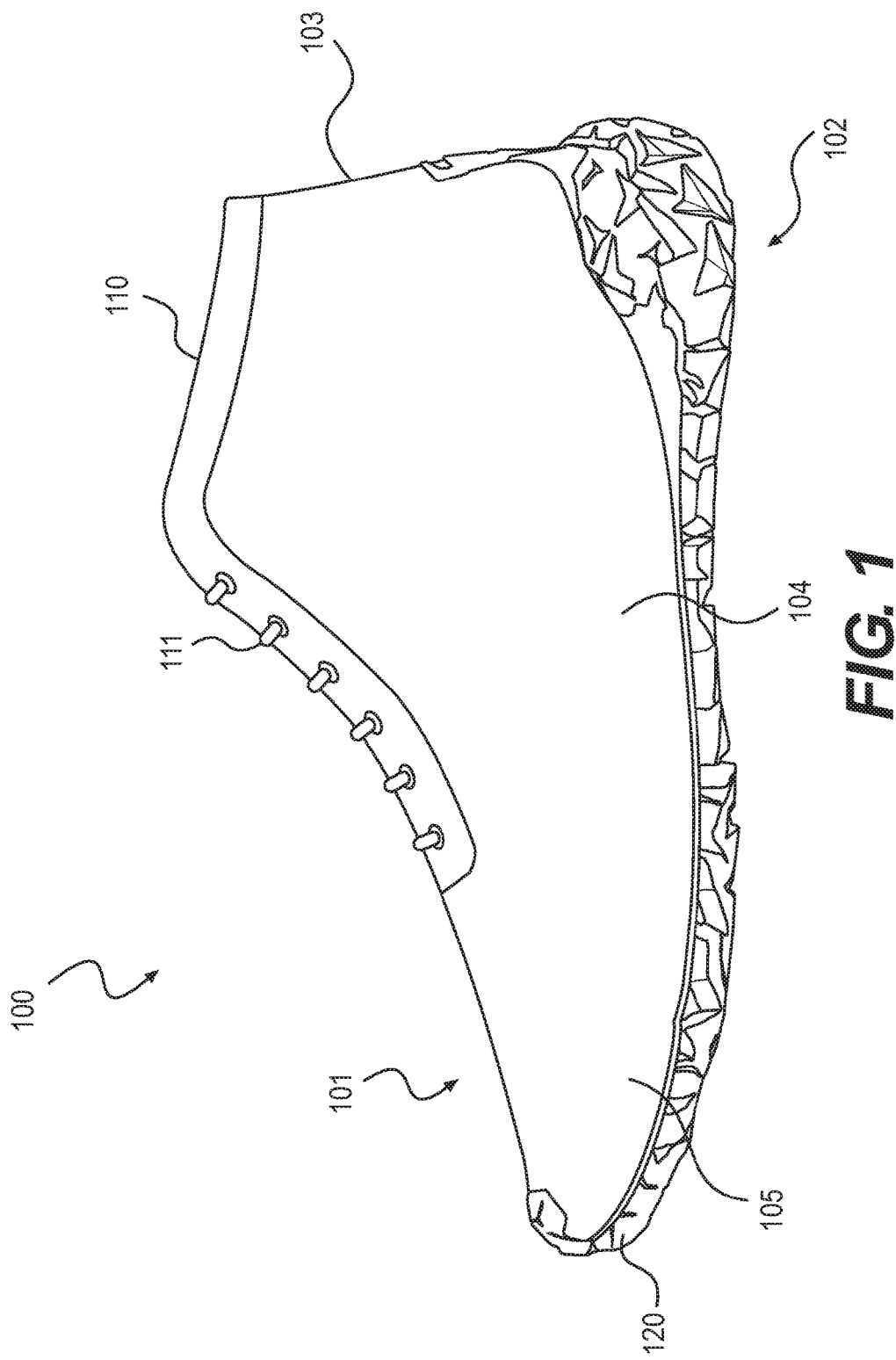
FIG. 1 is a schematic diagram of a side view of an embodiment of an article of footwear with an example of a sole with an auxetic structure.

FIG. 1 is a side perspective view of an embodiment of an article of footwear 100. Article of footwear 100 may include upper 101 and sole structure 102, also referred to hereafter simply as sole 102. Upper 101 has a heel region 103, an instep or midfoot region 104 and a forefoot region 105. Upper 101 may include an opening or throat 110 that allows the wearer to insert his or her foot into the footwear. In some embodiments, upper 101 may also include laces 111, which can be used to tighten or otherwise adjust upper 101 around a foot.

In some embodiments, sole 102 includes at least an outsole 120 that may be the primary ground-contacting surface. In some embodiments, sole 102 may also have an inner sole, a midsole, or both an inner sole and a midsole. In some embodiments, outsole 120 may bear a tread pattern, or may have cleats, spikes or other ground-engaging protuberances.

Figure 2:
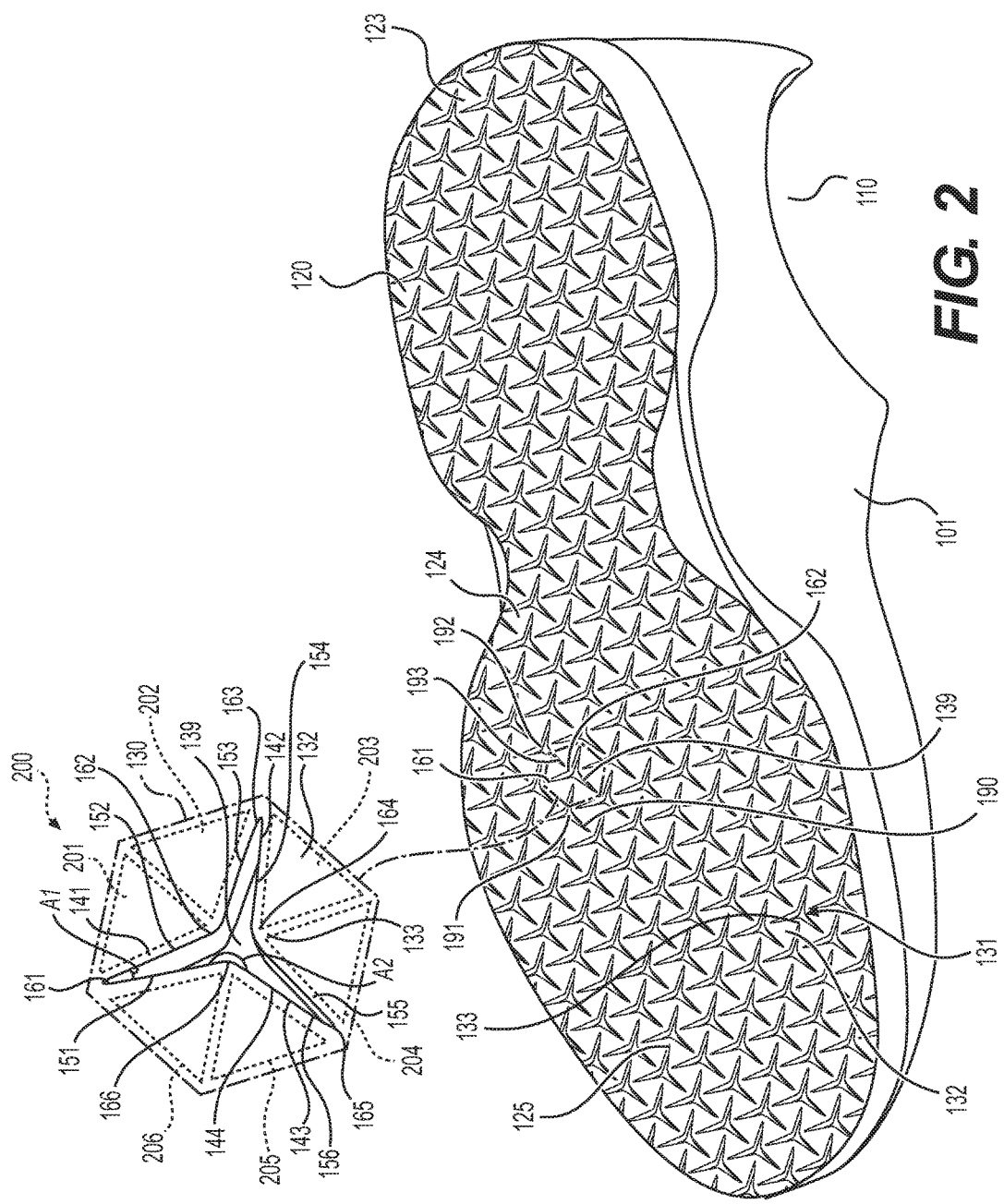
FIG. 2 is a schematic diagram of a bottom perspective view of an embodiment of the article of footwear shown in FIG. 1.

FIG. 2 is a bottom perspective view of an embodiment of an article of footwear. This figure shows the bottom of outsole 120. Outsole 120 has a heel region 123, an instep or midfoot region 124, and a forefoot region 125 as shown in FIG. 2. Outsole 120 has apertures surrounded by polygonal features that are joined to each other at their vertices. The joints at the vertices function as hinges, allowing the polygonal features to rotate as the sole is placed under tension. This action allows the portion of the sole under tension to expand both in the direction under tension and in the direction in the plane of the sole that is orthogonal to the direction under tension. Thus, these apertures and polygonal features form an auxetic structure for outsole 120, which is described in further detail below.

As shown in FIG. 2, outsole 120 comprises an approximately flat surface that includes a plurality of apertures 131, also referred to simply as apertures 131 hereafter. As an example, an enlarged view of first aperture 139 of apertures 131 is shown schematically within FIG. 2. First aperture 139 is further depicted as having a first portion 141, a second portion 142, and a third portion 143. Each of these portions is joined together at a central portion 144. Similarly, in some embodiments, each of the remaining apertures in apertures 131 may include three portions that are joined together, and extend outwardly from, a central portion.

Generally, each aperture in plurality of apertures 131 may have any kind of geometry. In some embodiments, an aperture may have a polygonal geometry, including a convex and/or concave polygonal geometry. In such cases, an aperture may be characterized as comprising a particular number of vertices and edges (or sides). In an exemplary embodiment, apertures 131 may be characterized as having six sides and six vertices. For example, aperture 139 is shown as having first side 151, second side 152, third side 153, fourth side 154, fifth side 155 and sixth side 156. Additionally, aperture 139 is shown as having a first vertex 161, second vertex 162, third vertex 163, fourth vertex 164, fifth vertex 165 and sixth vertex 166.

In one embodiment, the shape of aperture 139 (and correspondingly of one or more of apertures 131) may be characterized as a regular polygon, which is both cyclic and equilateral. In some embodiments, the geometry of aperture 139 can be characterized as triangles with sides that, instead of being straight, have an inwardly-pointing vertex at the midpoint of the side. The reentrant angle formed at these inwardly-pointing vertices can range from 180° (when the side is perfectly straight) to, for example, 120° or less.

Other geometries are also possible, including a variety of polygonal and/or curved geometries. Exemplary polygonal shapes that may be used with one or more of apertures 131 include, but are not limited to: regular polygonal shapes (e.g., triangular, rectangular, pentagonal, hexagonal, etc.) as well as irregular polygonal shapes or non-polygonal shapes. Other geometries could be described as being quadrilateral, pentagonal, hexagonal, heptagonal, octagonal or other polygonal shapes with reentrant sides.

In the exemplary embodiment, the vertices of an aperture (e.g., aperture 139) may correspond to interior angles that are less than 180 degrees or interior angles that are greater than 180 degrees. For example, with respect to aperture 139, first vertex 161, third vertex 163 and fifth vertex 165 may correspond to interior angles that are less than 180 degrees. In this particular example, each of first vertex 161, third vertex 163 and fifth vertex 165 has an interior angle A1 that is less than 180 degrees. In other words, aperture 139 may have a locally convex geometry at each of these vertices (relative to the outer side of aperture 139). In contrast, second vertex 162, fourth vertex 164 and sixth vertex 166 may correspond to interior angles that are greater than 180 degrees. In other words, aperture 139 may have a locally concave geometry at each of these vertices (relative to the outer side of aperture 139). In this particular example, each of second vertex 162, fourth vertex 164 and sixth vertex 166 may correspond to interior angles that are greater than 180 degrees.

Although the embodiments depict apertures having approximately polygonal geometries, including approximately point-like vertices at which adjoining sides or edges connect, in other embodiments some or all of an aperture could be non-polygonal. In particular, in some cases, the outer edges or sides of some or all of an aperture may not be joined at vertices, but may be continuously curved. Moreover, some embodiments can include apertures having a geometry that includes both straight edges connected via vertices as well as curved or non-linear edges without any points or vertices.

In some embodiments, apertures 131 may be arranged in a regular pattern on outsole 120. In some embodiments, apertures 131 may be arranged such that each vertex of an aperture is disposed near the vertex of another aperture (e.g., an adjacent or nearby aperture). More specifically, in some cases, apertures 131 may be arranged such that every vertex that has an interior angle less than 180 degrees is disposed near a vertex that has an interior angle greater than 180 degrees. As one example, first vertex 161 of aperture 139 is disposed near, or adjacent to, a vertex 191 of another aperture 190. Here, vertex 191 is seen to have an interior angle that is greater than 180 degrees, while first vertex 161 has an interior angle that is less than 180 degrees. Similarly, second vertex 162 of aperture 139 is disposed near, or adjacent to, a vertex 193 of another aperture 192. Here, vertex 193 is seen to have an interior angle that is less than 180 degrees, while second vertex 162 has an interior angle that is greater than 180 degrees.

The configuration resulting from the above arrangement may be seen to divide outsole 120 into smaller geometric portions, whose boundaries are defined by the edges of apertures 131. In some embodiments, these geometric portions may be comprised of polygonal portions. For example, in the exemplary embodiment, apertures 131 are arranged in a manner that defines a plurality of polygonal portions 200, also referred to hereafter simply as polygonal portions 200.

Generally, the geometry of polygonal portions 200 may be defined by the geometry of apertures 131 as well as their arrangement on outsole 120. In the exemplary configuration, apertures 131 are shaped and arranged to define a plurality of approximately triangular portions, with boundaries defined by edges of adjacent apertures. Of course, in other embodiments polygonal portions could have any other shape, including rectangular, pentagonal, hexagonal, as well as possibly other kinds of regular and irregular polygonal shapes. Furthermore, it will be understood that in other embodiments, apertures may be arranged on an outsole to define geometric portions that are not necessarily polygonal (e.g., comprised of approximately straight edges joined at vertices). The shapes of geometric portions in other embodiments could vary and could include various rounded, curved, contoured, wavy, nonlinear as well as any other kinds of shapes or shape characteristics.

As seen in FIG. 2, polygonal portions 200 may be arranged in regular geometric patterns around each aperture. For example, aperture 139 is seen to be associated with first polygonal portion 201, second polygonal portion 202, third polygonal portion 203, fourth polygonal portion 204, fifth polygonal portion 205 and sixth polygonal portion 206. Moreover, the approximately even arrangement of these polygonal portions around aperture 139 forms an approximately hexagonal shape that surrounds aperture 139.

In some embodiments, the various vertices of an aperture may function as a hinge. In particular, in some embodiments, adjacent portions of material, including one or more geometric portions (e.g., polygonal portions), may rotate about a hinge portion associated with a vertex of the aperture. As one example, each vertex of aperture 139 is associated with a corresponding hinge portion, which joins adjacent polygonal portions in a rotatable manner.

In the exemplary embodiment, aperture 139 includes hinge portion 210 (see FIG. 3), which is associated with vertex 161. Hinge portion 210 is comprised of a relatively small portion of material adjoining first polygonal portion 201 and sixth polygonal portion 206. As discussed in further detail below, first polygonal portion 201 and sixth polygonal portion 206 may rotate with respect to one another at hinge portion 210. In a similar manner, each of the remaining vertices of aperture 139 are associated with similar hinge portions that join adjacent polygonal portions in a rotatable manner.

Figure 3:
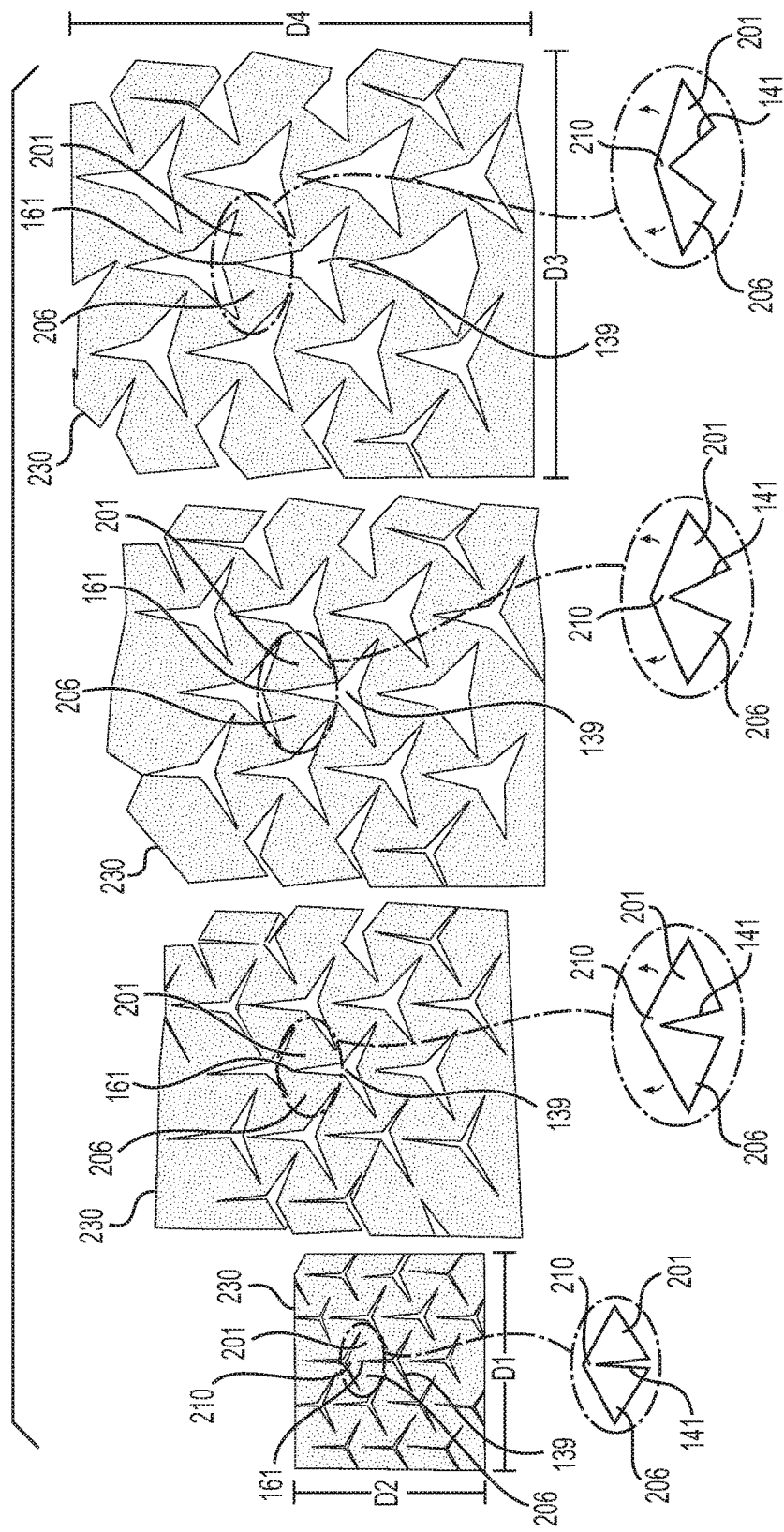
FIG. 3 shows a sequence of schematic diagrams of a bottom view of the portion of the outsole of FIG. 3 in various states of tension.

FIG. 3 illustrates a schematic sequence of configurations for a portion of outsole 120 under a tensioning force applied along a single axis or direction. Specifically, FIG. 3 is intended to illustrate how the geometric arrangements of apertures 131 and polygonal portions 200 provide auxetic properties to outsole 120, thereby allowing portions of outsole 120 to expand in both the direction of applied tension and a direction perpendicular to the direction of applied tension.

As shown in FIG. 3, a portion 230 of outsole 120 proceeds through various intermediate configurations as a result of an applied tension in a single linear direction (for example, the longitudinal direction). In particular, the four intermediate configurations may be associated with increasing levels of tension that is applied along a single direction.

Due to the specific geometric configuration for polygonal portions 200 and their attachment via hinge portions, this linear tension is transformed into rotation of adjacent polygonal portions 200. For example, first polygonal portion 201 and sixth polygonal portion 206 are rotated at hinge portion 210. All of the remaining polygonal portions 200 are likewise rotated as apertures 131 expand. Thus, the relative spacing between adjacent polygonal portions 200 increases. For example, as seen clearly in FIG. 3, the relative spacing between first polygonal portion 201 and sixth polygonal portion 206 (and thus the size of first portion 141 of aperture 131) increases with increased tension.

As the increase in relative spacing occurs in all directions (due to the symmetry of the original geometric pattern of apertures), this results the expansion of portion 230 along a first direction as well as along a second direction orthogonal to the first direction. For example, in the exemplary embodiment, in the initial or non-tensioned configuration (seen on the left in FIG. 3), portion 230 initially has an initial size D1 along a first linear direction (e.g., the longitudinal direction) and an initial size D2 a second linear direction that is orthogonal to the first direction (e.g., the lateral direction). In the fully expanded configuration (seen on the right in FIG. 3), portion 230 has an increased size D3 in the first direction and an increased size D4 in the second direction. Thus, it is clear that the expansion of portion 230 is not limited to expansion in the tensioning direction. Moreover, in some embodiments, the amount of expansion (e.g., the ratio of the final size to the initial size) may be approximately similar between the first direction and the second direction. In other words, in some cases, portion 230 may expand by the same relative amount in, for example, both the longitudinal direction and the lateral direction. In contrast, some other kinds of structures and/or materials may contract in directions orthogonal to the direction of applied tension.

In the exemplary embodiments shown in the figures, an auxetic structure, including an outsole comprised of an auxetic structure may be tensioned in the longitudinal direction or the lateral direction. However, the arrangement discussed here for auxetic structures comprised of apertures surrounded by geometric portions provides a structure that can expand along any first direction along which tension is applied, as well as along a second direction that is orthogonal to the first direction. Moreover, it should be understood that the directions of expansion, namely the first direction and the second direction, may generally be tangential to a surface of the auxetic structure. In particular, the auxetic structures discussed here may generally not expand substantially in a vertical direction that is associated with a thickness of the auxetic structure.

Figure 4:
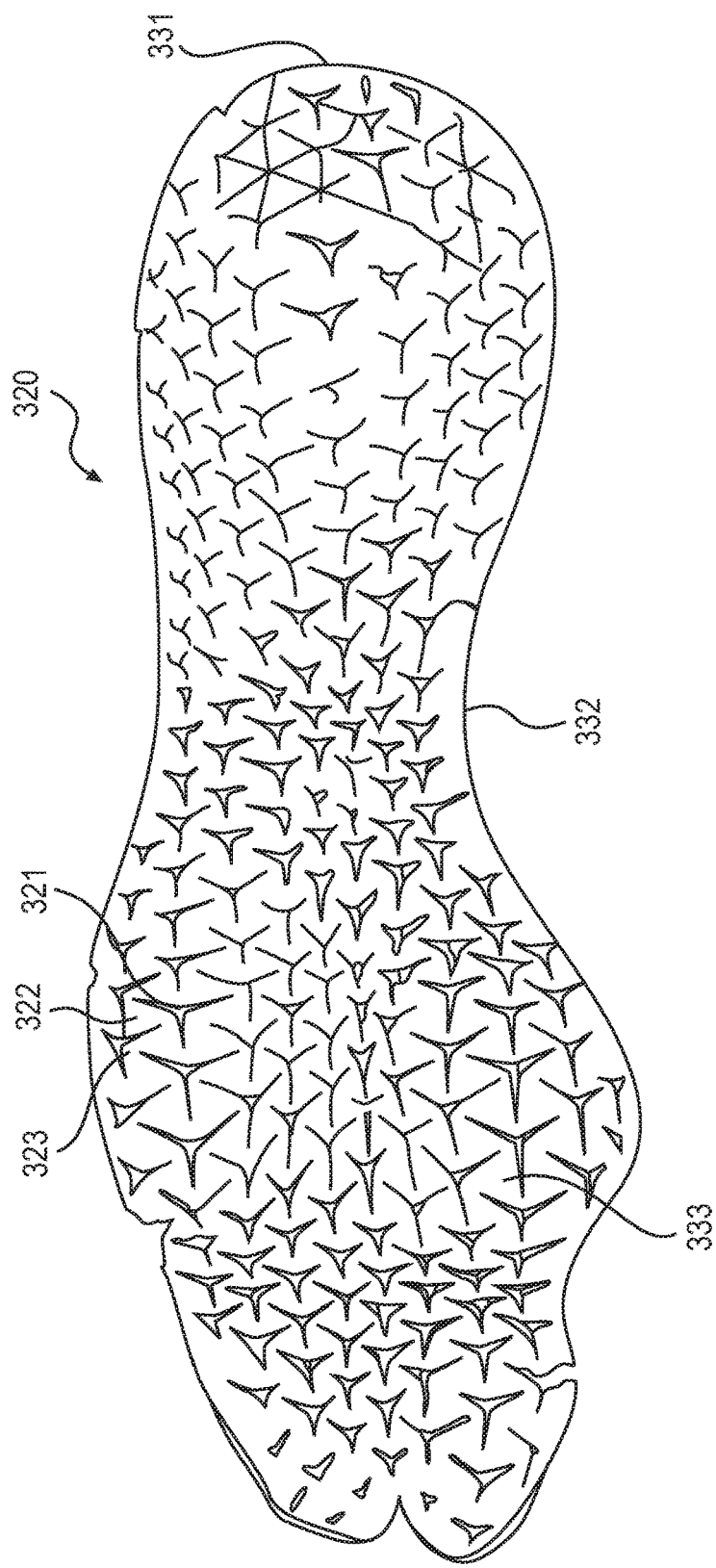
FIG. 4 is a schematic diagram of a top view of an embodiment of an outsole with the upper removed.
Figure 5:
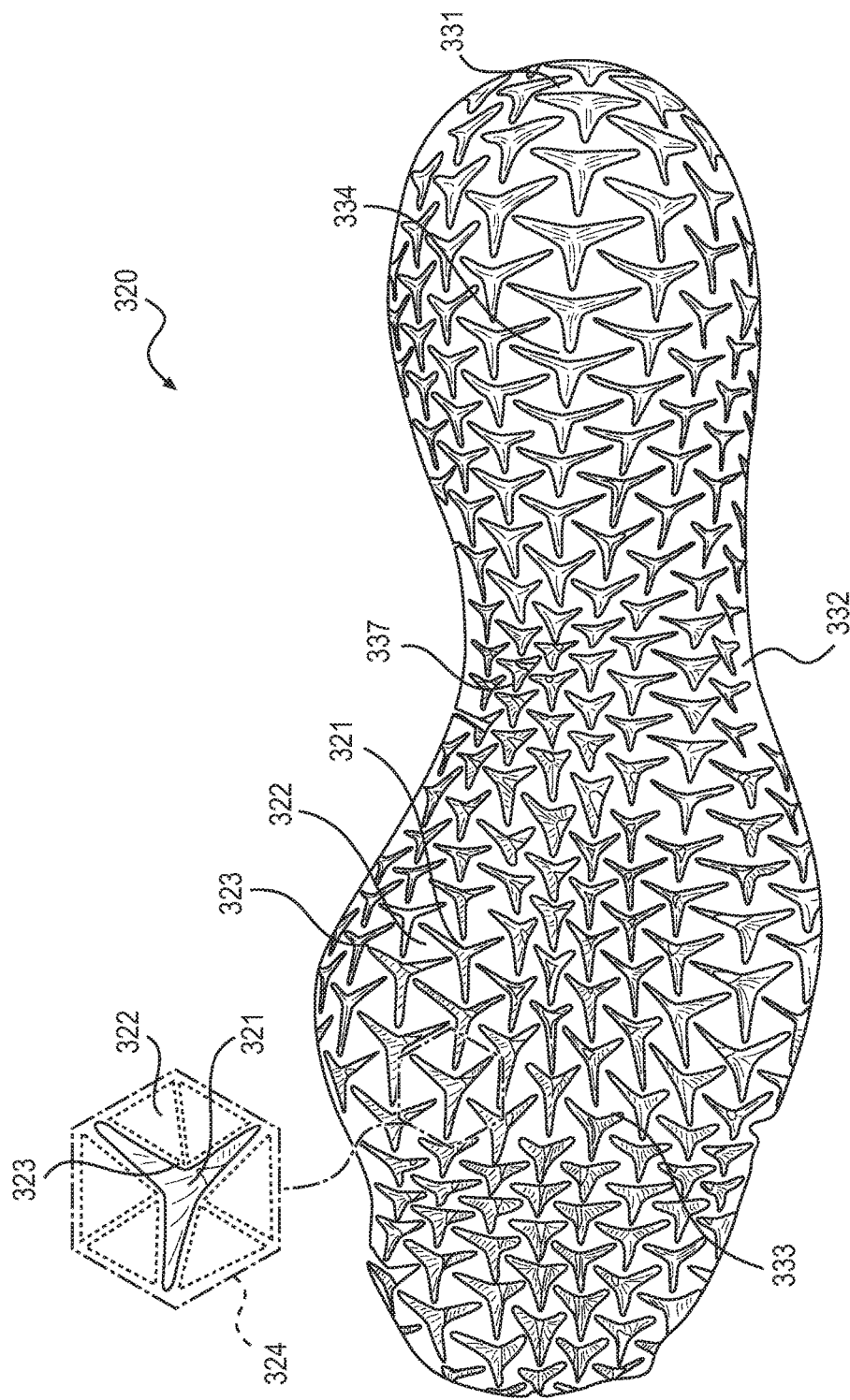
FIG. 5 is a schematic diagram of a bottom view of the outsole shown in FIG. 4.

FIG. 4 is a top view of the side of outsole 320 that is not in contact with the ground. FIG. 5 is a bottom view of the outsole of FIG. 4. Thus FIG. 5 is a view of the side of outsole 320 that is in direct contact with the ground. Outsole 320 has a heel region 331, a midfoot or instep region 332 and a forefoot region 333. In some embodiments, outsole 320 may be comprised of an auxetic structure. As shown in these figures, outsole 320 bears a pattern of apertures 321 formed by a pattern of triangular portions 322 that are joined at each of their vertices 323 to the vertices of adjoining triangles. The combination of six triangles 322 (depicted in dashed lines in the blow-out in FIG. 5) around each of the apertures 321 forms hexagonal patterns 324 (depicted in dash-dot lines in FIG. 5) as shown in FIG. 5.

As shown in FIG. 5, the hexagonal patterns vary in size and shape over the length and width of the outsole. For example, the size of the hexagonal patterns is largest in the center 334 of the heel region 331 and smallest at the instep region 337. For example, the distance from one vertex of an aperture to an adjoining vertex of that aperture may be twice as great in the center of the heel region than at the instep region of the sole. At the heel, in an exemplary embodiment, the reentrant angle for the side of the triangle that is generally oriented laterally is quite shallow at about 150° to 170°, for example at 160°, whereas at the forefoot, that reentrant angle is much sharper, at about 110° to 130°, for example at 120°. More generally, the reentrant angles may range from 100° to 170°. With this geometry, the auxetic structure at the heel expands in width under longitudinal tension to a greater degree than it expands in length when under lateral tension. At the forefoot, the reentrant angles do not differ as much, so that the expansion in width under longitudinal tension at the forefoot is not that much greater than the expansion in length under lateral tension.

In the example shown in FIGS. 4 and 5, the geometrical patterns form through-hole apertures 321, such that apertures 321 form holes all the way through the outsole 320. However, in other embodiments, outsole 320 need not include through-hole apertures. Instead, outsole 320 may include blind holes such that there is a thin continuous layer of material at the top or at the bottom of the outsole. In yet other embodiments, the geometrical patterns may form through-holes in certain portions of the outsole and blind holes in other portions of the outsole.

Figure 6:
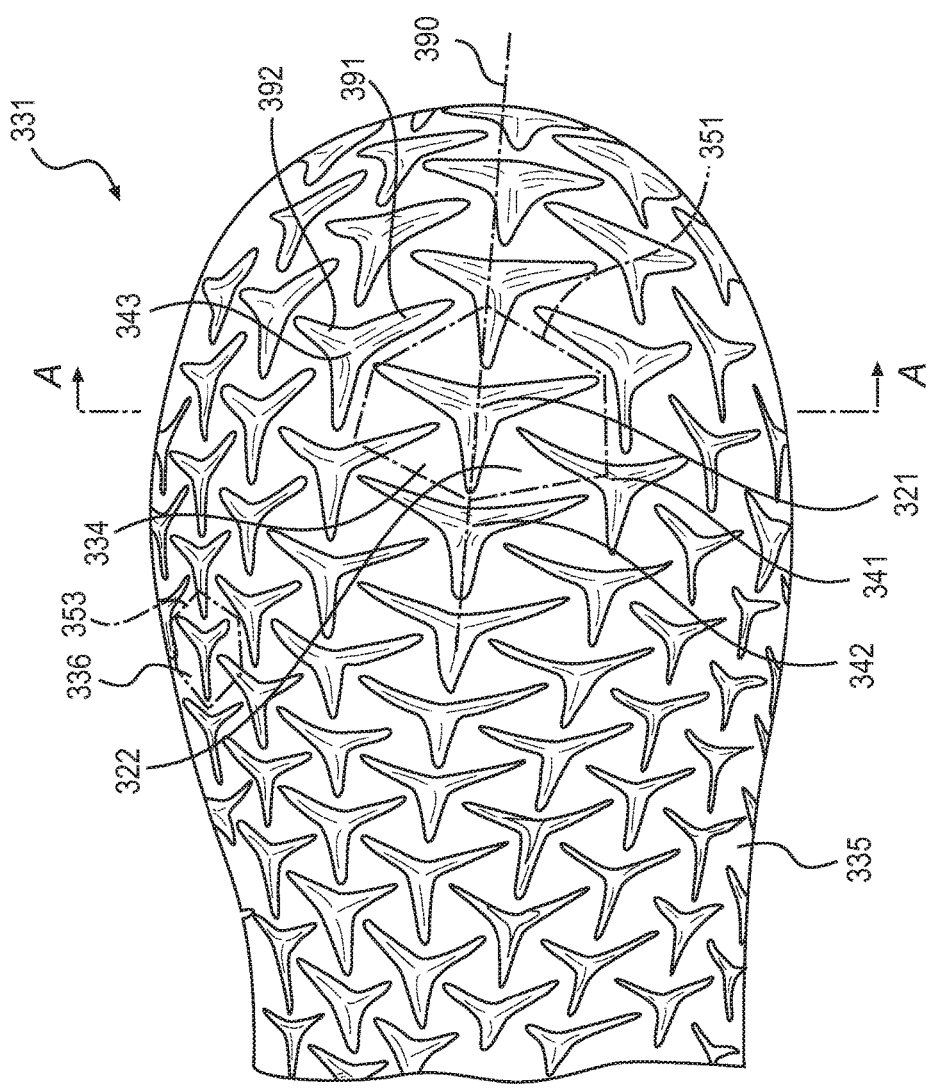
FIG. 6 is a schematic diagram of an enlarged view of the heel region of the outsole shown in FIG. 5 when it is not under tension.

FIG. 6 is an enlarged views of the heel region 331, the midfoot region 332 and the forefoot region 333, respectively, of the outsole shown in FIG. 5 when the outsole is not under tension. FIG. 6 shows that the hexagonal patterns formed by the combination of hinged triangles forming the apertures in the central portion 334 of heel region 331 are larger than the hexagonal patterns towards the lateral side 335 or the medial side 336 of heel region 331. For example, hexagonal pattern 351, which is disposed in central portion 334, may be larger than hexagonal pattern 353, which is disposed on medial side 336 of heel region 331. If the heel strikes the ground or playing surface in the direction that is normal to the ground, triangular portions 322 in central portion 334 of the heel move towards the center of the hexagonal pattern 351. This increases the density of the structure directly under the heel, and helps cushion the impact of the heel striking the ground.

In the embodiment shown in FIG. 6, the hexagonal patterns in the central portion 334 of the heel may be approximately symmetric with respect to a longitudinal axis that bisects the apertures 321 at the center of the hexagonal patterns. For example, aperture 342 is approximately symmetric with respect to axis 390 that bisects aperture 342. The features in the adjoining columns of apertures on either side of the central portion 334 of the heel, however, are not symmetric. For example, aperture 343 on the medial side of the heel has a longer inwardly-directed portion 391 than an outwardly-directed portion 392. Aperture 341 on the lateral side of the heel also has a similar geometry, with an inwardly directed portion that is longer than an outwardly directed portion of aperture 341. This geometry maximizes the ability of the central region to compress and attenuate impact forces when the heel strikes the ground or playing surface. In some embodiments, the dimensions of the features on the lateral side 335 of the heel and on the medial side 336 of the heel are significantly smaller (for example, two-thirds the size or smaller) than the dimensions of the features at the center of the heel. The smaller dimensions of the hexagonal patterns on the lateral and medial sides of the heel allow the heel to maintain its curved shape around the upwardly curving contour of the heel, and maximizes the flexibility of the medial and lateral sides of the heel.

Figure 7:
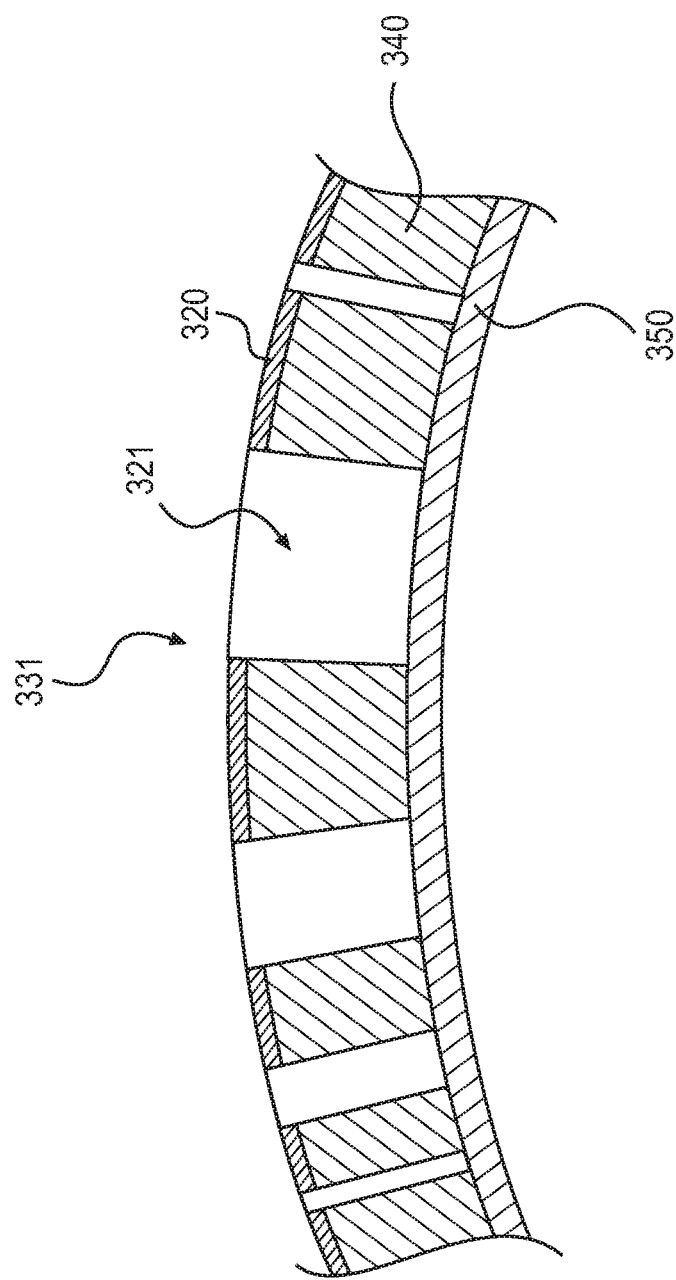
FIG. 7 is a schematic diagram of a cross-section along the line A-A identified in FIG. 6.

FIG. 7 is a cross-section taken at heel region 331 shown in FIG. 6, showing an example of the construction of the footwear. In this example, the heel has three layers—an outsole layer 320, a midsole layer 340 and an insole layer 350. In some embodiments, outsole layer 320 is made of a relatively hard, abrasion resistant material, whereas midsole layer 340 and insole layer 350 are made of relatively resilient materials so as to provide a comfortable article of footwear. FIG. 7 also shows apertures 321 through outsole layer 320 and midsole layer 340.

Figure 8:
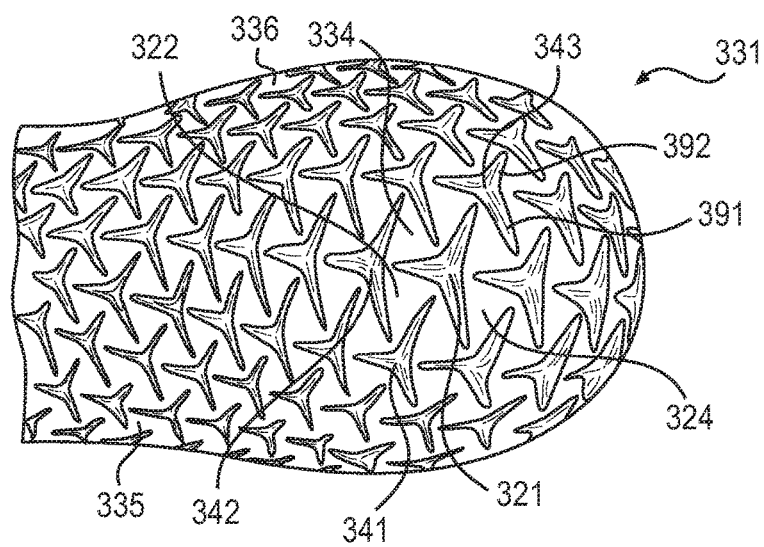
FIG. 8 is a schematic diagram of an enlarged view of the heel region shown in FIG. 5.
Figure 9:
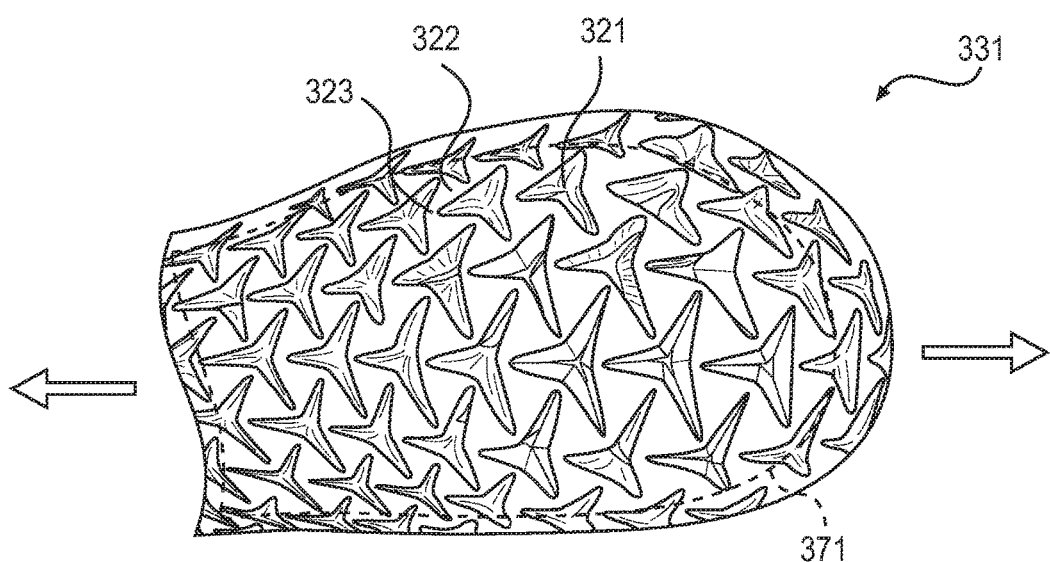
FIG. 9 is a schematic diagram of an enlarged view of the heel region shown in FIG. 5 when it is under longitudinal tension.

FIGS. 8-9 illustrates the auxetic characteristics of heel region 331 of outsole 320 as, for example, the wearer lands on the heel of the footwear. Under longitudinal tension, heel region 331 increases in length. However, because of the construction of outsole 320 as a pattern of hinged triangles joined at their vertices, heel region 331 increases in its lateral dimension as well (e.g., its width). For purposes of illustration, the initial size of heel region 331 prior to applying tension is indicated by line 371. This may help improve the traction between the heel and the playing surface for various reasons. For example, because the ground-contacting surface is spread over a somewhat larger area, this increases the likelihood that at least part of the heel will be in contact with a non-slippery playing surface when the heel hits the ground. Additionally, the openings between triangles allow the triangles to expand, increasing the area of contact with the ground. Furthermore, the impact opens the inner edges of the triangular star-shaped apertures so as to increase the engagement of the edges with the playing surface.

Figure 10:
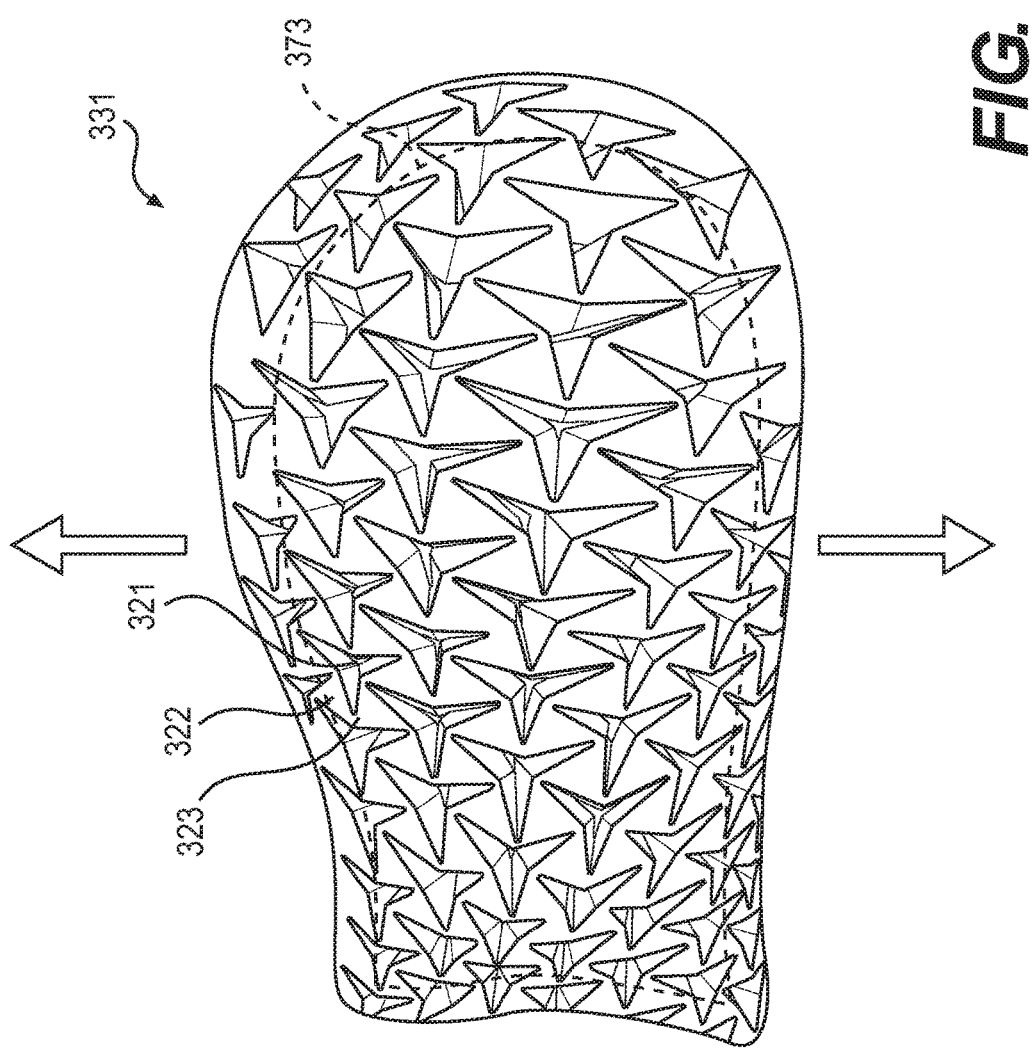
FIG. 10 is a schematic diagram of an enlarged view of the heel region shown in FIG. 5 when it is under lateral tension.

FIG. 10 is another view of the heel region shown in FIG. 8. In this case, the heel region 331 has undergone lateral tension. For that reason, the triangles have rotated and the dimensions of the heel region 331 have increase longitudinally as well as laterally. The dashed line 373 shows an outline of heel region 331 when it is not under tension. This configuration provides further improvements in traction when a wearer cuts sharply or pushes off to one side or the other.

Figure 11:
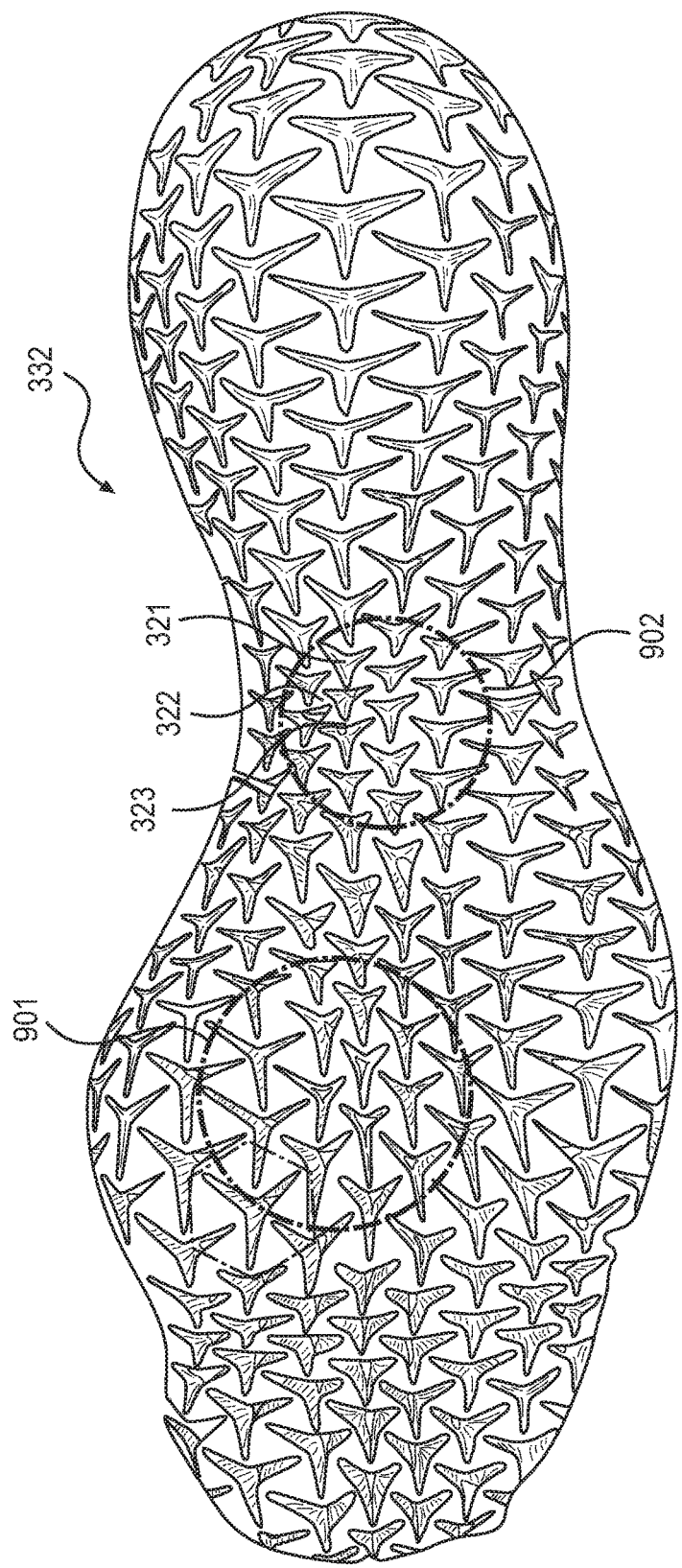
FIG. 11 is a schematic diagram of an embodiment of a sole when it is not under tension.

FIG. 11 is a schematic diagram of a sole showing apertures 321, formed by a pattern of triangular portions 322 that are joined to each other at their vertices 323. In some embodiments, apertures 321 may be characterized as triangular star-shaped apertures, due to the presence of three star-like arms extending from a central region. However, as previously discussed, apertures 321 are not limited to particular geometry, and could have any polygonal or non-polygonal geometry in other embodiments.

As noted above, the joints at the vertices function as hinges, allowing triangular portions 322 to rotate with respect to each other as the sole comes under tension. Area 901 and area 902, denoted by the dashed circles, are identified in FIG. 11 for further discussion with respect to FIGS. 12-14.

Figure 13:
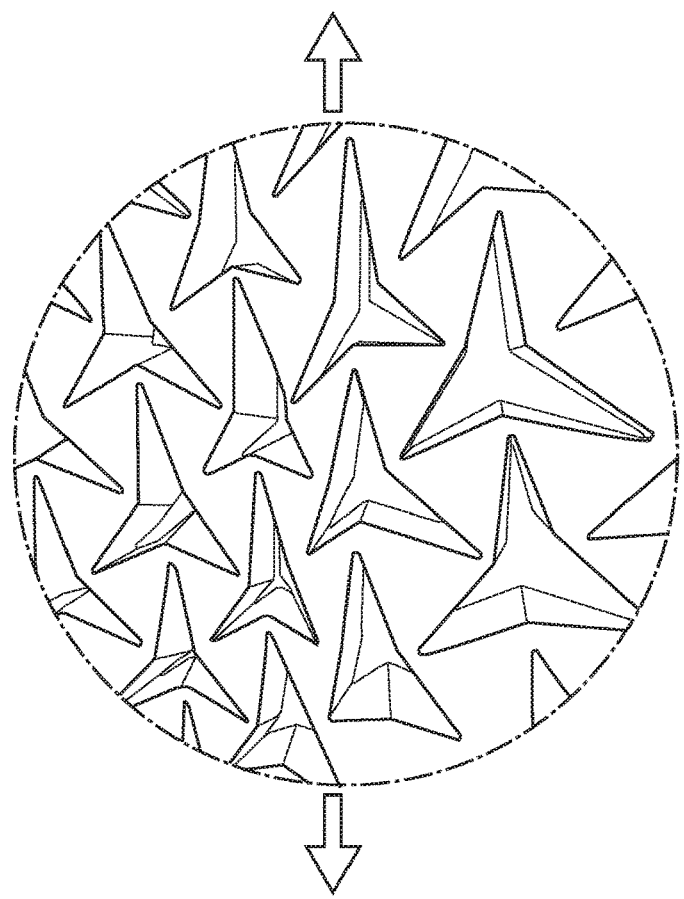
FIG. 13 is a schematic diagram of an enlarged view of a portion of the forefoot of the sole shown in FIG. 11 when it is under longitudinal tension.
Figure 12:
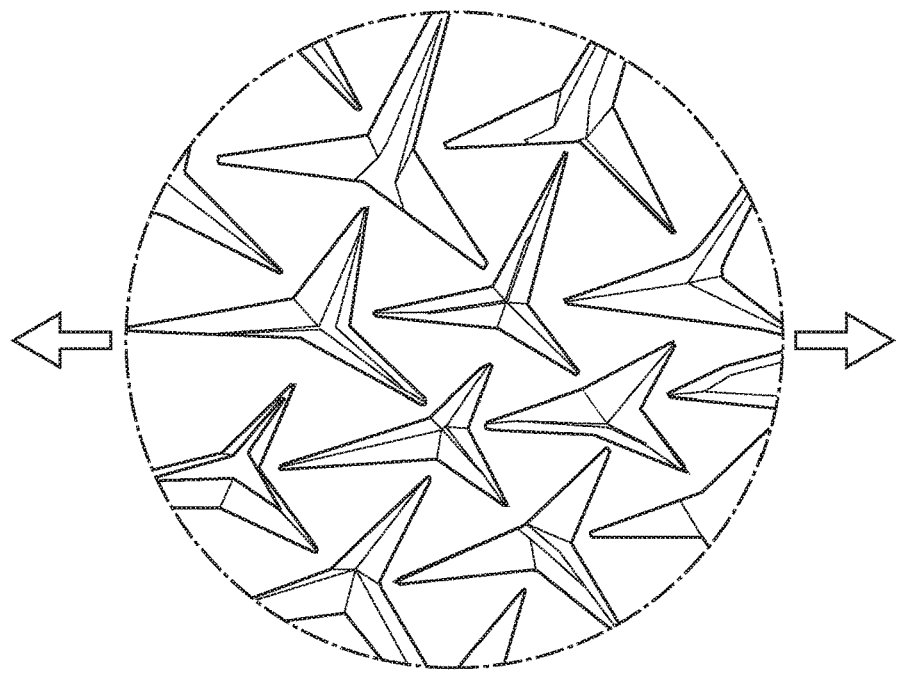
FIG. 12 is a schematic diagram of an enlarged view of a portion of the forefoot of the sole shown in FIG. 11 when it is under lateral tension.

FIG. 12 is an expanded view of the area identified as 901 in FIG. 11, when the forefoot is under lateral tension. As shown in FIG. 12, when the forefoot is under lateral tension, for example when the wearer is pushing off to the side, the outsole at the forefoot increases in dimension longitudinally as well as laterally, thus improving traction with the ground or playing surface. FIG. 13 is another expanded view of the area identified as 901 in FIG. 11, in this case illustrating the configuration of the sole when it is under longitudinal tension, for example when the wearer is pushing off from his or her forefoot. FIG. 13 shows that when the forefoot is under longitudinal tension, the outsole increases its lateral dimension as well as it longitudinal dimension.

Figure 14:
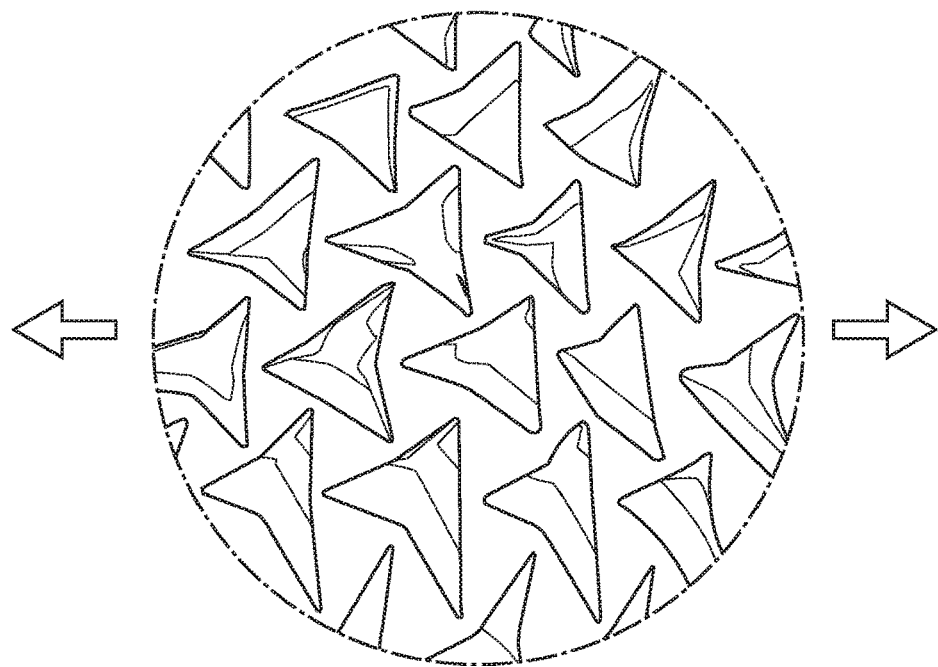
FIG. 14 is a schematic diagram of an enlarged view of a portion of the midfoot of the sole shown in FIG. 11 when it is under longitudinal tension.
Figure 15:
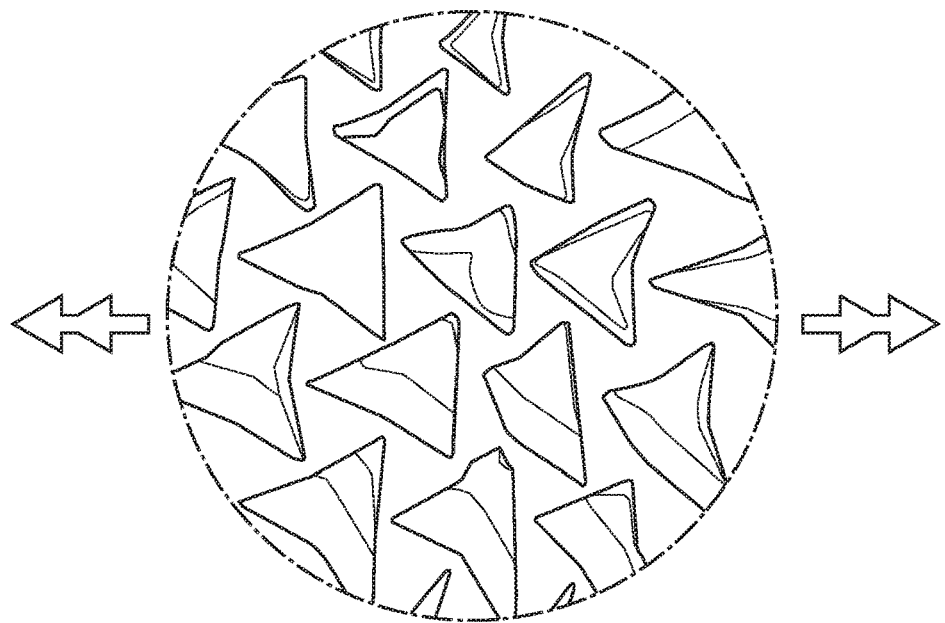
FIG. 15 is a schematic diagram of an enlarged view of a portion of the midfoot of the sole shown in FIG. 11 when it is under increased longitudinal tension.

FIG. 14 is an expanded view of the area identified as 902 in FIG. 11 when the midfoot of the sole is under moderate longitudinal tension, for example when the contact with the ground is transitioning from the heel to the forefoot. As shown in FIG. 14, when the midfoot of the sole is under longitudinal tension, it increases in its lateral dimension as well as in its longitudinal direction. FIG. 15 shows the midfoot when it is under even greater longitudinal tension, showing that the dimensions of the sole have increased laterally as well as longitudinally to an even greater extent.

Figure 16:
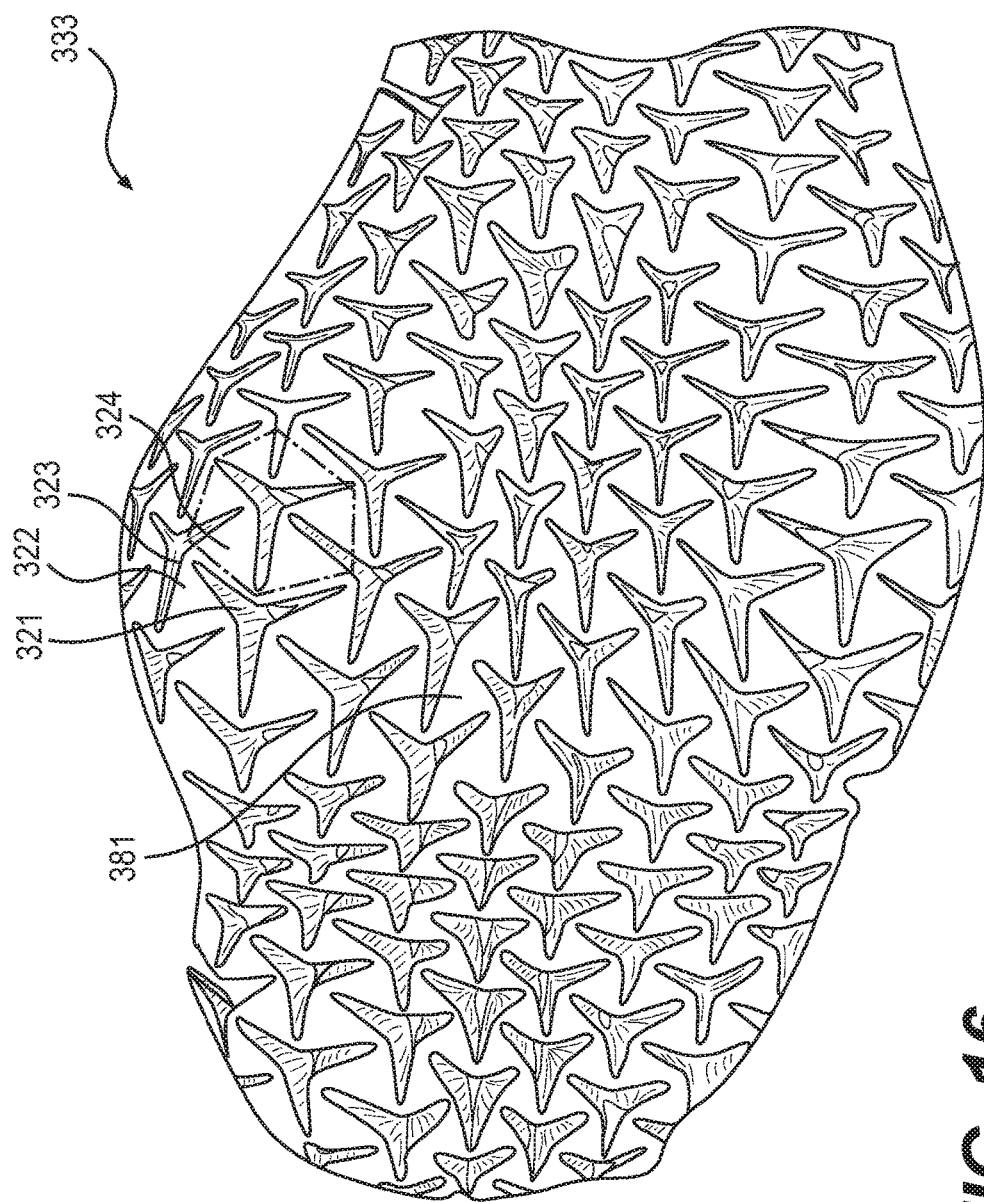
FIG. 16 is a schematic diagram of an enlarged view of the forefoot of the sole shown in FIG. 5 when it is not under tension.

FIG. 16 is an enlarged of the forefoot region 333 when the forefoot is in a rest condition and therefore not under tension. In the middle portion 381 of forefoot region 333, the outsole has larger hexagonal patterns 324 on its medial side of the ball of the foot (i.e., where the phalange from the big toe meets a metatarsal bone), where a wearer would be pushing off when making a sudden move to one side, and at the big toe where a wearer would be pushing off to leap or run forwards. These larger features help absorb the impact of these moves, and increase the traction of those regions of the outsole with the playing surface.

Figure 17:
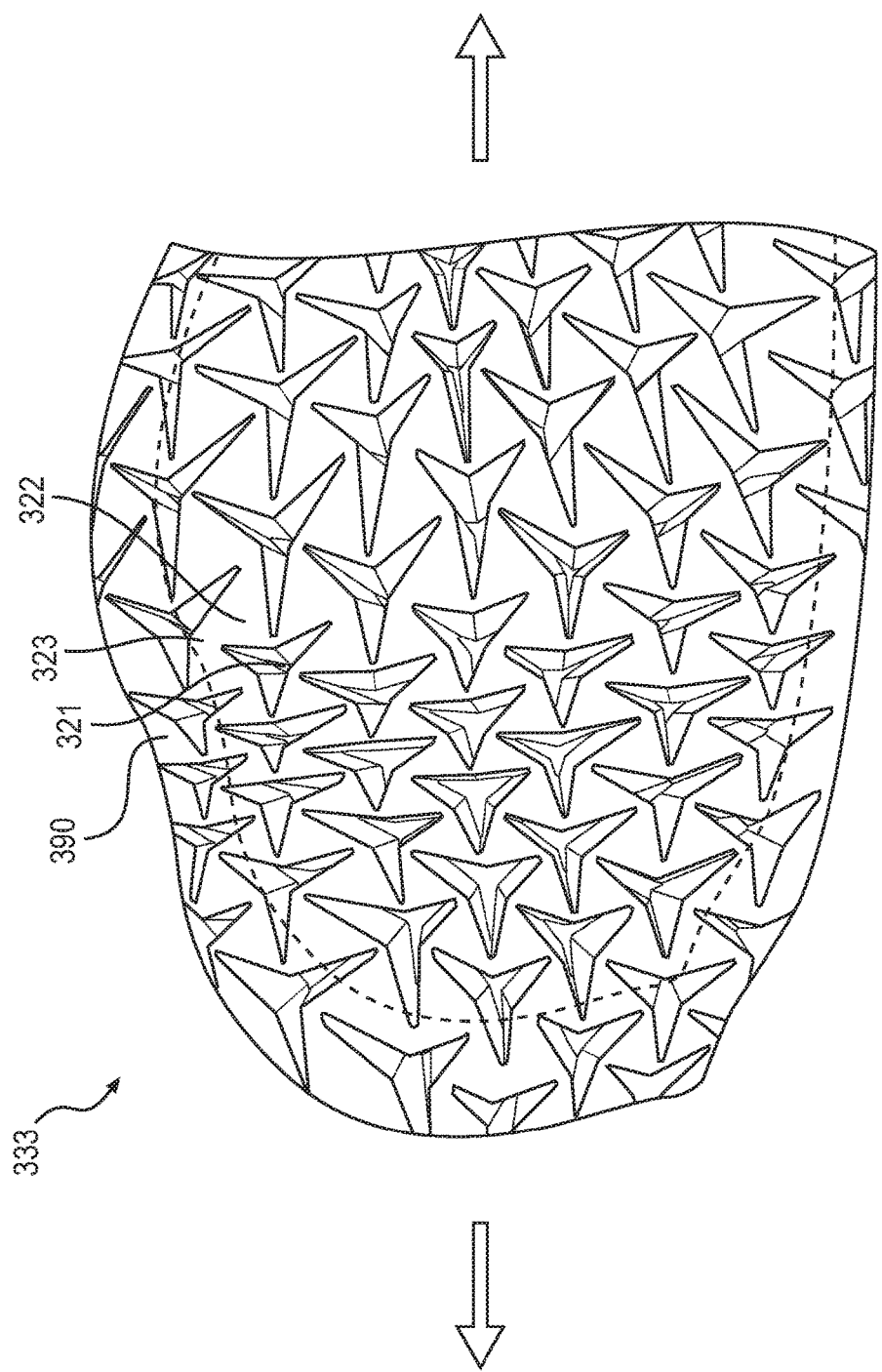
FIG. 17 is a schematic diagram of an enlarged view of the forefoot of the sole shown in FIG. 5 when it is under longitudinal tension.
Figure 18:
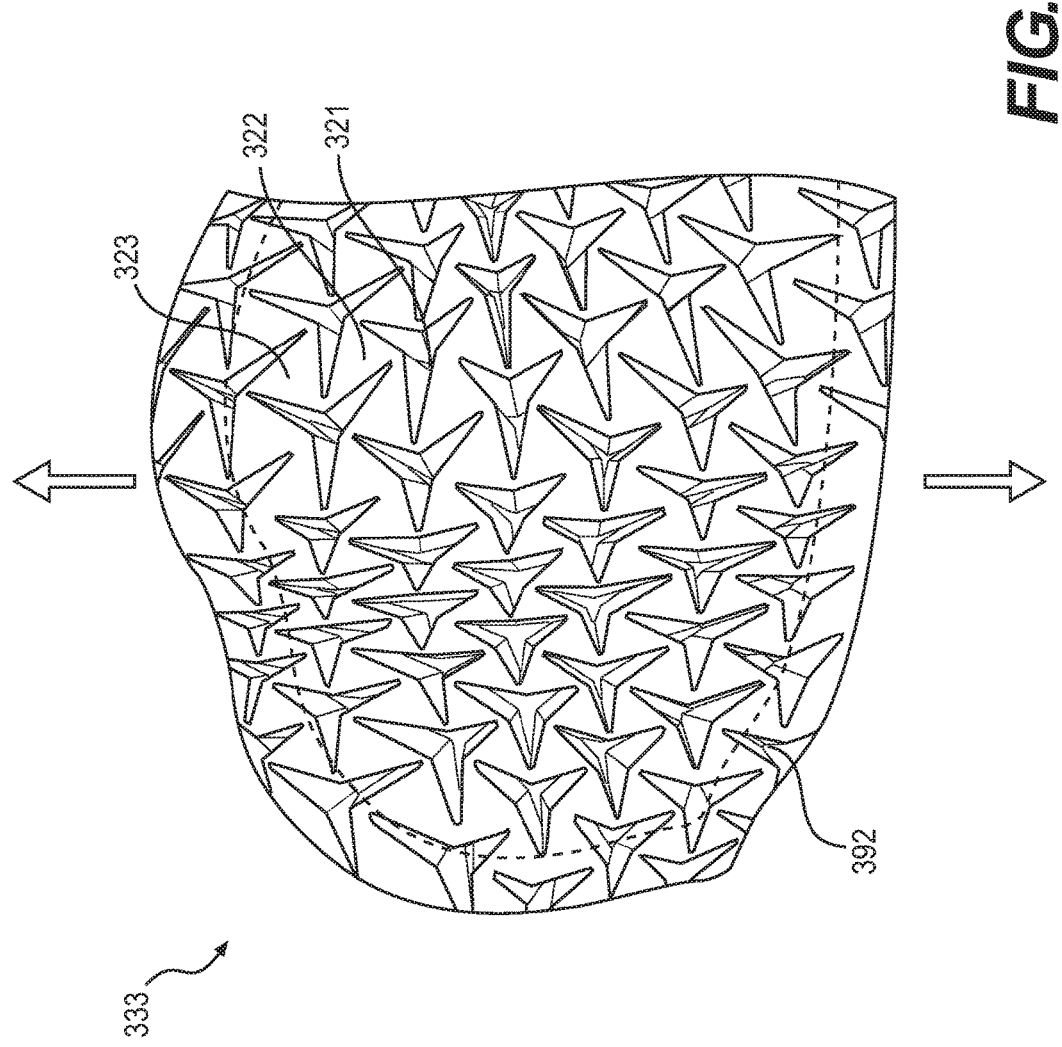
FIG. 18 is a schematic diagram of an enlarged view of the forefoot of the sole shown in FIG. 5 when it is under lateral tension.

FIG. 17 shows the forefoot region of FIG. 16 when it is under longitudinal tension, showing that the region under tension increases its lateral dimension as well as its longitudinal dimension. FIG. 18 shows the forefoot region of FIG. 16 when it is under lateral tension, showing that the region under tension increases its longitudinal dimensions as well as its lateral dimensions. As seen in FIGS. 17 and 18 the auxetic structure of the outsole provides improved traction when subjected to either longitudinal or lateral tension, since the overall surface area of the outsole increases under either kind of tension.

Figure 22:
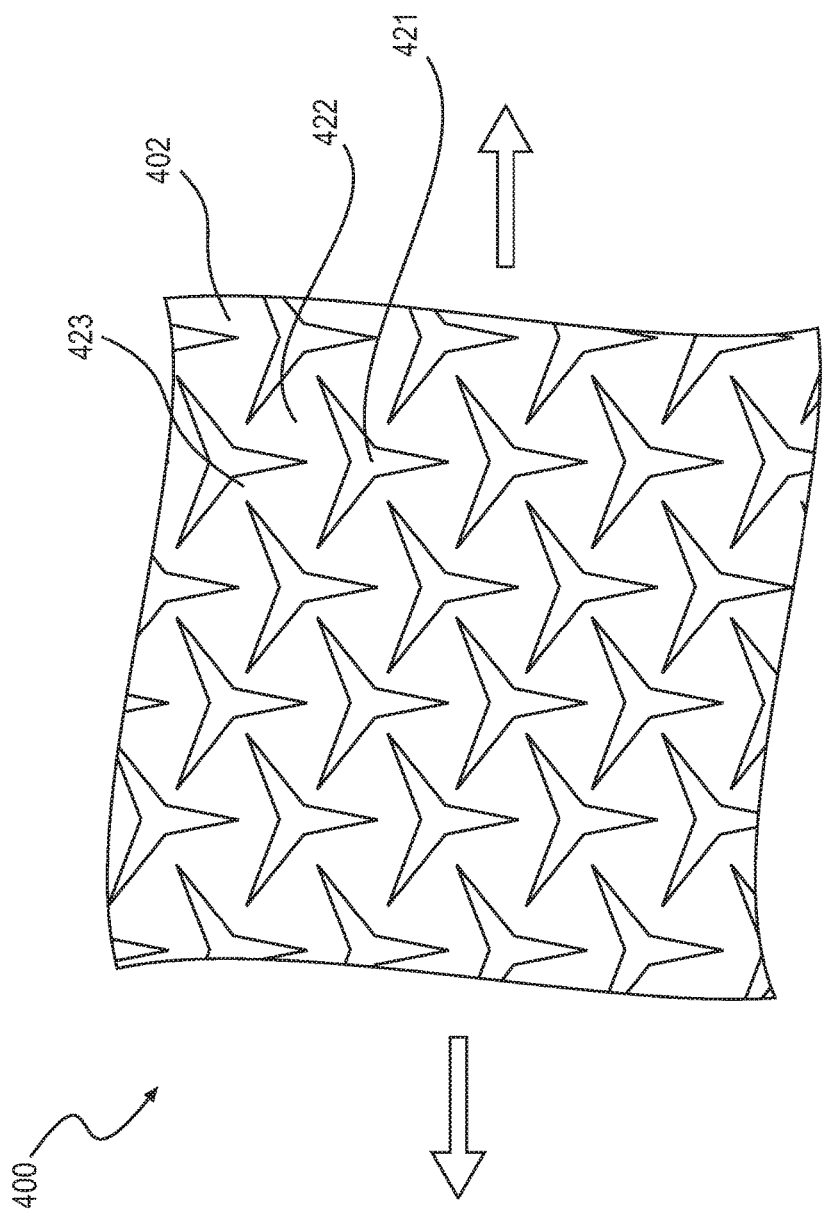
FIG. 22 is a schematic diagram of a top view of a portion of the outsole of FIG. 19 when it is under tension.

FIGS. 19 to 25 illustrate an embodiment with a different sole structure. In this embodiment, sole 400 is made from an auxetic structure that does not appear to have openings when the structure is not under tension. However, this structure exhibits polygonal openings when the structure is under tension. Thus this structure can be described as being "closed" when it is not under tension (FIGS. 19 and 21), and "open" when it is under longitudinal, lateral or other tension in the plane of the structure (FIG. 22).

Figure 19:
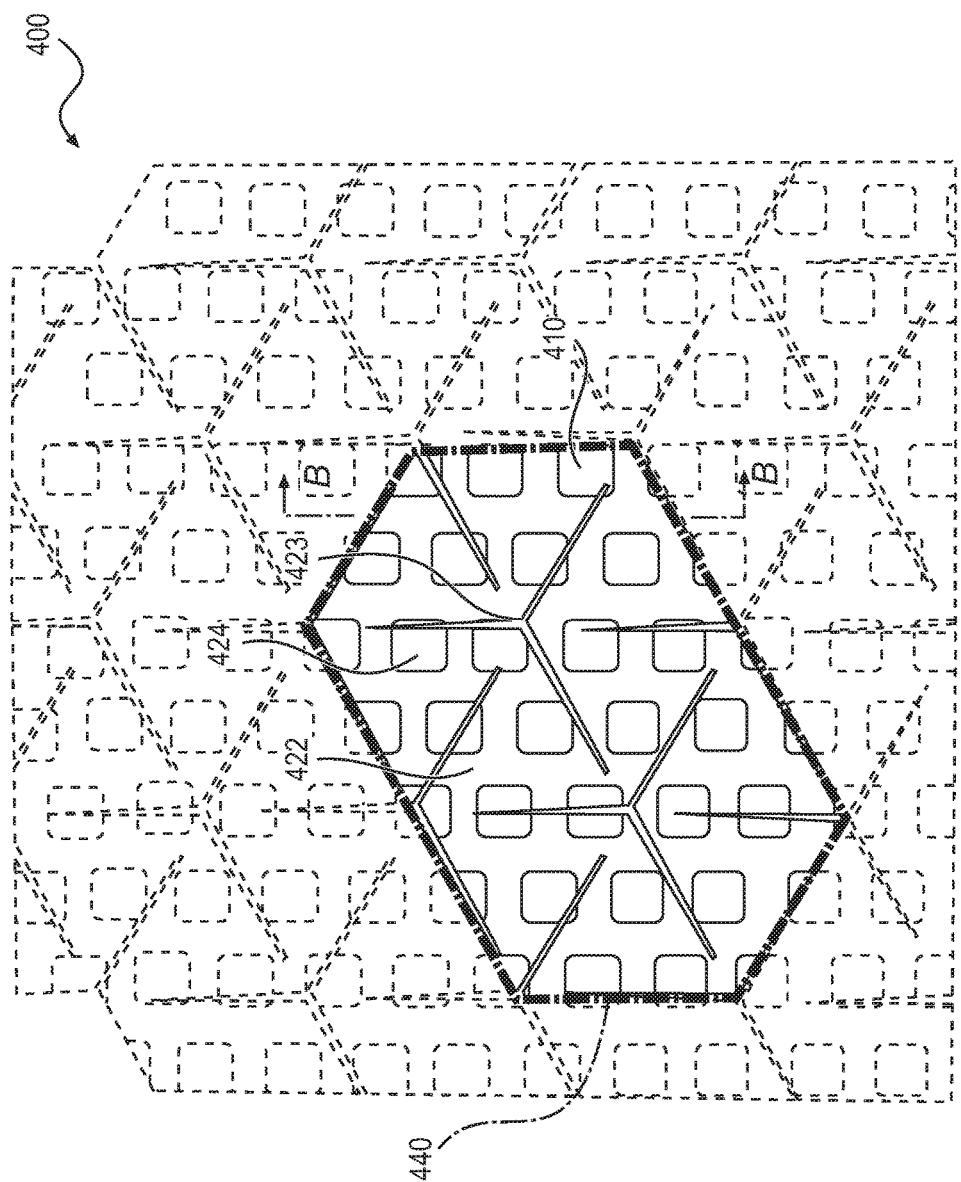
FIG. 19 is a schematic diagram of a bottom view of a portion of an outsole of an embodiment having ground-engaging members when it is not under tension.
Figure 20:
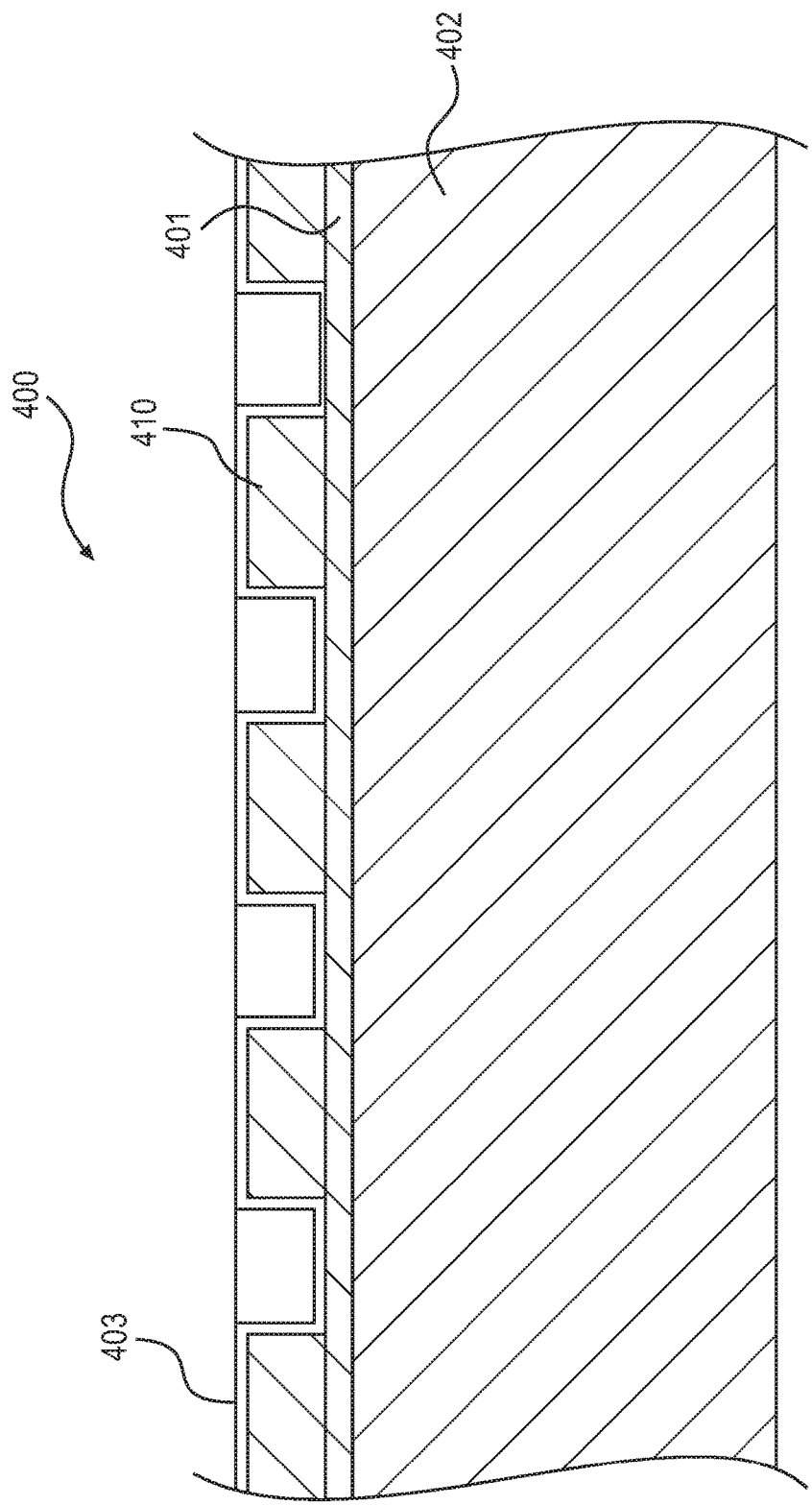
FIG. 20 is a schematic diagram of a cross-section of the sole of the embodiment shown in FIG. 19.
Figure 21:
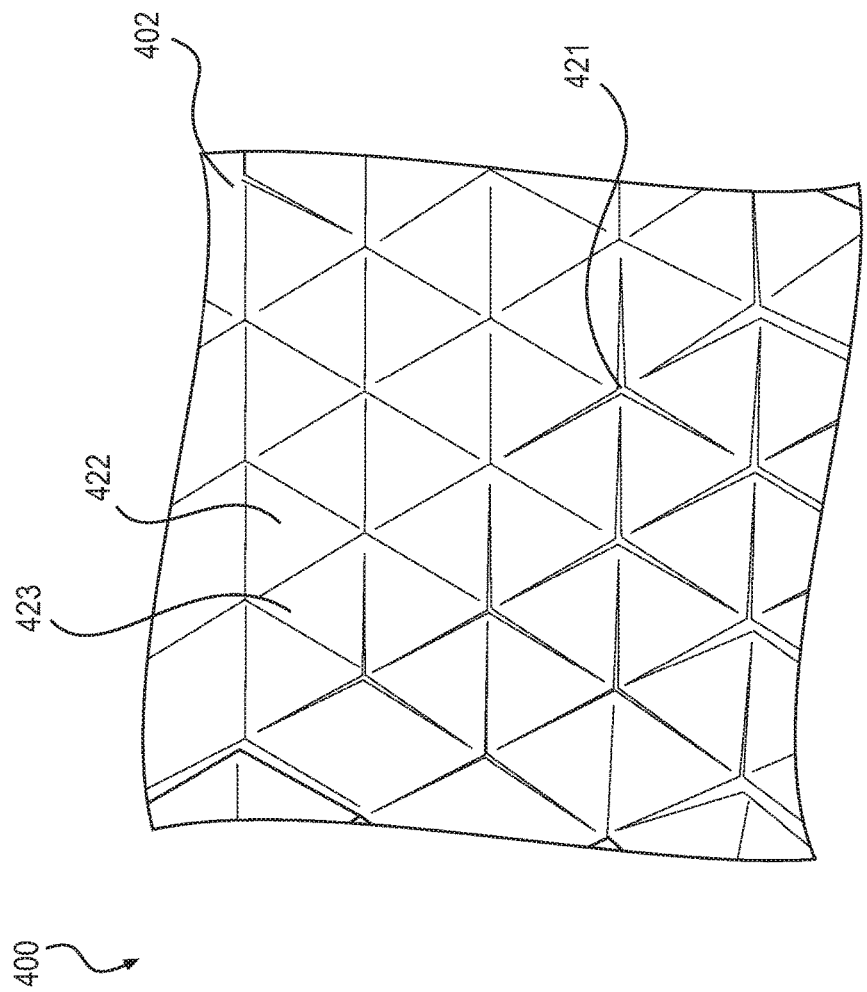
FIG. 21 is a schematic diagram of a top view of a portion of the outsole of FIG. 19 when it is not under tension.

FIG. 20 is a side cross-sectional view of sole 400, showing tread pattern 410 on outsole 401 and midsole 402. In some embodiments, as seen in FIG. 20, outsole 401 may also include an outer covering 403. The embodiment shown in FIGS. 19 to 25 has an outsole 401 made, for example, of a relatively hard material such as a hard rubber, and a midsole 402 made of a relatively resilient material such as EVA foam or polyurethane foam.

As shown in FIGS. 19, 21, 22 and 23, the outsole 401 and the midsole 402 both have the auxetic structure described above, i.e., they have a pattern of triangles joined at their vertices. The joints between the vertices 423 of triangles 422 are flexible, such that they function as hinges, allowing the triangles to rotate with respect to each other thus producing the apertures 421 shown in FIG. 22 and FIG. 23.

Figure 23:
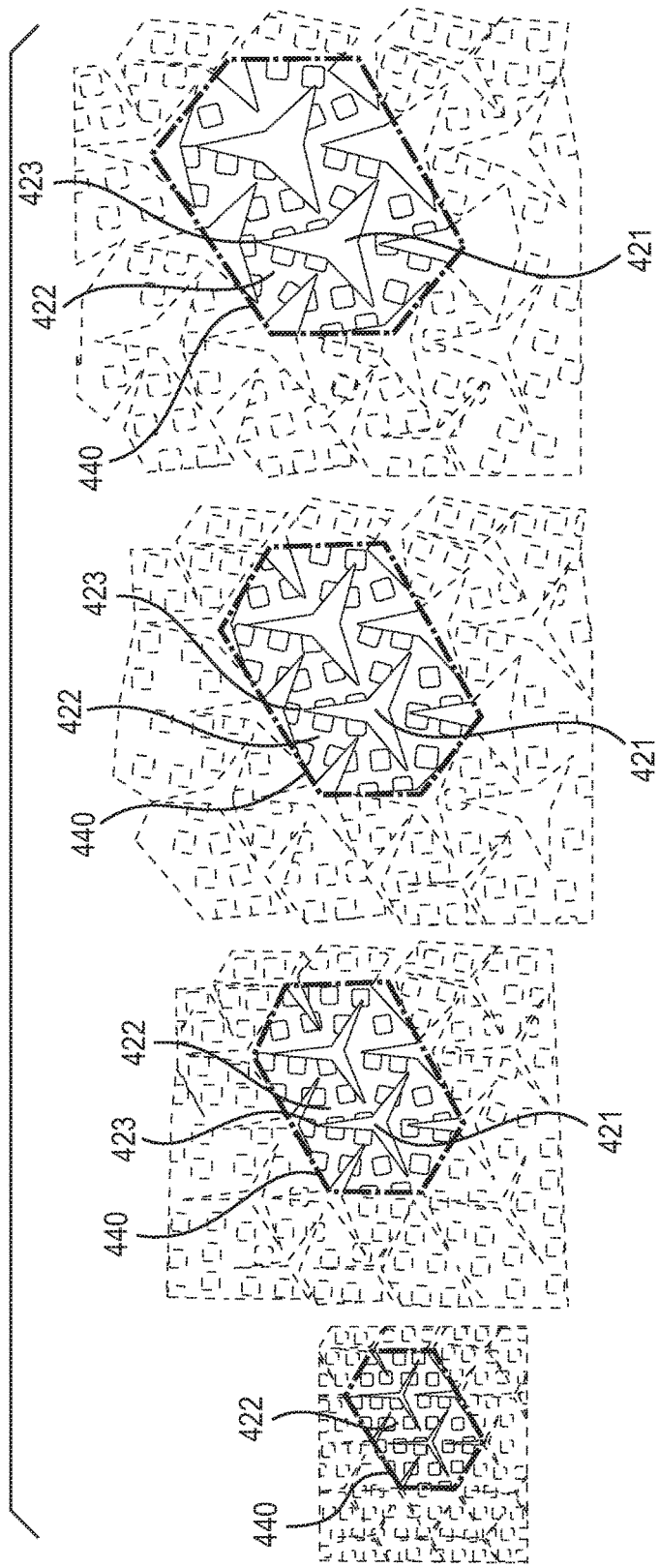
FIG. 23 shows a sequence of schematic diagrams of a bottom view of the portion of the outsole of FIG. 19 in various states of tension.

The portion of the sole outlined in dark dashed lines 440 in FIG. 19 is shown in the four schematic diagrams of FIG. 23. These diagrams show how the dimensions of the sole increase from their initial values when the sole is not under tension (the first diagram on the left) to when the sole is under low tension (second diagram), then when the sole is under moderate tension (third diagram) and finally when the sole is under greatest tension (fourth diagram).

Figure 24:
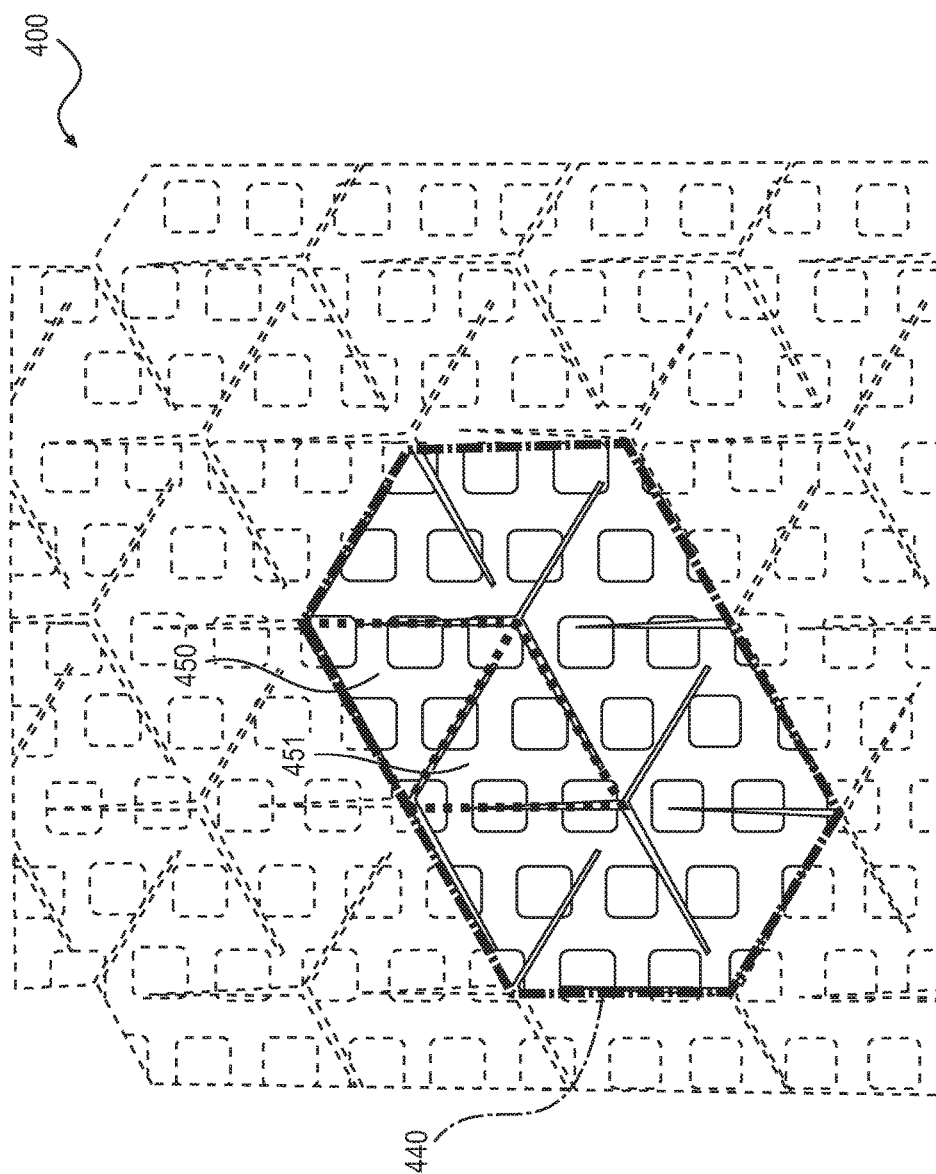
FIG. 24 is a schematic diagram of a bottom view of an outsole of an embodiment when it is not under tension.
Figure 25:
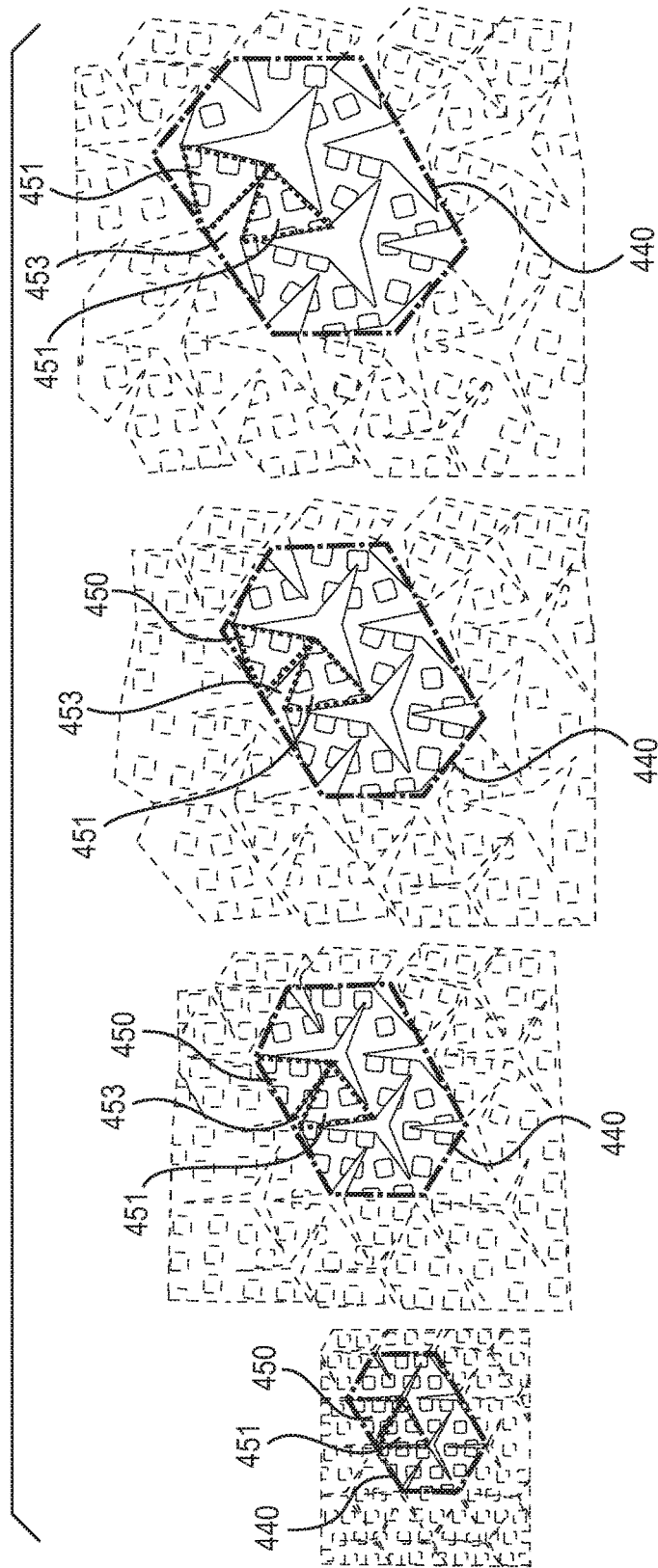
FIG. 25 shows a sequence of schematic diagrams of a bottom view of the portion of the outsole of FIG. 24 in various states of tension.

FIG. 24 is a bottom view of an outsole of an embodiment shown in FIG. 19 when it is not under tension. FIG. 24 identifies triangular feature 450 and triangular feature 451 within dark dashed lines 440. FIG. 25 is a sequence of four schematic diagrams showing how triangular feature 450 and triangular feature 451 rotate away from each other and open the aperture 453 between them as the outsole undergoes increasing tension.

In the embodiment shown schematically in FIGS. 19 to 25, the outsole has a tread pattern 410 that provides improved traction with the ground or the playing surface. The outsole optionally also has a thin, elastic and flexible "skin" or outer covering 403 that is molded to fit over the tread pattern. This outer covering may be made, for example, from an elastomeric material. The outer covering may be used to prevent water, dirt, particulates or other debris from entering the triangular openings created when the sole is under tension.

Figure 26:
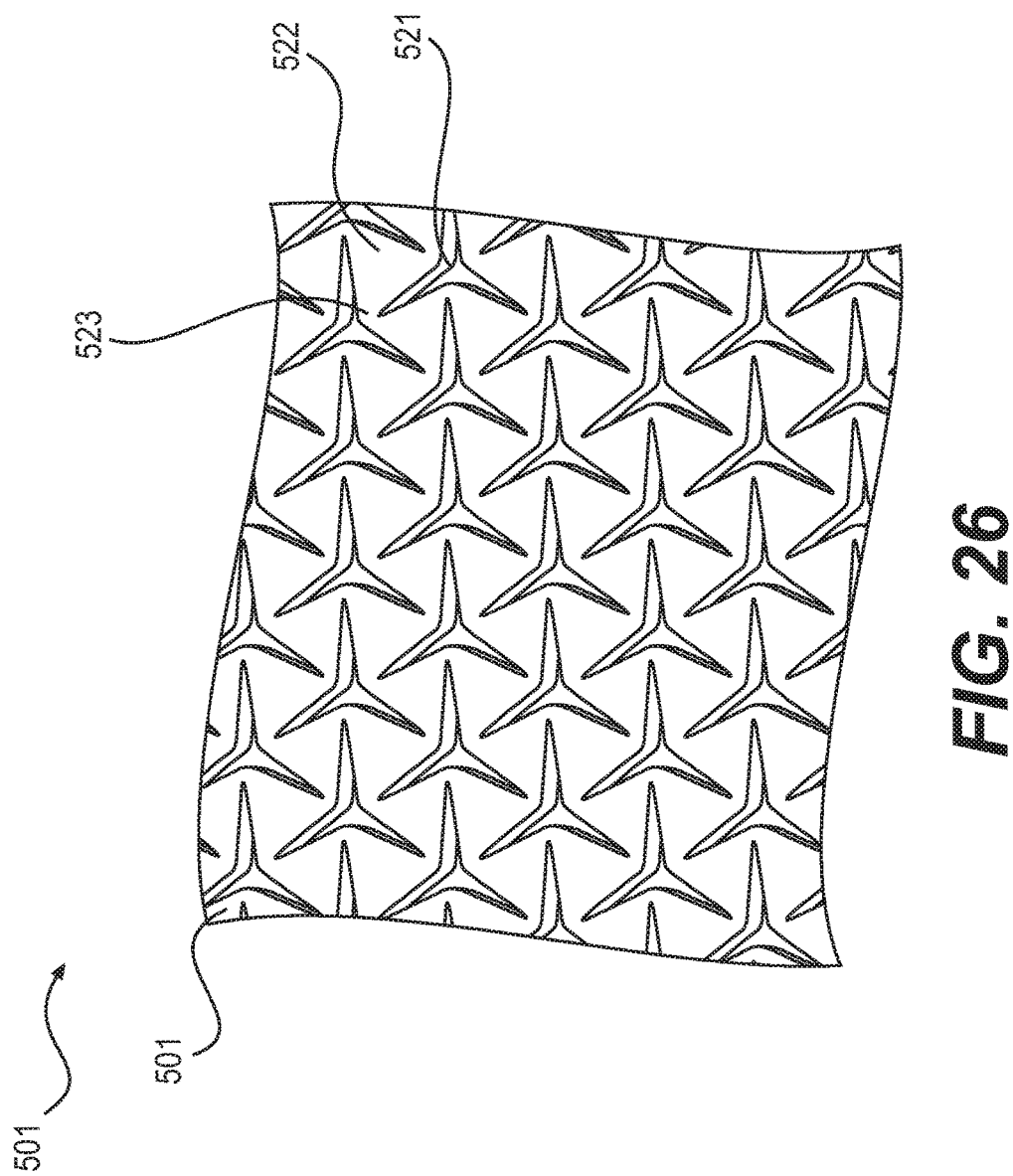
FIG. 26 is a schematic diagram of another embodiment of an outsole when it is not under tension.
Figure 27:
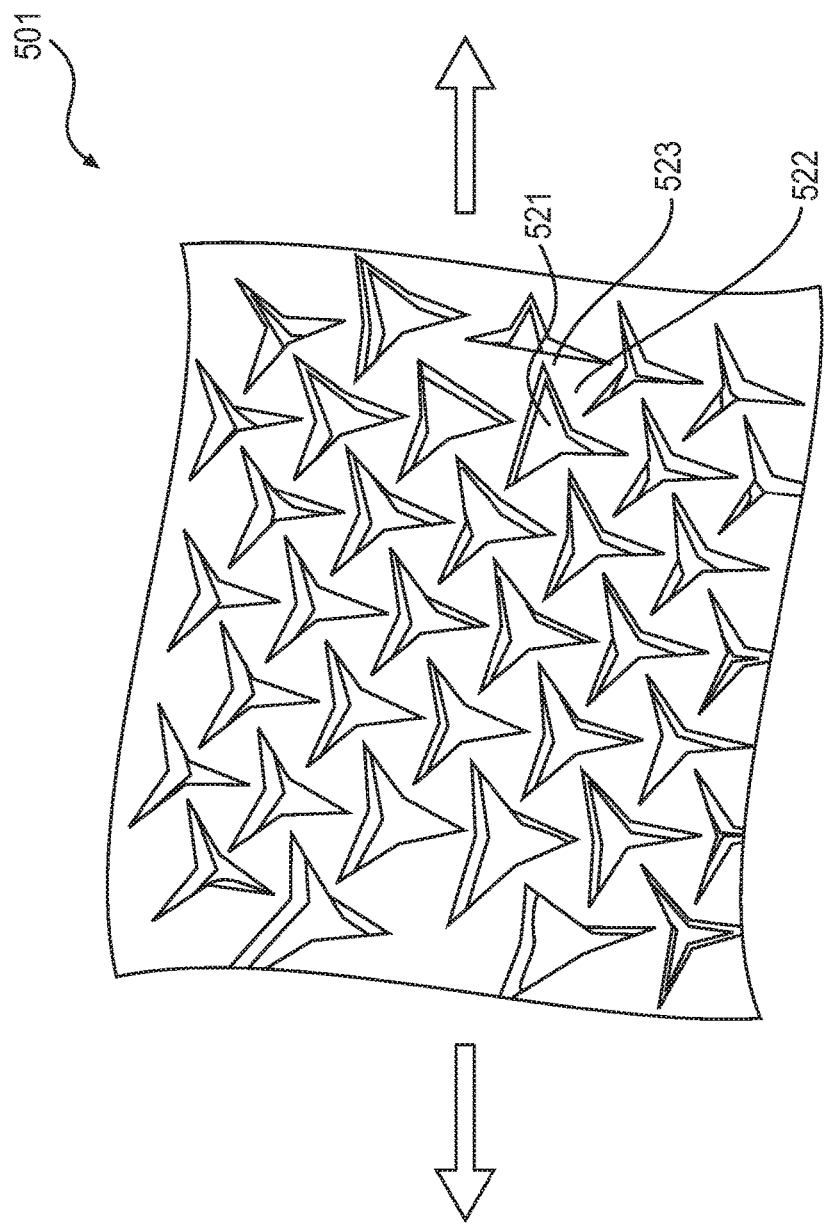
FIG. 27 is a schematic diagram of the embodiment of FIG. 26 when it is under tension.

The outer covering may be molded to fit into the star-shaped triangular apertures in the auxetic structure of the outsole. For example, FIGS. 26-31 are schematic diagrams of an embodiment in which an elastic and flexible outer covering is molded to mate into the triangular star-shaped openings of the auxetic structure. FIG. 26 shows the outsole 501 when it is not under tension. Outsole structure 501 has triangles 522 joined at their vertices 523 to adjoining triangles, which are separated by apertures 521. When the sole structure is under tension in one direction, it increases its dimension in that direction as well as in the direction orthogonal to that direction and in the plane of the structure, as shown in FIG. 27.

Figure 28:
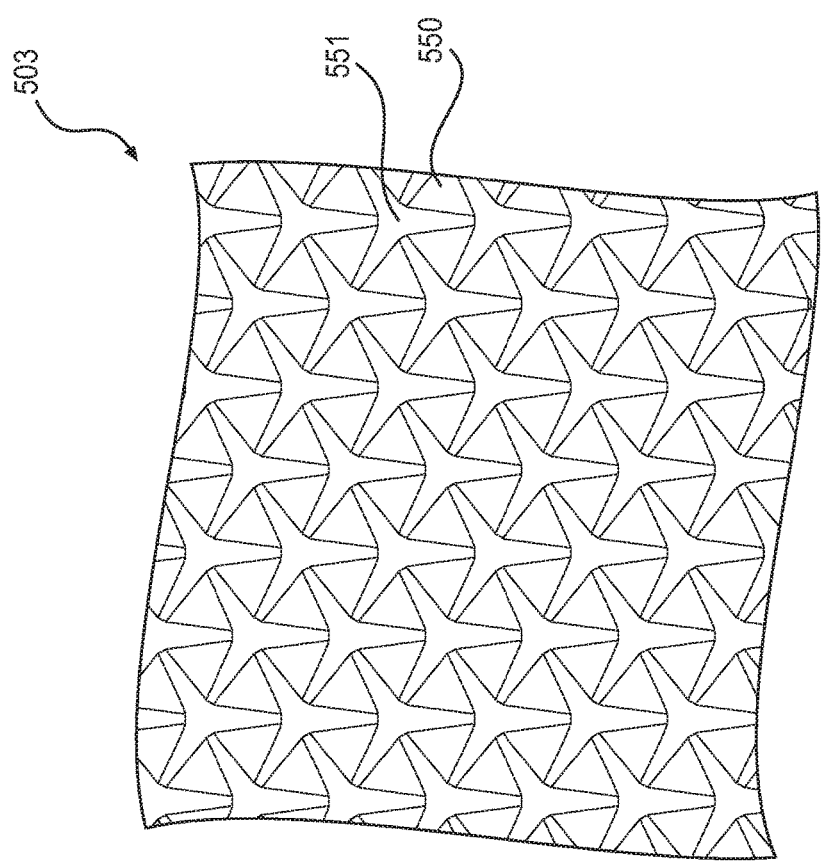
FIG. 28 is a schematic diagram of a top view of an embodiment of an outer covering that mates with the outsole of FIG. 26.
Figure 29:
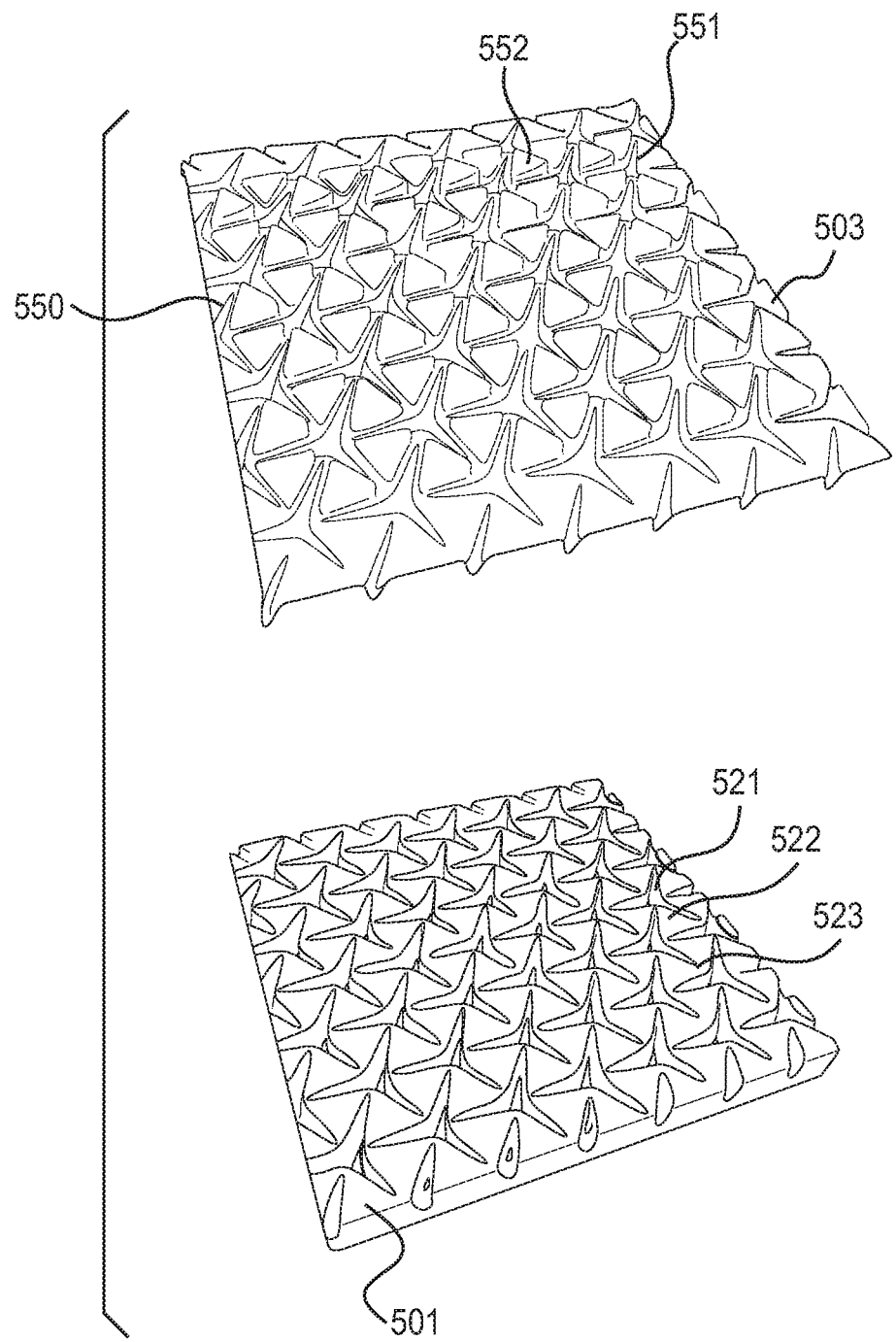
FIG. 29 is a schematic diagram showing how outer the covering of FIG. 28 mates with the outsole of FIG. 26.

FIG. 28 is a schematic diagram of a top view of outer covering 503, i.e., it is a view from what would be the interior side of outer covering 503 when outer covering 503 is attached to the sole. This diagram shows features 551 that protrude from the surface 550 of outer covering 503. FIG. 29 is a schematic diagram showing how outer covering 503 mates with outsole 501. The features 551 on outer covering 503 are now shown from the opposite side of outer covering 503, such that they appear as recesses instead of protuberances. The outer covering (which would be on the bottom of an article of footwear and therefore bears the ground-contacting surface) exhibits a triangular tread pattern 552. Because outer covering 503 is fabricated from a stretchable elastic material, it stretches readily to accommodate the increased length and width of whatever portions of outsole 501 may be under tension. Thus the pattern of features 551 serves the dual function of mating to the auxetic material of outsole 501 and providing triangular tread pattern 552 which serves to improve the wearer's traction against the playing surface.

Figure 30:
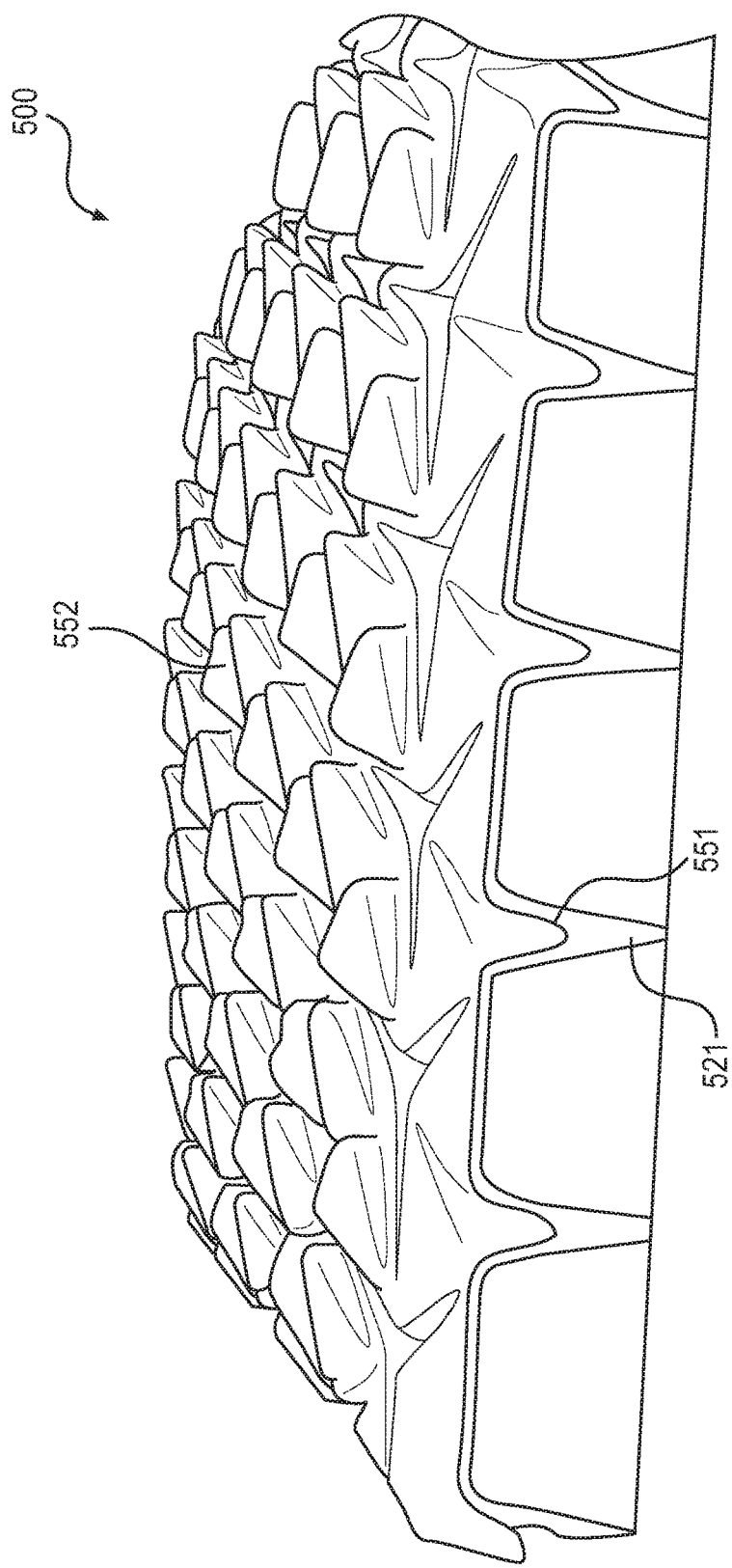
FIG. 30 is a schematic diagram of a side perspective view of the outsole and outer covering of FIG. 28 and FIG. 29.
Figure 31:
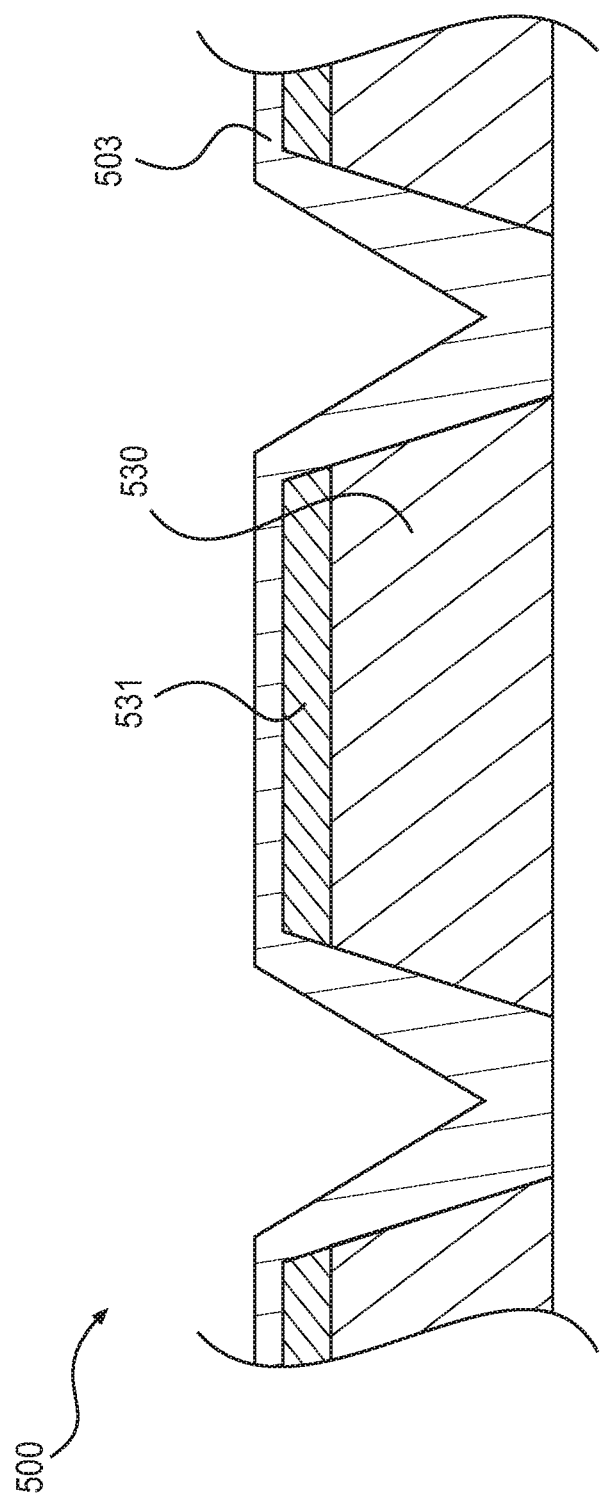
FIG. 31 is a schematic diagram of is a cross-section of an exemplary construction of a sole bearing the outsole of FIG. 26 and the outer covering of FIG. 28.
Figure 37:
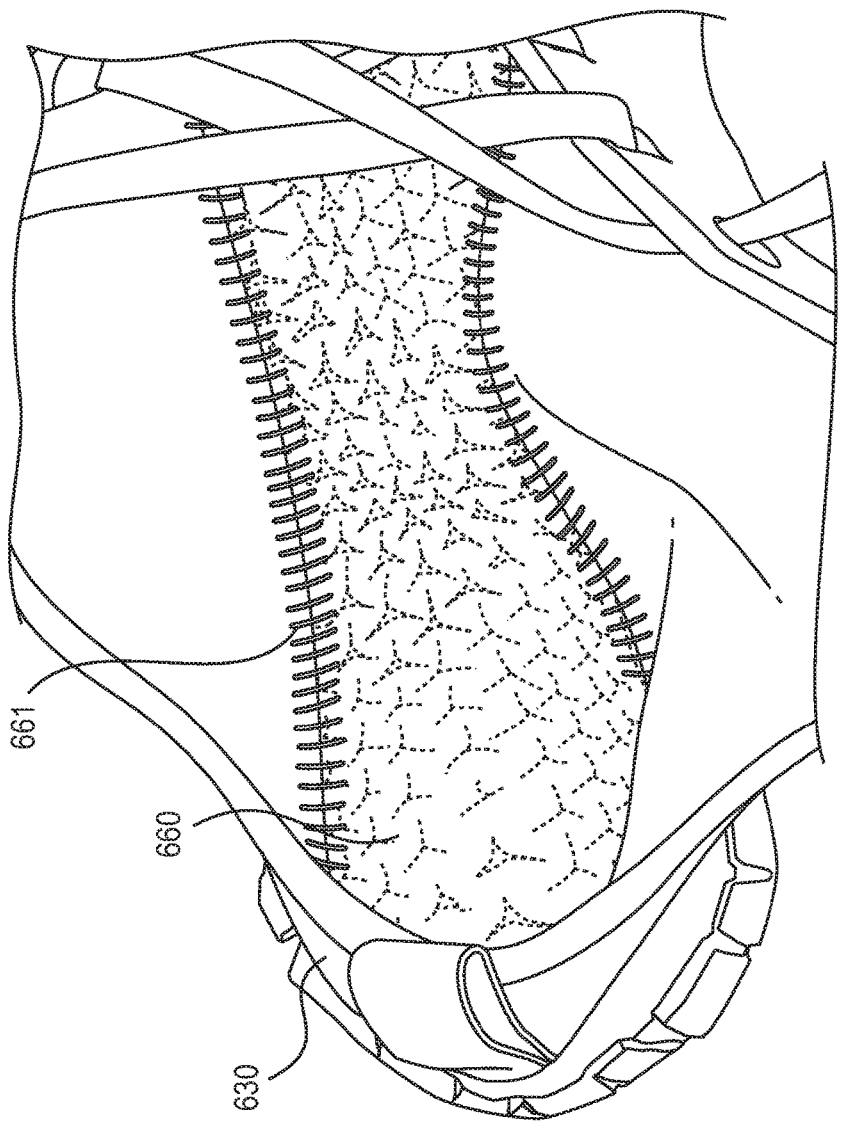
FIG. 37 is a schematic diagram of the interior of the article of footwear of FIG. 32.

FIG. 30 is a side perspective view of a section of outsole structure 500 and outer covering 503, showing how the vertices in outer covering 503 fit into apertures 521. Because outer covering 503 is made from a thin, flexible and elastic material, it can readily stretch to accommodate the expansion of outsole 501 when it is under longitudinal or lateral tension. FIG. 37 is a cross-section of a portion of an exemplary construction of sole structure 500, showing a midsole layer 530 and an outsole layer 531, as well as outer covering 503.

Figure 32:
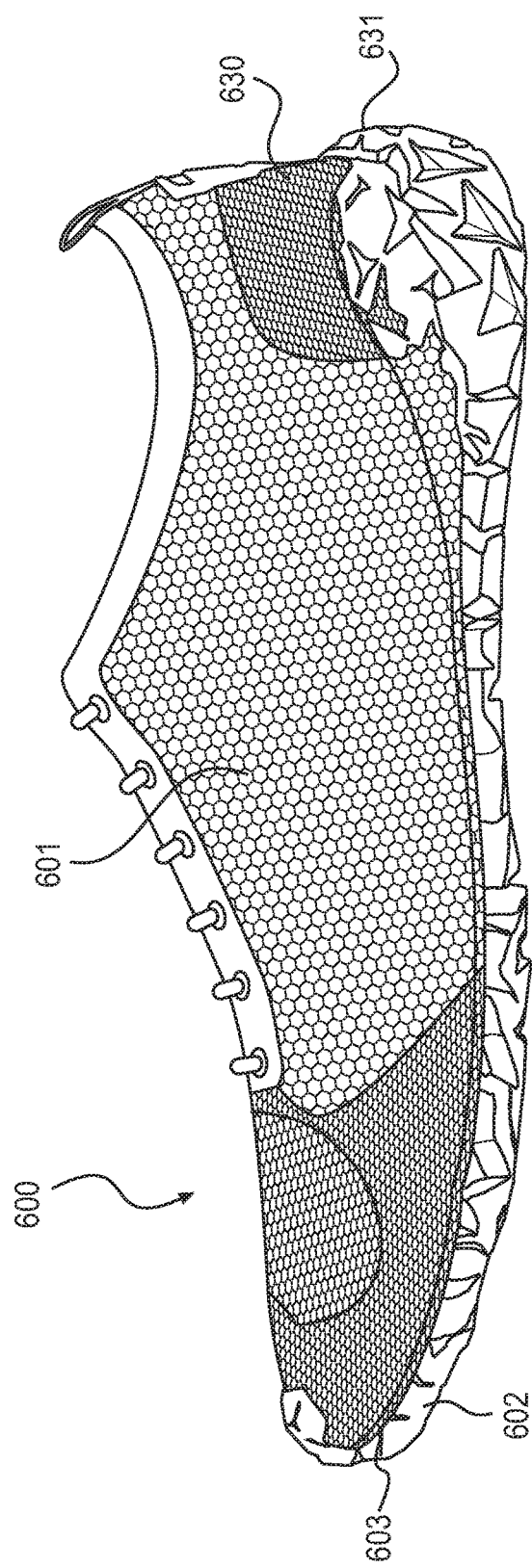
FIG. 32 is a schematic diagram of an embodiment of an article of footwear with a knit upper and a sole having an auxetic structure.
Figure 33:
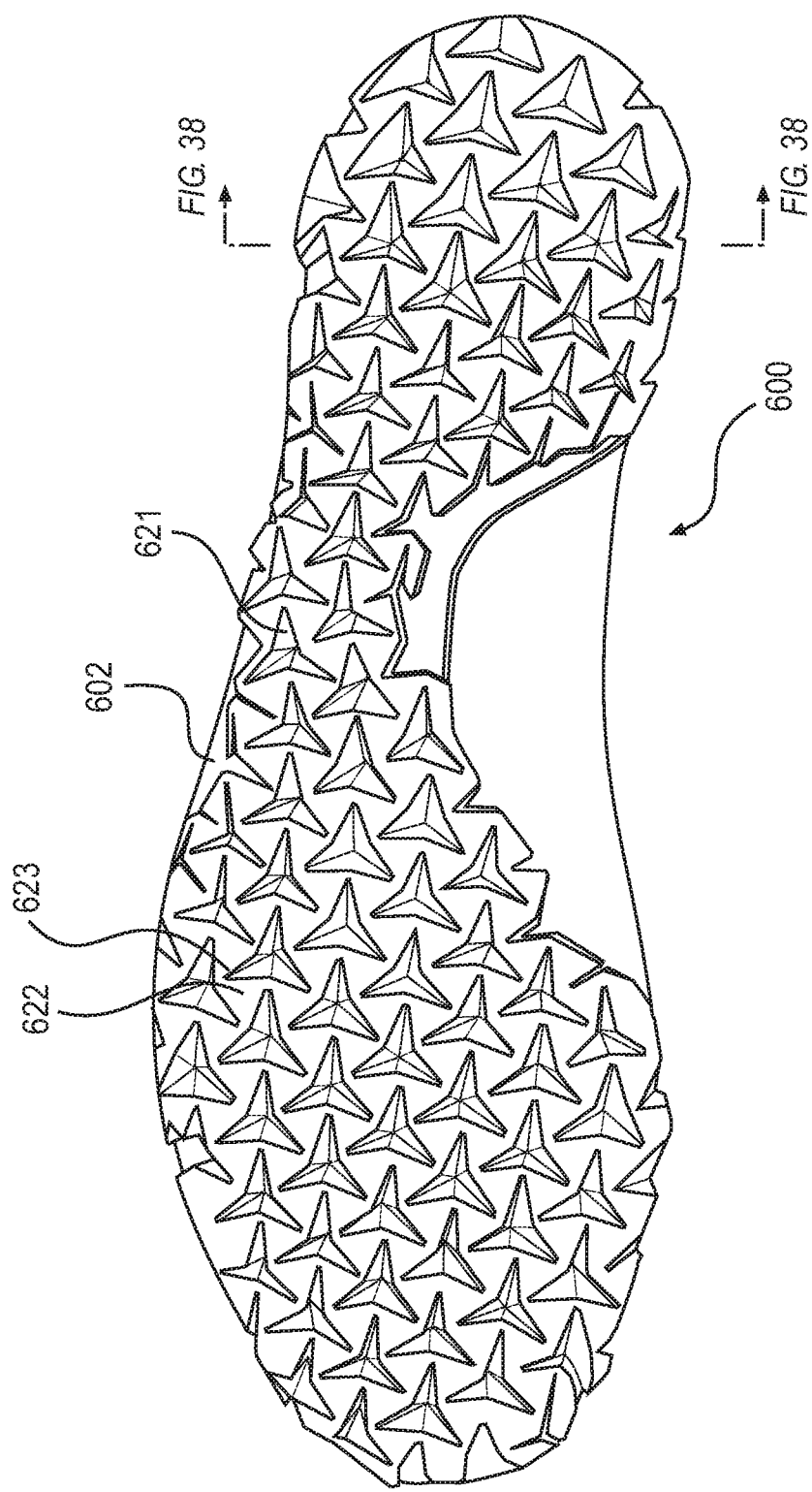
FIG. 33 is a schematic diagram of the outsole of the article of footwear of FIG. 32 showing its auxetic structure.
Figure 34:
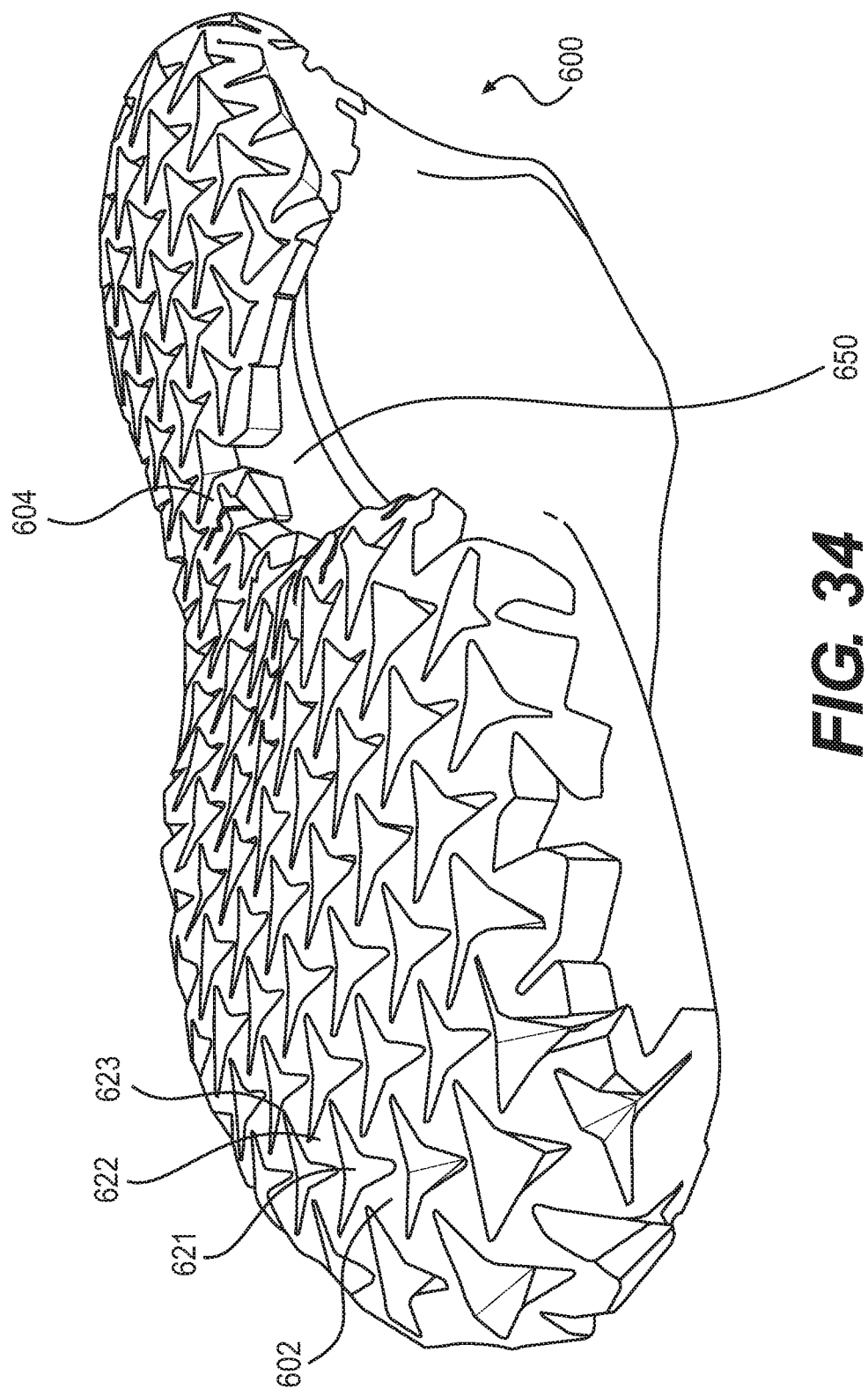
FIG. 34 is a schematic diagram of a side perspective view of the article of footwear of FIG. 32.

FIGS. 32-38 illustrate another embodiment of an article of footwear 600 with a sole having an auxetic structure that is light, flexible and comfortable. This article of footwear is suitable for use as a shoe for light jogging or walking. As shown in FIG. 32, this embodiment has an open knit upper 601, an outsole 602 made of an auxetic structure, and a midsole 603. FIG. 32 shows that the polymer material forming outsole 602 curves up around the back 631 of the heel 630 of the footwear, providing additional reinforcement, support and protection at the back of the heel. As shown in FIG. 33 and FIG. 34, outsole 602 has a pattern of reentrant triangular apertures 621 formed by the triangles 622 that are joined at their vertices 623 to the vertices of other triangles. In this embodiment, the size of reentrant triangular apertures 621 is relatively uniform all over outsole 602. When a portion of footwear 600 is under longitudinal or lateral tension due to an impact with the ground, that portion of outsole expands in both directions, thus absorbing the impact and improving traction as described above. Outsole 602 may be made by molding the auxetic structure shown in FIGS. 33-35 into a synthetic rubber, polyurethane or thermoplastic polyurethane material.

Figure 35:
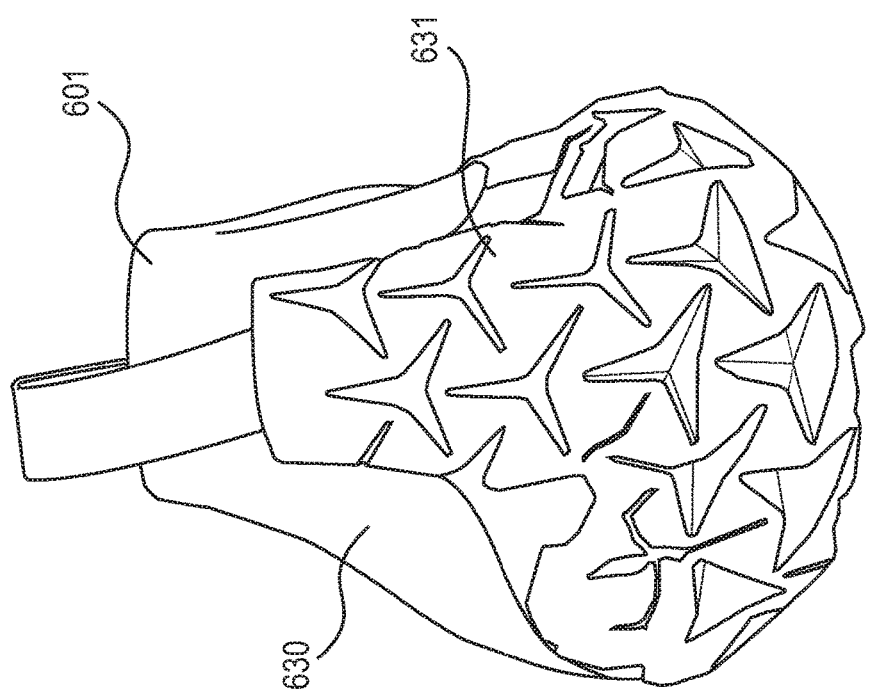
FIG. 35 is a schematic diagram of an enlarged perspective bottom view of the heel of the article of footwear of FIG. 32.

FIG. 35 is a schematic diagram of an enlarged view of the back 631 of heel 630 of article of footwear 600. As shown in FIG. 35, the back 631 of the heel 630 of upper 601 may be overlaid with the auxetic structure used for outsole 602 to strengthen the back of the heel. This may be fabricated by overmolding the fabric of upper 601 with a polymer such that the polymer infiltrates and bonds with the material of upper 601. As shown in FIG. 35, the auxetic structure has reentrant angles at the bottom side of the apertures, such that the auxetic structure expands laterally when it is under longitudinal tension. This effect facilitates pulling the shoe over the heel of the wearer's foot.

Figure 36:
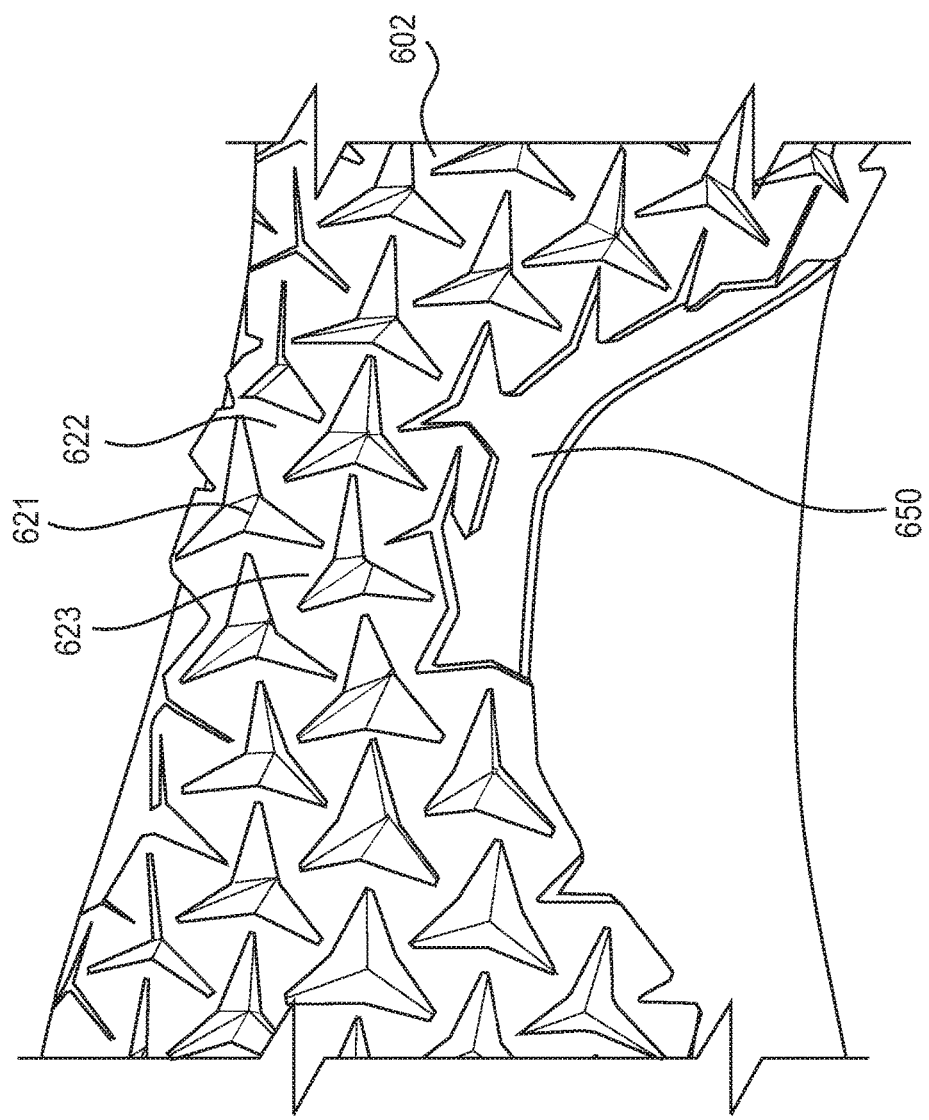
FIG. 36 is a schematic diagram of an enlarged view of a midfoot portion of the outsole of the article of footwear of FIG. 32.

As best shown in FIG. 36 and also shown in FIG. 34, the flexibility of footwear 600 is enhanced by carve-out 650 at the instep region 604 of outsole 602. Carve-out 650 limits outsole 602 to just the lateral side of the footwear at instep region 604, thus providing less resistance to the upward bending of the heel with respect to the forefoot. This structure provides a comfortable, low-stress article of footwear that is particularly suitable for activities such as jogging or walking.

Figure 38:
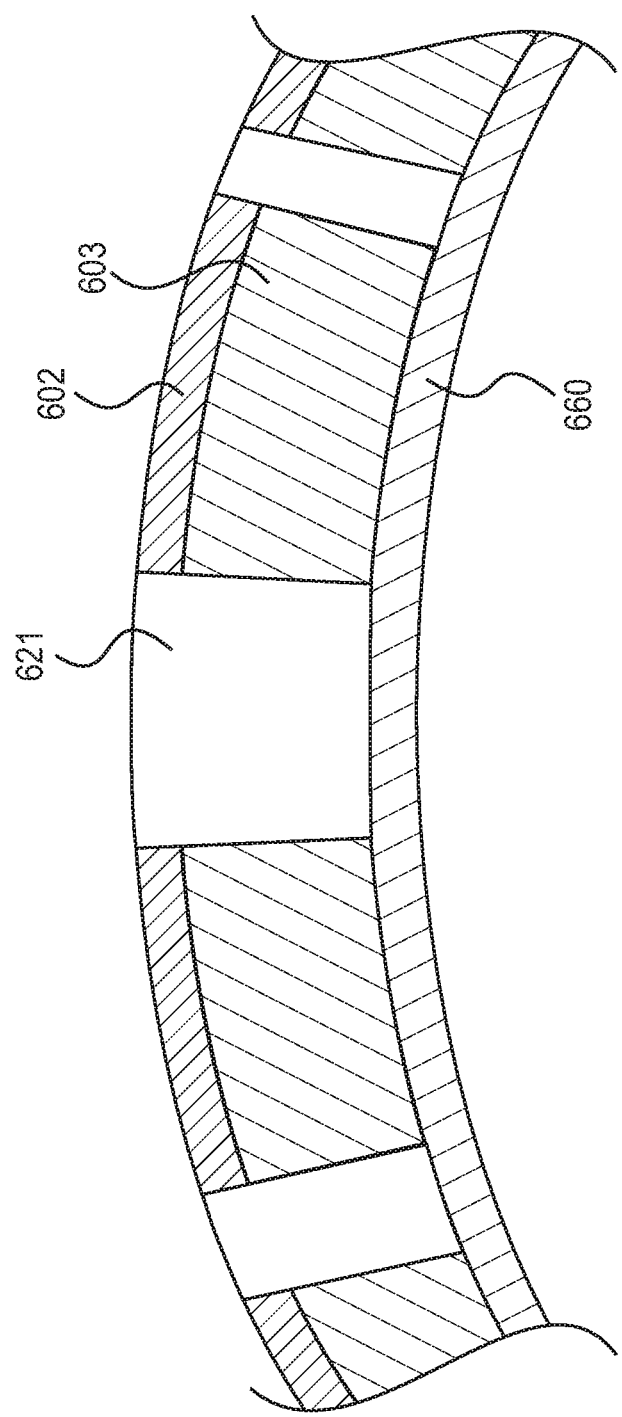
FIG. 38 is a schematic diagram of a cross-section of the article of footwear of FIG. 32 taken at the forefoot.

FIG. 37 is a schematic diagram showing that, in this embodiment, upper 601 is sown to an insole 660 by stitching 661. Outsole 602 can then be attached to the bottom of insole 650 by using adhesives, for example, or by other means, such as by fusing, molding or stitching. FIG. 38 is a cross-section across a portion of the forefoot of article of footwear 600 at as indicate in FIG. 33, showing insole 660, openings 621 and outsole 602 as well as midsole 603, which is optional.

FIGS. 39-43 are schematic diagrams of an article of footwear 700 that could be used, for example, as a running shoe for running on hard surfaces such as a paved road or an indoor track, where the runner would be pounding the footwear against the ground. This embodiment has a woven fabric upper 701 and a molded hard rubber or polyurethane outsole 702.

Figure 40:
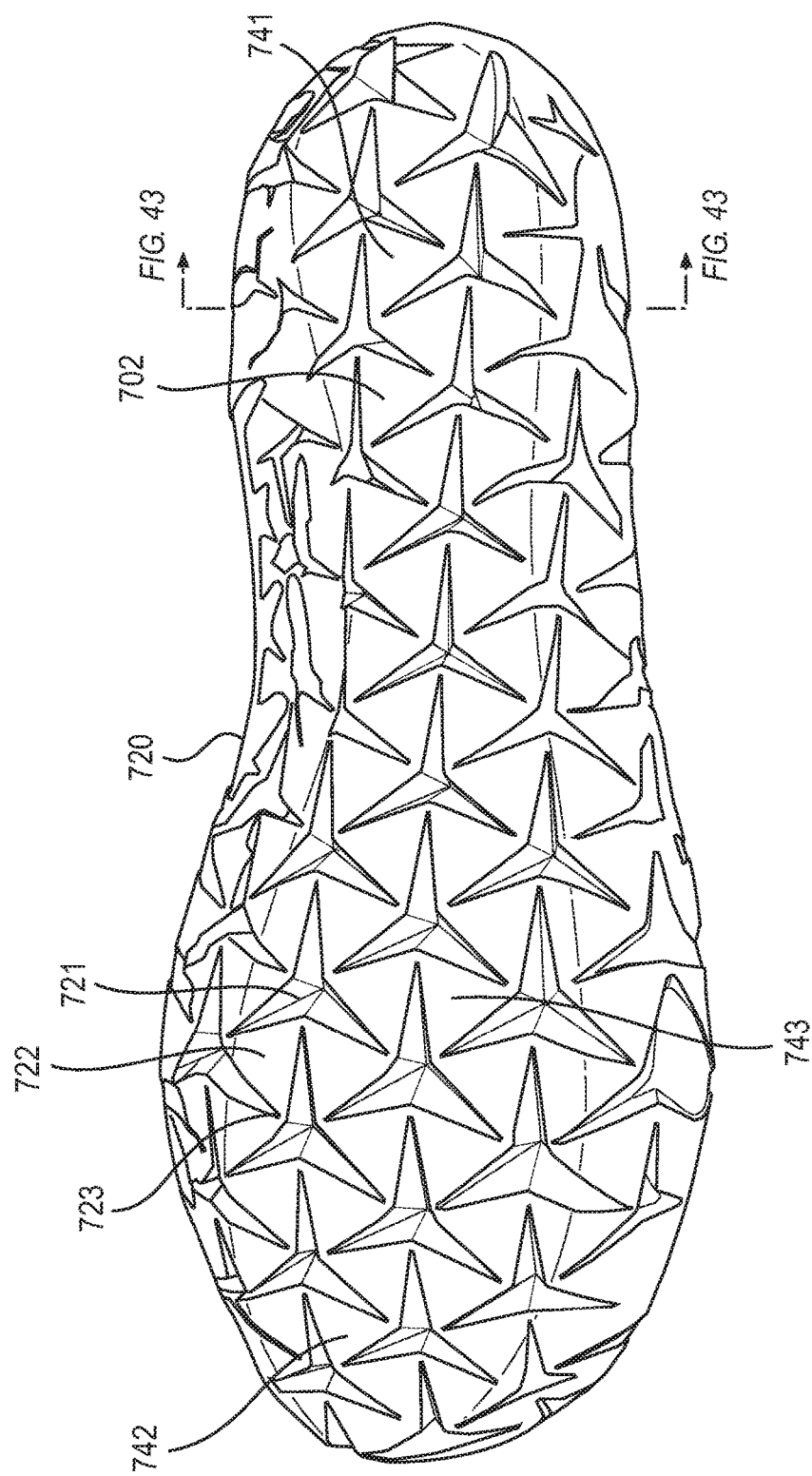
FIG. 40 is a schematic diagram of a bottom view of the outsole of the article of footwear of FIG. 39.

As shown in FIG. 40, outsole 702 bears a pattern of hexagonal patterns 720 with reentrant triangular apertures 721 formed by triangles 722 that are joined at their vertices 723 such that they function as hinges, allowing triangles 722 to rotate with respect to each other in response to longitudinal or lateral tension. When any part of the outsole hits the ground or a playing surface, the vertical compression of the outsole forces the triangles towards the center of the hexagonal patterns, i.e., the triangular star-shaped apertures collapse towards their centers. This increases the density of the outsole in the area of impact, and attenuates the impact force. The pattern in outsole 702 may be formed by molding the outsole material to form the pattern, or by cutting triangular star-shaped sections out of a solid material.

Figure 41:
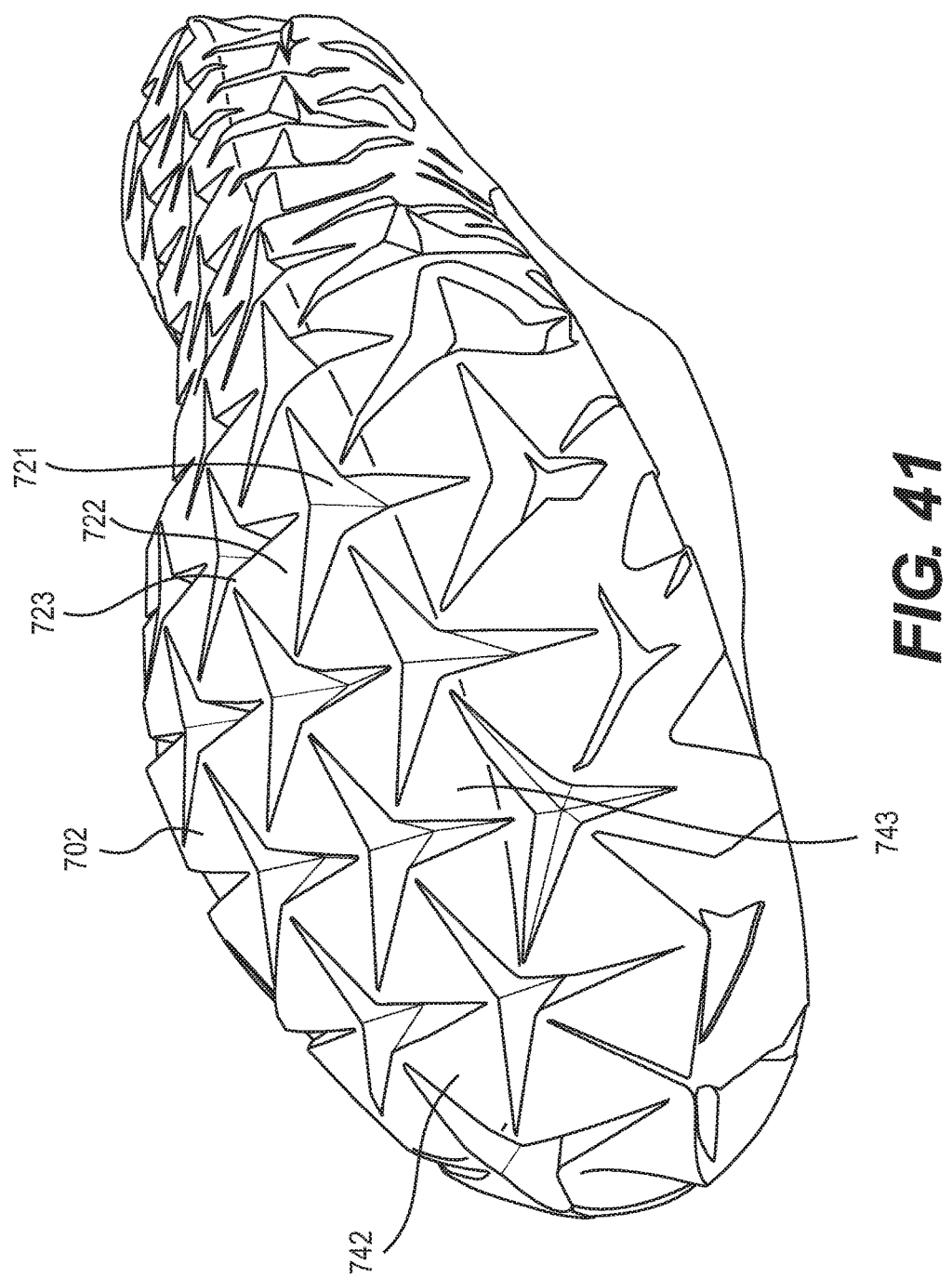
FIG. 41 is a schematic diagram of an enlarged perspective bottom view of the forefoot region of the article of footwear of FIG. 39.

In this embodiment, the hexagonal patterns have roughly the same size from the heel to the toe of the foot, with one hexagonal feature 741 directly under the wearer's heel and several hexagonal patterns 743 under the ball of the wearer's foot, as best shown in FIG. 41. As best shown in FIG. 40, outsole 702 also has one hexagonal feature 742 directly under the wearer's big toe. Hexagonal patterns 720 towards the medial, lateral, front or rear portions of outsole 702 curve upwards from the outsole and are attached to the fabric of upper 701 by overmolding or by using adhesives.

Figure 39:
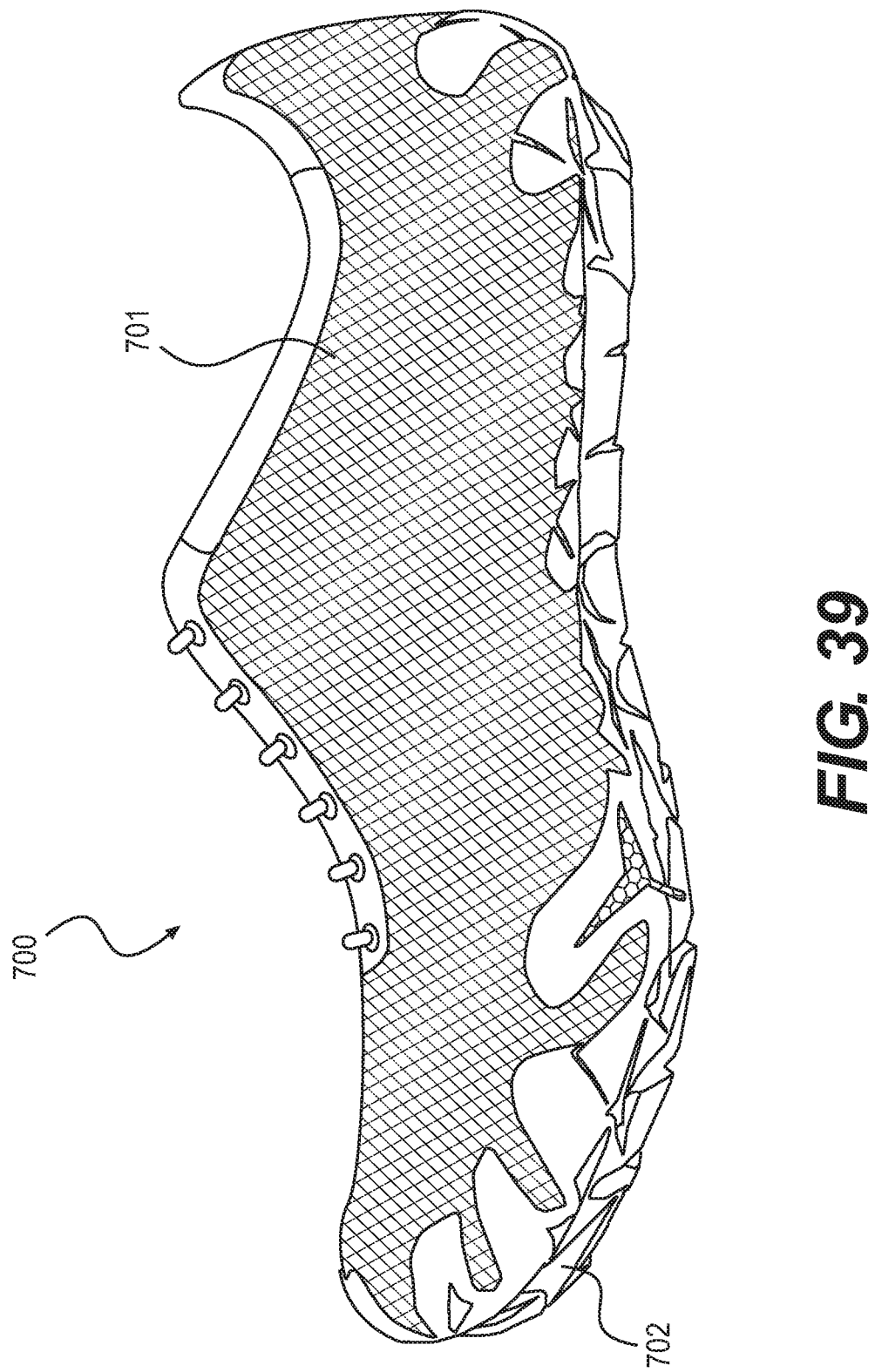
FIG. 39 is a schematic diagram of a side view of a running shoe with a woven upper including an auxetic sole structure.
Figure 42:
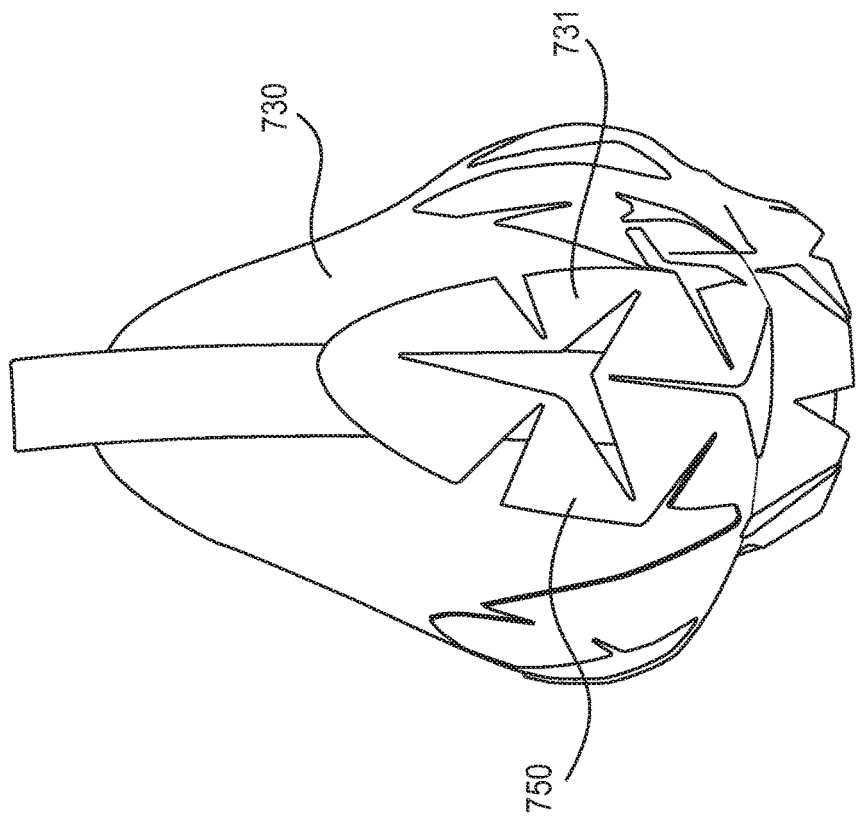
FIG. 42 is a schematic diagram of an enlarged perspective view of the heel of the article of footwear of FIG. 39.

As shown in FIG. 42, the back 731 of the heel 730 of the upper 701 is reinforced with an overmolded or otherwise attached portion of hard rubber or polyurethane 750 bearing the hexagonal feature of a reentrant triangular aperture formed by triangles joined at their vertices. When the footwear is pulled over the heel of the wearer's foot, the reentrant triangular aperture expands laterally, allowing the footwear to slip more easily over the wear's heel. FIG. 39 and FIG. 42 show that portions of the sole material may be molded over the fabric of upper 701, providing reinforcement and abrasion resistance to its lower edges.

Figure 43:
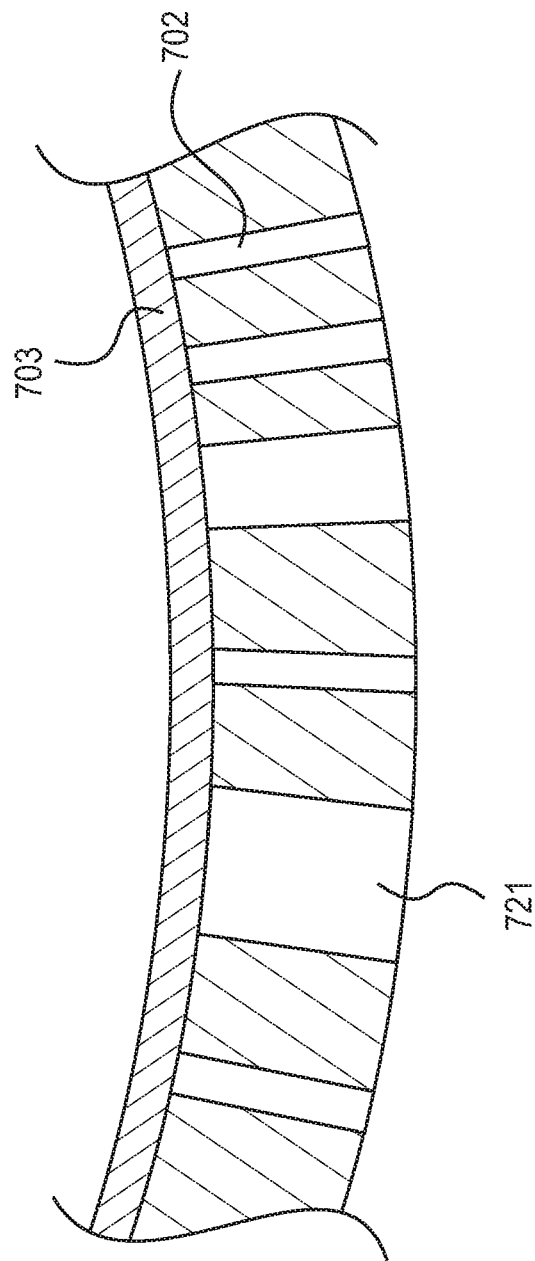
FIG. 43 is a schematic diagram of a cross-section of the article of footwear of FIG. 39.

FIG. 43 is a schematic diagram cross-section of the embodiment of FIG. 39 taken at the forefoot, just in front of the laces as shown in FIG. 40. This diagram shows outsole 702 with apertures 721 attached to a resilient inner sole 703. Outsole 702 may be attached to inner sole 703 by using adhesives, overmolding or any other suitable means.

Figure 44:
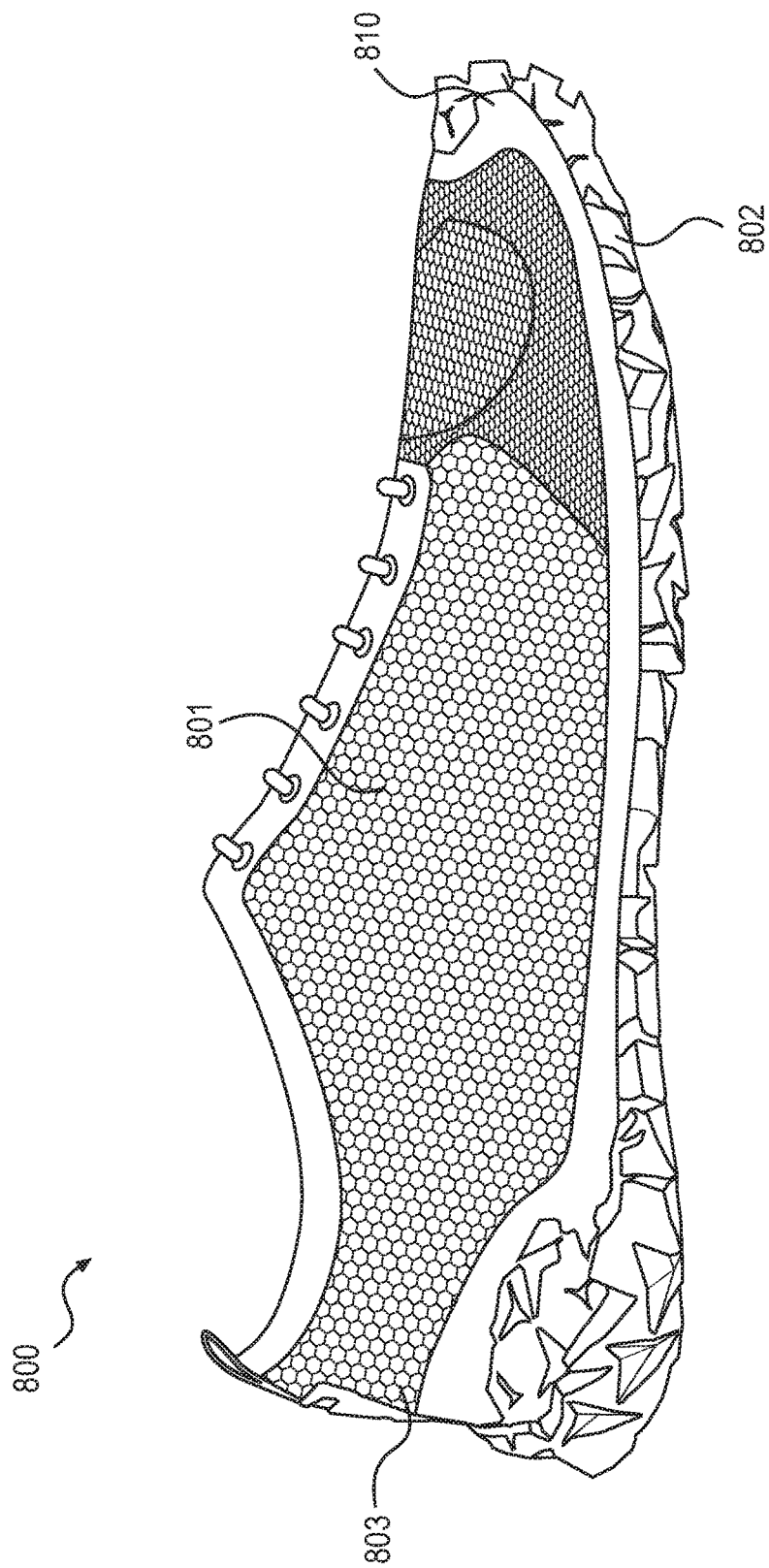
FIG. 44 is a schematic diagram of a side view of another embodiment of a shoe with an upper and a outsole having an auxetic structure.
Figure 45:
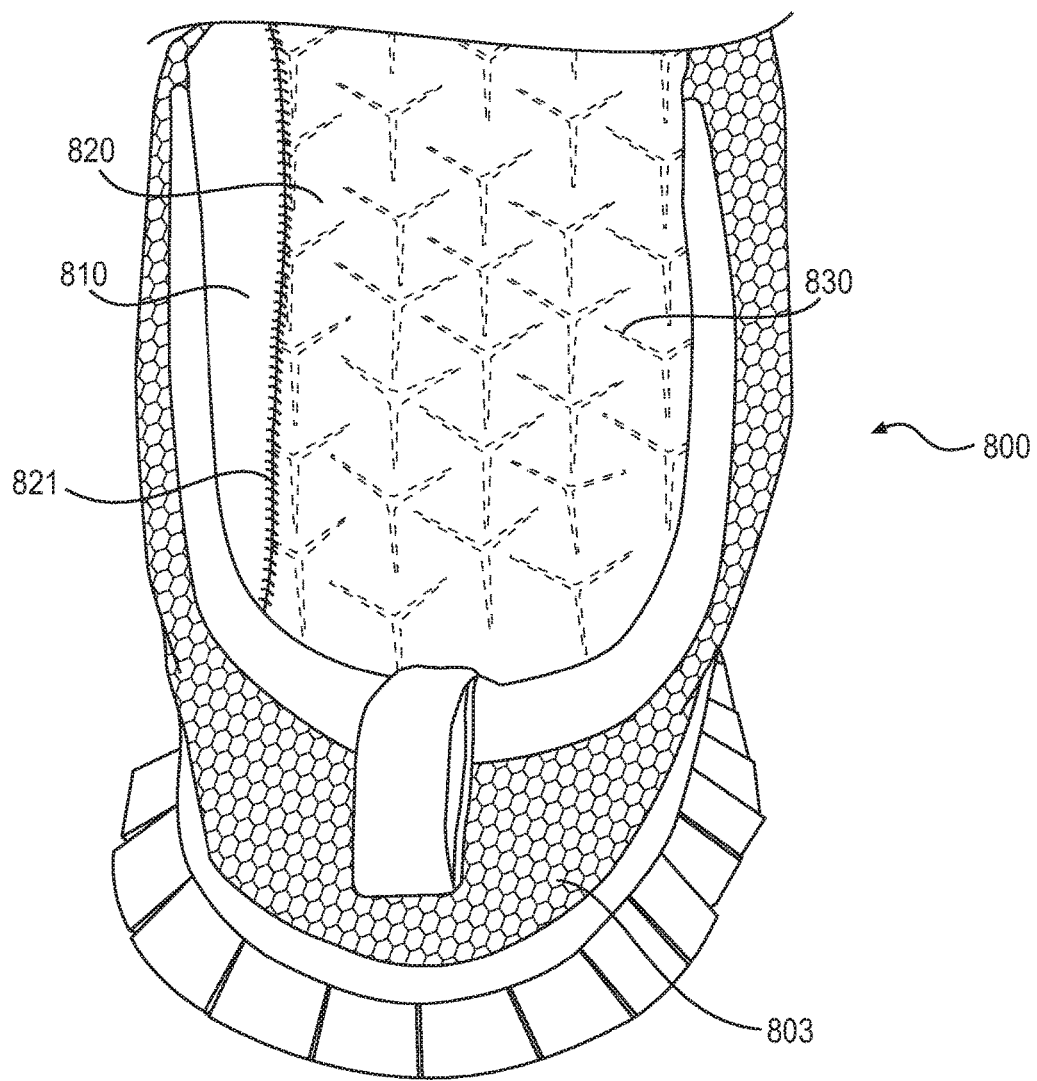
FIG. 45 is a schematic diagram of the interior of the article of footwear of FIG. 44 at the heel region of the shoe.

FIG. 44 is a schematic diagram of another embodiment of a shoe 800 that could be used for running or other sports or recreational activities. This shoe is generally similar to the shoe shown in FIG. 32, but it has an additional peripheral band 810 of material connecting sole 802 to upper 801. Peripheral band 810 extends around the entire periphery of sole 802 and upper 801. FIG. 45 is a schematic diagram of an interior view of shoe 800 at its heel region 803, showing insole 820 attached to the bottom edge of peripheral band 810 using stitching 821. The top edge of peripheral band 810 is attached to the bottom edge of upper 801. Other methods of attaching peripheral bands 810 to the insole and to the upper may also be used. Peripheral band 810 provides additional flexibility to shoe 800 by decoupling sole 802 from upper 801, thus allowing sole 802 to expand without being constrained by upper 801. The pattern of apertures 830 in the midsole can be seen under insole 820.

The auxetic structures used for the outsoles and midsoles shown in these figures can be manufactured by molding a conventional polymer (such as EVA, rubber, polyurethane or thermoplastic polyurethane) to have the pattern of joined triangles or polygons with triangular or polygonal apertures as described herein. The structures could also be manufactured by casting a solid polymer sheet and cutting the desired patterns into the sheet. For example, the auxetic structure shown in FIGS. 4-15 may be produced by molding a polymer to have the desired pattern, whereas the auxetic structure shown in FIGS. 16-19 may be produced by cutting the patterns into a polymer sheet.

In some of the sole structures described above the whole extent of the sole is made of an auxetic structure. However, that is not a requirement for all embodiments. For example, embodiments may use the auxetic structure described above in any one, two or three of the heel region, the midfoot region and the forefoot region of the sole, or throughout the sole. The sole may have a single outsole layer. It may alternatively have an outsole and an inner sole, or an outsole, a midsole and an inner sole, or an outer covering, an outsole, a midsole and an inner sole, or any combination of the above. It may have even more layers, as long as the sole exhibits an auxetic structure such that, when under tension in one direction, it expands in the direction orthogonal to the direction of the tension.

The descriptions above have described auxetic structures using hexagonal patterns formed of hinged triangles that have openings that increase in both length and width when under longitudinal tension and also increase in both width and length when under lateral tension. These structures could also be formed using auxetic foam material, which is a material with a negative Poisson's ratio, such that the resulting structure expands in the direction orthogonal to an applied tension both because of its intrinsic properties and because the material itself is intrinsically auxetic.

The present embodiments depict auxetic structures that have a substantial thickness in comparison to some other kinds of auxetic materials. Generally, the thickness of an auxetic structure, such as an outsole comprising an auxetic structure, can vary. In some embodiments, an auxetic structure forming part of a sole structure may have a thickness greater than or equal to a millimeter. In some embodiments, an auxetic structure can have a thickness greater than five millimeters. In some embodiments, an auxetic structure can have a thickness greater than ten millimeters. In still other embodiments, the auxetic structure can have a thickness greater than ten millimeters. Moreover, the thickness of the auxetic structure can be selected in order to achieve desired properties such as cushioning and support.

Figure 46:
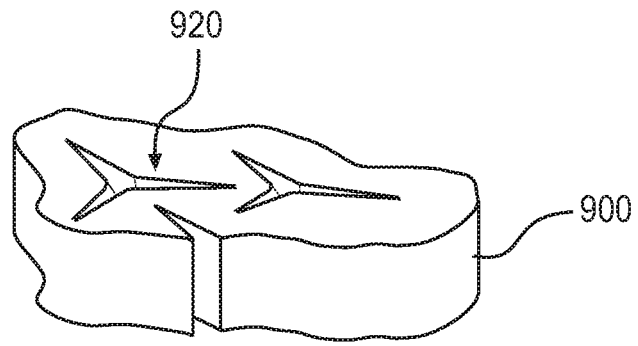
FIG. 46 is a schematic view of a portion of an outsole with apertures in a non-compressed configuration.
Figure 47:
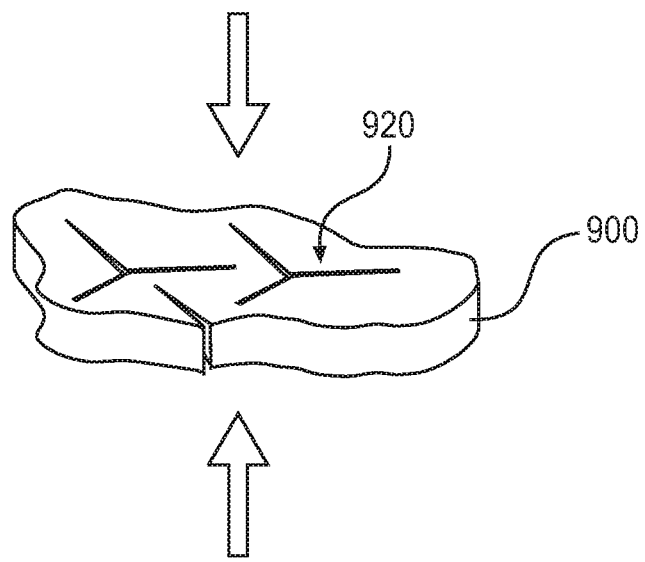
FIG. 47 is a schematic view of a portion of an outsole with apertures in a compressed configuration.

In some embodiments, the thickness of an auxetic structure in a sole can be used to enhance cushioning effects provided by the auxetic structure. FIGS. 46 and 47 illustrate how one or more apertures may change under applied compressive forces, which may generally be applied in the vertical direction. When the outsole is compressed, for example when the outsole hits the ground, the triangles tend to collapse towards the centers of their respective triangular apertures, thus increasing the material within the region of impact, and further cushioning the impact. On the other hand, when a portion of the outsole is under tension, for example when the wearer is pushing off from his or her forefoot, that portion of the outsole expands in the lateral as well as in the longitudinal direction, providing improved traction.

As seen in FIG. 46, with no compressive forces applied, apertures 920 of a portion of an outsole 900 (shown schematically) may initially be open. However, as compressive forces are applied, as shown in FIG. 47, apertures 920 may close. This may generally occur because the triangular portions 922 that surround apertures 920 may tend to expand in size under the compressive forces (due to mass conservation). This results in an inward contraction of apertures 920, which may have reduced opening sizes, or may completely close (as in FIG. 40). In particular, triangular portions 922 may be forced towards the centers of apertures 920.

For consistency and convenience, further directional adjectives are employed throughout this detailed description corresponding to the illustrated embodiments. It will be understood that each of these directional adjectives may be applied to individual components of a sole or an article of footwear. It should be understood that embodiments discussed below may include one or more features or characteristics that have been described earlier in this detailed description.

The term "forward" is used to refer to the general direction in which the toes of a foot point, and the term "rearward" is used to refer to the opposite direction, i.e., the direction in which the heel of the foot is facing. The term "horizontal," as used throughout this detailed description and in the claims, refers to any direction substantially parallel with the ground, including the longitudinal direction, the lateral direction, and all directions in between. Similarly, the term "side," as used in this specification and in the claims, refers to any portion of a component facing generally in a lateral, medial, forward, and/or rearward direction, as opposed to an upward or downward direction.

The term "upward" refers to the vertical direction heading away from a ground surface, while the term "downward" refers to the vertical direction heading towards the ground surface. Similarly, the terms "top," "upper portion," "upper surface," and other similar terms refer to the portion of an object substantially furthest from the ground in a vertical direction, and the terms "bottom," "bottom surface", "lower," and other similar terms refer to the portion of an object substantially closest to the ground in a vertical direction.

Furthermore, the term "outer surface," as used throughout this detailed description and in the claims, refers to the surface of a component that is exposed to the outer environment, or the surface that would be facing away from the foot when worn by a wearer. "Inner surface," as used throughout this detailed description and in the claims, refers to the surface of a component that is facing inward, or the surface that faces toward the foot when worn by a wearer.

For purposes of this disclosure, the foregoing directional terms, when used in reference to an article of footwear, shall refer to the article of footwear when sitting in an upright position, with the sole facing groundward, that is, as it would be positioned when worn by a wearer standing on a substantially level surface.

As described in relationship to FIGS. 4 and 5, in different embodiments, an article of footwear may include apertures 321 where an aperture forms a hole or space all the way through the outsole. Such apertures may be referred to as "through-hole apertures". In some embodiments, through-hole apertures may extend from the inner surface of outsole 320 to the outer surface of outsole 320. However, in other embodiments, outsole 320 need not include any through-hole apertures, or outsole 320 may include one or more through-hole apertures as well as one or more non through-hole apertures. It should be noted that in some embodiments, one or more apertures 321 may be blind holes, so that the opening of the aperture is only on one side or surface of outsole 320.

Figure 48:
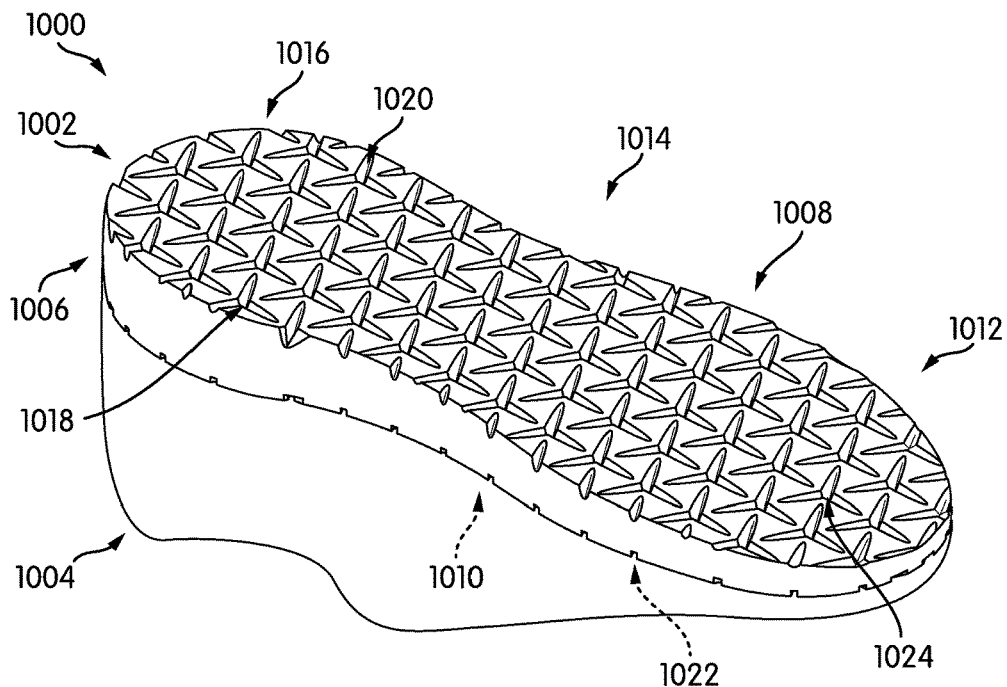
FIG. 48 is an isometric view of an embodiment of the outer surface of a sole structure.
Figure 49:
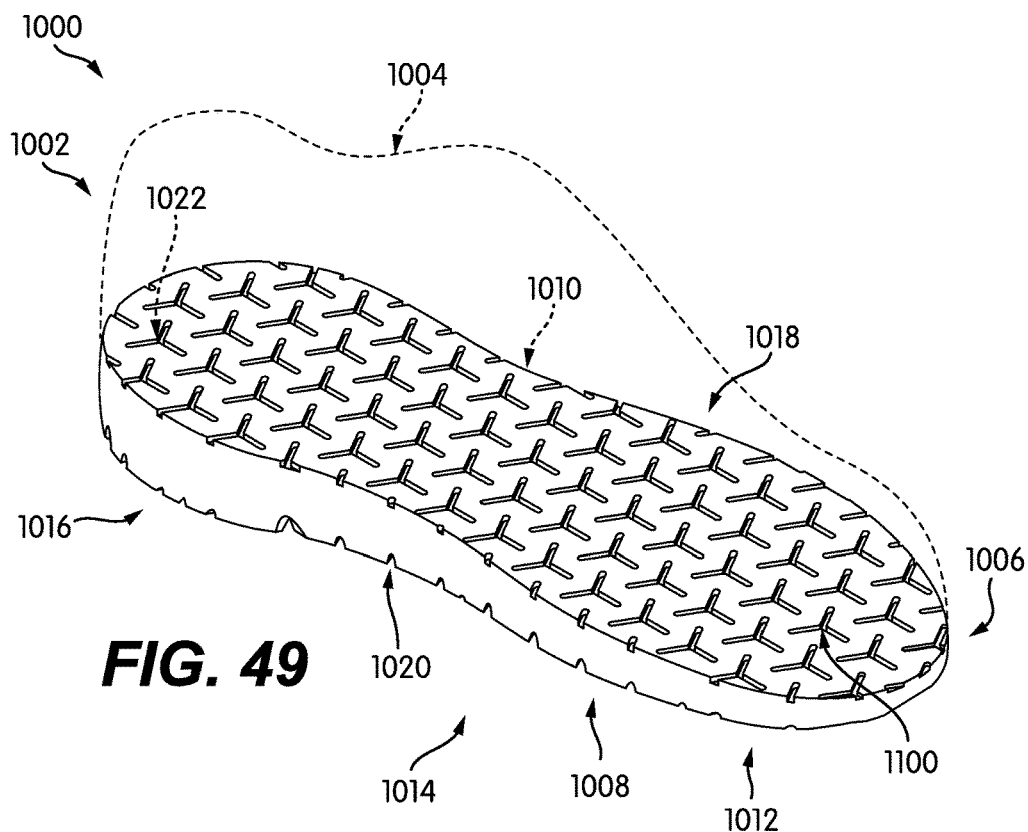
FIG. 49 is an isometric view of an embodiment of the inner surface of a sole structure.

Referring to FIGS. 48 and 49, an article of footwear ("article") 1000 is depicted, including a sole structure 1002 attached to an upper 1004 configured to receive a foot. Sole structure 1002 may be attached to a portion of upper 1004. Sole structure 1002 may also include an outsole 1006. The figure presents a bottom side view of outsole 1006, where an outer surface 1008 of outsole 1006 is facing upward, and an inner surface 1010 of outsole 1006 is facing downward.

Although the embodiments depict a sole structure 1002 comprised of an outsole 1006 having an auxetic structure, it will be understood that in other embodiments sole structure 1002 may be configured with other components having an auxetic structure. For example, the principles described herein as applying to outsole 1006 may also be used in other embodiments with a midsole and/or an insole. Moreover, the term outsole 1006 is not intended to be limiting to a particular kind of structure, geometry or material. Instead, outsole 1006 is used to denote a component of sole structure 1002 that may contact a ground surface. It is contemplated that in other embodiments, the auxetic features described herein may be used with a combination of a midsole and an outsole. In still other embodiments, the auxetic features of sole structure 1002 may be incorporated primarily into a midsole, and an outer ground contacting layer could be applied over a bottom surface of the midsole. In such an embodiment, the bottom ground contacting layer may not incorporate auxetic features but may be configured to accommodate the natural expansion of the auxetic layer under various stresses.

More generally, therefore, a sole structure 1002 can incorporate a sole component (such as an outsole, midsole, insole or combination of these components) that incorporates one or more auxetic features. For purposes of clarity, the auxetic features are described below and shown in the Figures as applied to an outsole. However, other embodiments may utilize any other kind of sole component with such features.

As shown in FIGS. 48 and 49, for reference purposes, article of footwear 1000 may be divided into three general regions, including a forefoot region 1012, a midfoot region 1014, and a heel region 1016. Forefoot region 1012 generally includes portions of article 1000 corresponding with the toes and the joints connecting the metatarsals with the phalanges. Midfoot region 1014 generally includes portions of article 1000 corresponding with an arch area of the foot. Heel region 1016 generally corresponds with rear portions of the foot, including the calcaneus bone. Forefoot region 1012, midfoot region 1014, and heel region 1016 are not intended to demarcate precise areas of article 1000. Rather, forefoot region 1012, midfoot region 1014, and heel region 1016 are intended to represent general relative areas of article 1000 to aid in the following discussion.

In different embodiments, there may be one or more apertures 1018 disposed along various areas of outsole 1006. In some embodiments, apertures 1018 may be concave, so that they are formed inward toward the interior material of outsole 1006. In other embodiments, apertures 1018 may be defined by the surrounding material of outsole 1006. In one embodiment, apertures 1018 may have various predetermined regions of bending/folding, such that when vertically compressed they unfold and extend in horizontal direction. In some embodiments, apertures 1018 may be disposed along sole structure 1002 in a way that allows them to function together and to achieve auxetic behavior.

As shown in FIGS. 48 and 49, in some embodiments, apertures 1018 may be disposed along outer surface 1008 of outsole 1006. Apertures 1018 disposed along outer surface 1008 of outsole 1006 may be referred to as outer recesses 1020. In other embodiments, apertures may be disposed along inner surface 1010 of outsole 1006. Apertures 1018 disposed along inner surface 1010 of outsole 1006 may be referred to as inner recesses 1022. In FIG. 48, a first outer recess 1024 is shown and in FIG. 49, a first inner recess 1100 is shown. Apertures 1018, outer recesses 1020, and/or inner recess 1022 disposed on outsole 1006 may also be referred to as forming an auxetic pattern on outsole 1006.

Apertures 1018, including outer recesses 1020, and inner recesses 1022, may include a wide variety of characteristics, sizes, geometry, patterns, and functions. Furthermore, apertures 1018 may encompass one or more characteristics, functions, features, qualities and/or other aspects described with regard to aperture 131, aperture 321, aperture 421, aperture 521, aperture 621, aperture 721, aperture 830, and/or aperture 920, which have been discussed above and shown in FIGS. 1-47.

As described previously, apertures 1018 may comprise various shapes. For example, in the embodiments shown in FIGS. 48-62, apertures 1018 and other portions of outsole 1006 may be configured in a geometric pattern that provides an auxetic structure to at least some portions of sole structure 1002. As described previously, sole structure 1002 may include an auxetic structure that, when placed under tension in a first direction, can increase in size both in the first direction and in the direction in the plane of the structure that is orthogonal to the first direction. In some embodiments, outsole 1006 may be at least partially an auxetic structure. Inclusion of an auxetic structure may allow outsole 1006 to better conform to various foot shapes and allow more natural curvature.

In different embodiments, apertures 1018 may be used to form auxetic structures in outsole 1006. Apertures 1018 may comprise various convex portions with hinge areas and/or geometric features or portions. In some embodiments, apertures 1018 may be any shape or geometry, including irregular or regular shapes. In some embodiments, for example, various non-polygonal or polygonal portions may be used to form auxetic structures. Portions may include triangular, quadrilateral, pentagonal, hexagonal, heptagonal, octagonal, or other irregular portions. Polygonal portions may be used to form, in some cases, three-pointed star-shaped apertures, four-pointed star-shaped apertures, five-pointed star-shaped apertures, or six-pointed star-shaped apertures and recesses.

In the embodiment of FIGS. 48-62, apertures 1018 are depicted as having a generally three-pointed triangular star shape. As shown with respect to first outer recess 1024 in FIGS. 50 and 51, one or more of outer recesses 1020 may have a substantially three-pointed star cross-sectional shape in a substantially horizontal plane. In some embodiments, one or more outer recesses 1020 may have a substantially three-pointed star cross-sectional shape over substantially the entire height of the opening comprising outer recesses 1020. The height may be defined by one or more aperture walls 1224 formed along the interior of outsole 1006. Accordingly, first outer recess 1024 may extend in an upward direction from outer surface 1008 of outsole 1006 to an area within an interior region 1300 of outsole 1006. This area may be referred to as a first interior surface 1220 of outsole 1006. First outer recess 1024 may have a first height H1 extending from outer surface 1008 of outsole 1006 to an apex 1200 of first outer recess 1024. First height H1 may represent the maximum height of first outer recess 1024 in some embodiments. Apex 1200 may be disposed along any portion of first outer recess 1024, and may occur along more than one area or point of first outer recess 1024, such that first outer recess 1024 has first height H1 at multiple points. Apex 1200 may represent the area of first outer recess 1024 farthest from outer surface 1008, and closest to inner surface 1010. Apex 1200 may be flat, pointed, curved, or rounded in some embodiments.

Similarly, in some embodiments, one or more of inner recesses 1022 may have a substantially three-pointed star cross-sectional shape in a substantially horizontal plane. In some embodiments, one or more inner recesses 1022 may have a substantially three-pointed star cross-sectional shape over substantially the entire depth of the opening comprising inner recesses 1022. The depth may be defined by one or more aperture walls 1224 formed along interior of outsole 1006. Accordingly, first inner recess 1100 may extend in a downward direction from inner surface 1010 of outsole 1006 to an area within interior region 1300 of outsole 1006. This area may be referred to as a second interior surface 1222 of outsole 1006. First inner recess 1100 may have a first depth D1 extending from inner surface 1010 of outsole 1006 to a nadir 1202 of first inner recess 1100. First depth D1 may represent the maximum depth of first inner recess 1100 in some embodiments. Nadir 1202 may be disposed along any portion of first inner recess 1100, and may occur along more than one area or point of first inner recess 1100, such that first inner recess 1100 has a first depth D1 at multiple points. Nadir 1202 may represent the area of first inner recess 1100 farthest from inner surface 1010, and closest to outer surface 1008. Nadir 1202 may be flat, pointed, curved, or rounded in some embodiments.

Figure 51:
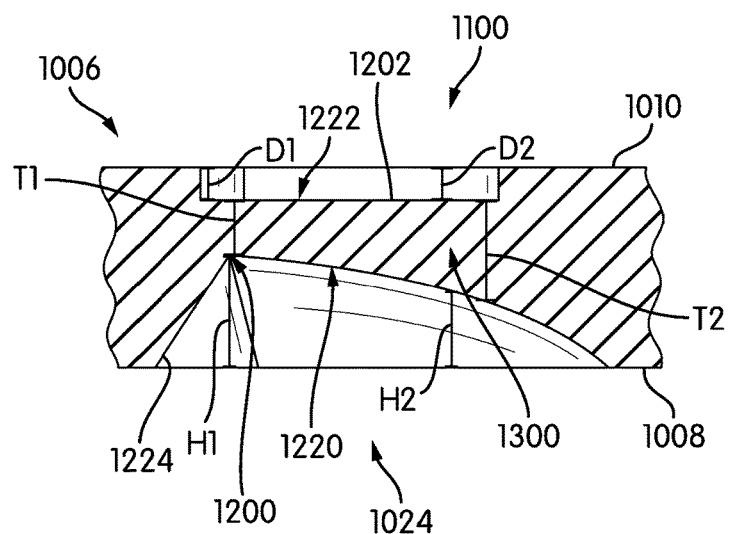
FIG. 51 is a cross-sectional view of a portion of an embodiment of an outsole with apertures.

In some embodiments, first inner recess 1100 and first outer recess 1024 may have varying heights and/or depths within each aperture. In other embodiments, first inner recess 1100 and first outer recess 1024 may be substantially similar in height and/or depth. For example, in FIG. 51, first inner recess 1100 has a second depth D2 and first outer recess 1024 has a second height H2. As each aperture may vary in geometry or have an irregular shape, it should be understood that second depth D2 may differ from first depth D1, and second height H2 may differ from first height H1. In FIG. 51, second height H2 is less than first height H1, and first depth D1 is approximately equal to second depth D2. In other embodiments, second height H2 may be greater than or equal to first height H1, and first depth D1 may be greater than or less than second depth D2. In some embodiments, first height H1, second height H2, first depth D1 and/or second depth D2 may be substantially similar to one another, and in other embodiments, one or more of first height H1, second height H2, first depth D1, and/or second depth D2 may differ.

Furthermore, though they can be similar in some respects, outer recesses 1020 and inner recesses 1022 can vary in other respects. For example, in some embodiments, first outer recess 1024 may include a geometric pattern that provides an auxetic structure to at least some portions of sole structure 1002, while first inner recess 1100 provides different feature(s). In some embodiments, first inner recess 1100 may include a geometric pattern that provides an auxetic structure to at least some portions of sole structure 1002, while first outer recess 1024 provides different feature(s). In one embodiment, first inner recess 1100 may have non-polygonal portions that form auxetic structures, and first outer recess 1024 may have polygonal portions that form auxetic structures. In another embodiment, first outer recess 1024 may have non-polygonal portions that form auxetic structures, and first inner recess 1100 may have polygonal portions that form auxetic structures. In some embodiments, first inner recess 1100 may include regular shaped portions, and first outer recess 1024 may include irregular shaped portions. In other embodiments, first outer recess 1024 may include regular shaped portions, and first inner recess 1100 may include irregular shaped portions. In some embodiments, the volume comprising first inner recess 1100 may be greater than or less than first outer recess 1024. In other embodiments, outer recesses 1020 and inner recesses 1022 may be substantially similar in shape, volume, and/or other features.

Differences in the depths of inner recesses 1022, the heights of outer recesses 1020, and/or the auxetic shapes of apertures 1018 can permit greater variation in the flexibility and expansion properties available to the sole component. In some cases, some regions of outsole 1006 may include inner recesses 1022 with greater depths and outer recesses 1020 with greater heights. This may provide a higher degree of bendability in that region. In another case, one region of outsole 1006 may include diamond shaped auxetic structures, while another region includes triangular shaped auxetic structures. The expansion features of these regions can vary as a result of changes in auxetic geometry.

Furthermore, the orientation of outer recesses 1020 and inner recesses 1022 may vary in different embodiments. In the embodiment depicted in FIG. 50, first inner recess 1100 is further depicted as having a first inner arm 1204, a second inner arm 1206, and a third inner arm 1208. Each of these arms is joined together at an inner arm center 1216 of first inner recess 1100. Angle P1 is associated to the angle between second inner arm 1206 and third inner arm 1208. First outer recess 1024 is depicted as having a first outer arm 1210, a second outer arm 1212, and a third outer arm 1214. Each of these arms is joined together at an outer arm center 1218 of first outer recess 1024. Angle P2 is associated with the angle between second outer arm 1212 and third outer arm 1214. In other embodiments, number, shapes, and size of arms, as well as the angles between arms, may differ from those depicted.

In some embodiments, the orientation of outer recesses 1020 and inner recesses 1022 may be altered by positioning arms so that one or more arms lie on a different axis. In one embodiment, arms may be rotated so that angle P1 and/or angle P2 may be increased or decreased. In another embodiment, one or more arms of first outer recesses 1024 may be rotated so that, for example, first outer arm 1210 of first outer recess 1024 is no longer aligned with first inner arm 1204 of first inner recess 1100. In other embodiments, some or all arms of apertures 1018 may be rotated so that the orientation of outer recesses 1020 and inner recesses 1022 are staggered or arranged in alternating or irregular patterns.

By varying the orientation of outer recesses 1020 and inner recesses 1022, outsole 1006 can bend in different directions along varying axes. In some cases, outer recesses 1020 and inner recesses 1022 may be oriented so that they provide a specific line of flexibility to the sole component.

In different embodiments, inner recess 1022 and outer recesses 1020 may include any number of arms. In some embodiments, one or more outer recesses 1020 may include fewer than three arms, or more than three arms. In other embodiments, one or more inner recesses 1022 may include fewer than three arms, or more than three arms. The number of arms selected for outer recesses 1020 and inner recesses 1022 may be related to the type of auxetic properties and/or auxetic structure(s) desired for outsole 1006.

In addition, first inner recess 1100 and first outer recess 1024 may differ significantly relative to one another in geometry, shape, volume, and other features. For example, in different embodiments, first depth D1 and first height H1 may vary. In some embodiments, first depth D1 may be greater than first height H1, and in other embodiments, first depth D1 may be less than first height H1. In one embodiment, first depth D1 may be substantially similar to first height H1. In one embodiment, first inner arm 1204, second inner arm 1206, and third inner arm 1208 of first inner recess 1100 may be more narrow or thinner in the horizontal direction relative to first outer arm 1210, second outer arm 1212, and third outer arm 1214 of first outer recess 1024. In other embodiments, first inner arm 1204, second inner arm 1206, and third inner arm 1208 of first inner recess 1100 may be more narrow or thinner in the horizontal direction relative to one another. In one embodiment, first outer arm 1210, second outer arm 1212, and third outer 1214 of first outer recess 1024 may be more narrow or thinner in the horizontal direction relative to one another.

In different embodiments, there may be a portion of interior region 1300 of outsole 1006 disposed between first inner recess 1100 and first outer recess 1024. In other words, in some embodiments, neither first inner recess 1100 nor first outer recess 1024 may extend completely through outsole 1006. In FIG. 51, it can be seen that first inner recess 1100 and first outer recess 1024 comprise separate compartments. In some embodiments, first inner recess 1100 and/or first outer recess 1024 may each comprise a blind hole. Interior region 1300 may define a first thickness T1 and a second thickness T2 of outsole 1006 between first inner recess 1100 and first outer recess 1024. In FIG. 51, first thickness T1 is depicted as less than second thickness T2.

Depending on several factors, including but not limited to the thickness of outsole 1006, the material comprising outsole 1006, and/or the shapes and volumes of first inner recess 1100 and first outer recess 1024, first thickness T1 and second thickness T2 may vary. In some embodiments, first thickness T1 and/or second thickness T2 may be greater, providing an increased distance between first inner recess 1100 and first outer recess 1024. In other embodiments, first thickness T1 and/or second thickness T2 may be less, providing a decreased distance between first inner recess 1100 and first outer recess 1024. In addition, first thickness T1 may be greater than, or equal to, second thickness T2.

Figure 50:
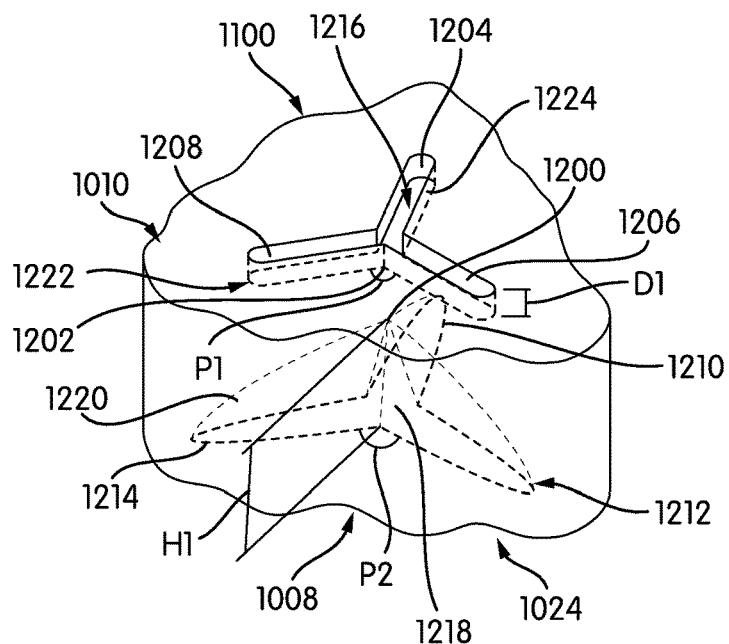
FIG. 50 is an isometric view of a portion of an embodiment of an outsole with apertures.
Figure 52:
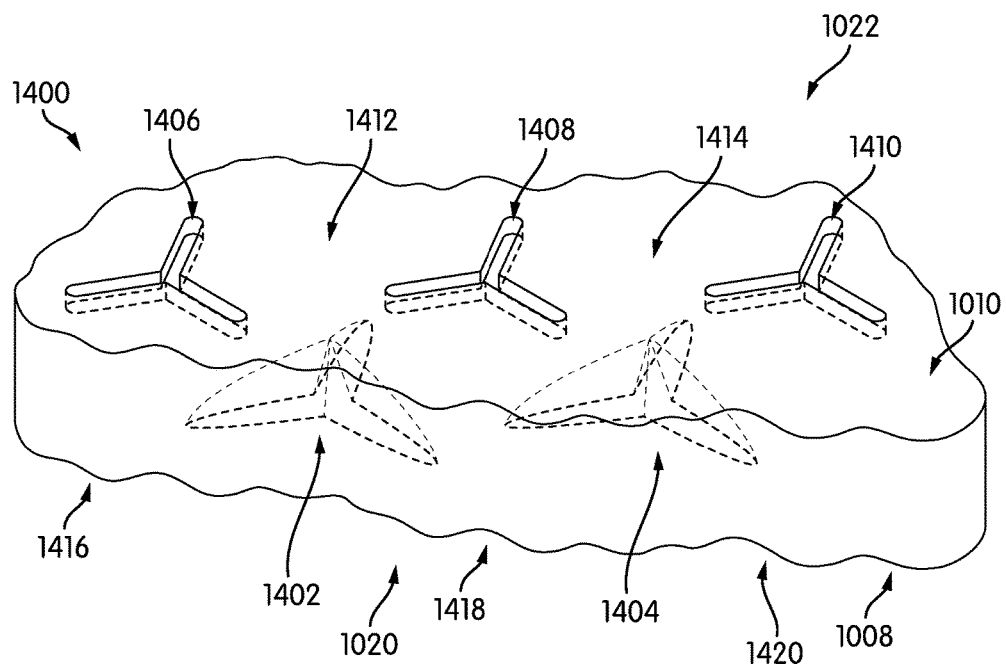
FIG. 52 is an isometric view of a portion of an embodiment of an outsole with apertures.
Figure 53:
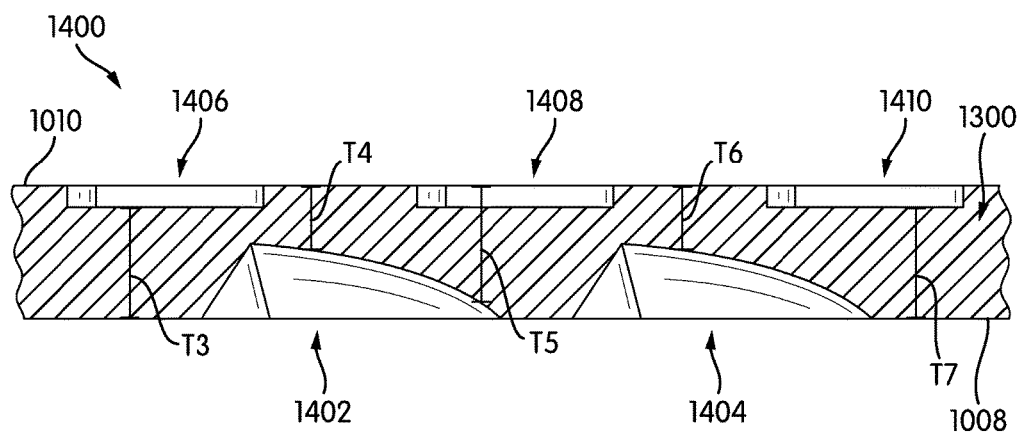
FIG. 53 is a cross-sectional view of a portion of an embodiment of an outsole with apertures.

In different embodiments, the arrangement of outer recesses 1020 and inner recesses 1022 can vary. In some embodiments, outer recesses 1020 and inner recesses 1022 can be positioned so that they are approximately directly opposite one another along outsole 1006, as seen in FIGS. 50 and 51. In other words, outer recesses 1020 and inner recesses 1022 may be directly aligned or correspond so that they generally line up in the vertical direction. In other embodiments, one or more outer recesses 1020 and inner recesses 1022 may provide a pattern including a staggered or interleaved arrangement. In FIGS. 52 and 53, one example of an interleaved arrangement is depicted. FIG. 52 is an isometric view of an embodiment of a portion of an outsole 1400. Outer recesses 1020 in FIG. 52 are disposed to generally correspond to areas of outsole 1400 disposed between inner recesses 1022. In the embodiment of FIG. 52, a second outer recess 1402 is disposed so that it is generally opposite to a first area 1412 along inner surface 1010 of outsole 1400, and a third outer recess 1404 is disposed generally opposite to a second area 1414 along inner surface 1010 of outsole 1400. In some cases, aligning inner recesses 1022 on one side of outsole 1006 with outer recesses 1020 along the other side can provide an enhanced auxetic capacity to the material.

Additionally, inner recesses 1022 in FIG. 52 are disposed so they generally correspond to areas of outsole 1400 disposed between outer recesses 1022. In the embodiment of FIG. 52, a second inner recess 1406 is disposed so that it is generally opposite to a third area 1416 along outer surface 1008 of outsole 1400, a third inner recess 1408 is disposed generally opposite to a fourth area 1418 along outer surface 1008 of outsole 1400, and a fourth inner recess 1410 is disposed generally opposite to a fifth area 1420 along outer surface 1008 of outsole 1400.

In other embodiments, the arrangement of outer recesses 1020 and inner recesses 1022 may be interleaved in some portions of sole structure 1002 as in FIG. 52, and may be directly aligned in other portions, as in FIG. 50. In some embodiments, outer recesses 1020 and inner recesses 1022 may be staggered or interleaved in a regular pattern in some portions, and in an irregular pattern in other portions of sole structure 1002. For example, in some embodiments, outer recesses 1020 may lie on a vertical plane closer to the center of inner recesses 1022, while remaining off-center (i.e., so that outer recesses 1020 and inner recesses 1022 are closer, but remain unaligned in the vertical direction).

As described earlier with reference to FIG. 52, in different embodiments, there may be areas of outsole 1006 disposed between outer recesses 1020 and inner recesses 1022, and/or there may be interior region 1300 material between one aperture and the outsole surface opposite the aperture. Thus, as depicted in FIG. 53, the openings of second outer recess 1402, third outer recess 1404, second inner recess 1406, third inner recess 1408, and fourth inner recess 1410 may not extend completely through outsole 1400. In addition, the thickness of interior region 1300 may vary in different areas of outsole 1400. In FIG. 53, it can be seen that second outer recess 1402, third outer recess 1404, second inner recess 1406, third inner recess 1408, and fourth inner recess 1410 comprise separate compartments. Interior region 1300 may define a third thickness T3 of outsole 1400 between second inner recess 1406 and outer surface 1008, a fourth thickness T4 of outsole 1400 between second outer recess 1402 and inner surface 1010, a fifth thickness T5 between third inner recess 1408 and a region of second outer recess 1402, a sixth thickness T6 between third outer recess 1404 and inner surface 1010, and a seventh thickness T7 of outsole 1400 between fourth inner recess 1410 and outer surface 1008. In FIG. 53, third thickness T3 is depicted as substantially equivalent to seventh thickness T7, and fourth thickness T4 is depicted as substantially equivalent to sixth thickness T6.

Depending on several factors, including but not limited to the thickness of outsole 1006, the material comprising outsole 1006, and/or the shapes and volumes of first inner recess 1100 and first outer recess 1024, third thickness T3, fourth thickness T4, fifth thickness T5, sixth thickness T6, and seventh thickness T7 may also vary. In some embodiments, third thickness T3, fourth thickness T4, fifth thickness T5, sixth thickness T6 and/or seventh thickness T7 may be greater, providing an increased distance between inner recesses 1022 and outer recesses 1020, an increased distance between inner recesses 1022 and outer surface 1008, or an increased distance between outer recesses 1020 and inner surface 1010. In other embodiments, third thickness T3, fourth thickness T4, fifth thickness T5, sixth thickness T6 and/or seventh thickness T7 may be less, providing a decreased distance between inner recesses 1022 and outer recesses 1020, a decreased distance between inner recesses 1022 and outer surface 1008, or a decreased distance between outer recesses 1020 and inner surface 1010.

In addition, in different embodiments, one aperture may differ in size, shape, geometry, depth, height, or other characteristics from an adjacent aperture, or from an aperture located elsewhere along a surface of outsole 1006. In some embodiments, an inner recess may differ from an adjacent inner recess, or from an inner recess disposed elsewhere along inner surface 1010 of outsole 1006. In other embodiments, an outer recess may differ from an adjacent outer recess, or from an outer recess disposed elsewhere along outer surface 1008 of outsole 1006. For example, referring to FIG. 53, in some embodiments, third thickness T3 may be greater than or less than fifth thickness T5. In other embodiments, fourth thickness T4 may be greater than or less than sixth thickness T6. In some embodiments, second inner recess 1406 may comprise an irregular shape, while fourth inner recess 1410 may comprise a four-pointed star shaped auxetic structure. In another embodiment, for example, second outer recess 1402 may comprise a circular hole, while third outer recess 1404 may comprise a hexagonal auxetic structure.

In order to modify the degree of flexibility of sole structure 1102, there can be variations in first thickness T1 and second thickness T2, as well as third thickness T3, fourth thickness T4, fifth thickness T5, sixth thickness T6, and/or seventh thickness T7 of interior region 1300 as depicted in FIGS. 51 and 53. For example, in some embodiments, greater flexibility may be achieved by decreasing first thickness T1, second thickness T2, third thickness T3, fourth thickness T4, fifth thickness T5, sixth thickness T6 and/or seventh thickness T7. In other embodiments, flexibility may be limited or decreased by increasing first thickness T1, second thickness T2, third thickness T3, fourth thickness T4, fifth thickness T5, sixth thickness T6 and/or seventh thickness T7. Thus, in some embodiments, apertures may be formed on opposing sides of the outsole to allow for variation in flexibility, where areas of the outsole that are thinnest in thickness may have greater stretch than areas of interior region 1300 with greater thickness.

In different embodiments, further flexibility may be provided by minimizing the thickness of interior region 1300 so that inner recesses 1022 and outer recesses 1020 may be substantially joined, forming a through-hole aperture. Referring to FIG. 54, a portion of an outsole 1500 with an aperture 1502 is depicted. Outsole 1500 has an eighth thickness T8 extending from outer surface 1008 to inner surface 1010. Aperture 1502 is a through-hole aperture that includes a fifth inner recess 1504 and a fourth outer recess 1506 in fluid communication. In other words, in some embodiments, the compartments of one or more inner recesses and corresponding outer recesses may be connected so that there is a continuous space formed from outer surface 1008 to inner surface 1010 of outsole 1500. This may form a chamber 1508 within outsole 1500. In the example of FIG. 54, fifth inner recess 1504 has a third depth D3, and fourth outer recess 1506 has a third height H3. Together, third depth D3 and third height H3 provide a ninth thickness T9 that is substantially equivalent to eighth thickness T8. By forming aperture holes that extend the full thickness of outsole 1500, a fuller flexibility may be achieved in sole structure 1002.

It can be seen in FIG. 54 that the shape of chamber 1508 is irregular. The region toward inner surface 1010 is relatively more narrow than the region that lies toward outer surface 1008. In other embodiments, the shape of chamber 1508 may be more regular. In cases where fifth inner recess 1504 and fourth outer recess 1506 are substantially similar, chamber 1508 may be generally uniform throughout. In other embodiments, depending on the geometry of the apertures, a first opening 1510 associated with outer recesses and a second opening 1512 associated with inner recesses may be substantially similar, such that first opening 1510 of chamber 1508 and second opening 1512 are generally uniform. In other embodiments, first opening 1510 and second opening 1512 may differ, such that chamber 1508 also has an non-uniform volume, or an irregular shape.

In different embodiments, the auxetic structures comprising apertures may vary. In some embodiments, apertures may provide one or more portions of the outsole the ability to expand in both the direction of an applied tension and a direction perpendicular to the direction of an applied tension. FIGS. 55 and 56 depict embodiments of one type of expansion possible. In FIG. 55, a portion of outsole 1600 is shown, with an inner surface 1608 facing the viewer, and including a first inner recess 1602. A dotted line represents a first outer recess 1606 disposed on the opposite side, along the outer surface.

When a tension is applied to portion of outsole 1600, first inner recess 1602 may expand in some embodiments, increasing in area in the horizontal direction to a second size depicted as expanded first inner recess 1702 in FIG. 56. In another embodiment, portion of outsole 1600 may also expand, as seen in the relative change in size between FIGS. 55 and 56. In other embodiments, first inner recess 1602 and/or portion of outsole 1600 may expand to a lesser or greater degree. In some embodiments, first inner recess 1602 may expand to a greater or lesser degree than adjacent inner recesses, or inner recesses located in other areas of the outsole.

In other embodiments, first inner recess 1602 may expand to a greater or lesser degree than a corresponding outer recess, for example, a first outer recess 1604 shown in FIG. 55. When a tension is applied to portion of outsole 1600, first outer recess 1604 may expand in some embodiments, increasing in area in the horizontal direction to a second size depicted in a dotted line as an expanded first outer recess 1704 in FIG. 56. In other embodiments, first outer recess 1604 and/or portion of outsole 1600 may expand to a lesser or greater degree. In some embodiments, first outer recess 1604 may expand to a greater or lesser degree than adjacent outer recesses or outer recesses located in other areas of the outsole. In other embodiments, first outer recess 1604 may expand to a greater or lesser degree than a corresponding inner recess, for example, first inner recess 1602 shown in FIG. 55.

As described earlier, apertures 1018 may in some embodiments include hinge-like portions, or hinges, related to the type of shape or geometry selected for apertures 1018. In FIGS. 55 and 56, the outer recess includes a first hinge portion 1610, a second hinge portion 1612, a third hinge portion 1614, a fourth hinge portion 1616, a fifth hinge portion 1618, and a sixth hinge portion 1620. Hinge portions are comprised of a relatively small portion of material adjacent to the vertices of each aperture. Hinge portions may rotate with respect to one another. Thus, during expansion, each of the vertices of apertures 1018 are associated with hinge portions that move in a rotatable manner. In one embodiment, inner recesses 1022 may also include one or more hinge portions. In other embodiments, outer recesses 1020 and/or inner recesses 1022 may not include a hinge portion.

In different embodiments, the outsole may include different types, shapes, sizes, and geometries of apertures. For example, in some embodiments, an outsole may include a variety of apertures. In one embodiment, one or more inner recesses and outer recesses may be joined so that they are in fluid communication with one another in the outsole. In one embodiment, an outsole may include an inner recess and an outer recess that together form a single compartment, as described with respect to FIG. 54. In another embodiment, the outsole may include one or more inner recesses that are separate from any outer recesses.

Figure 57:
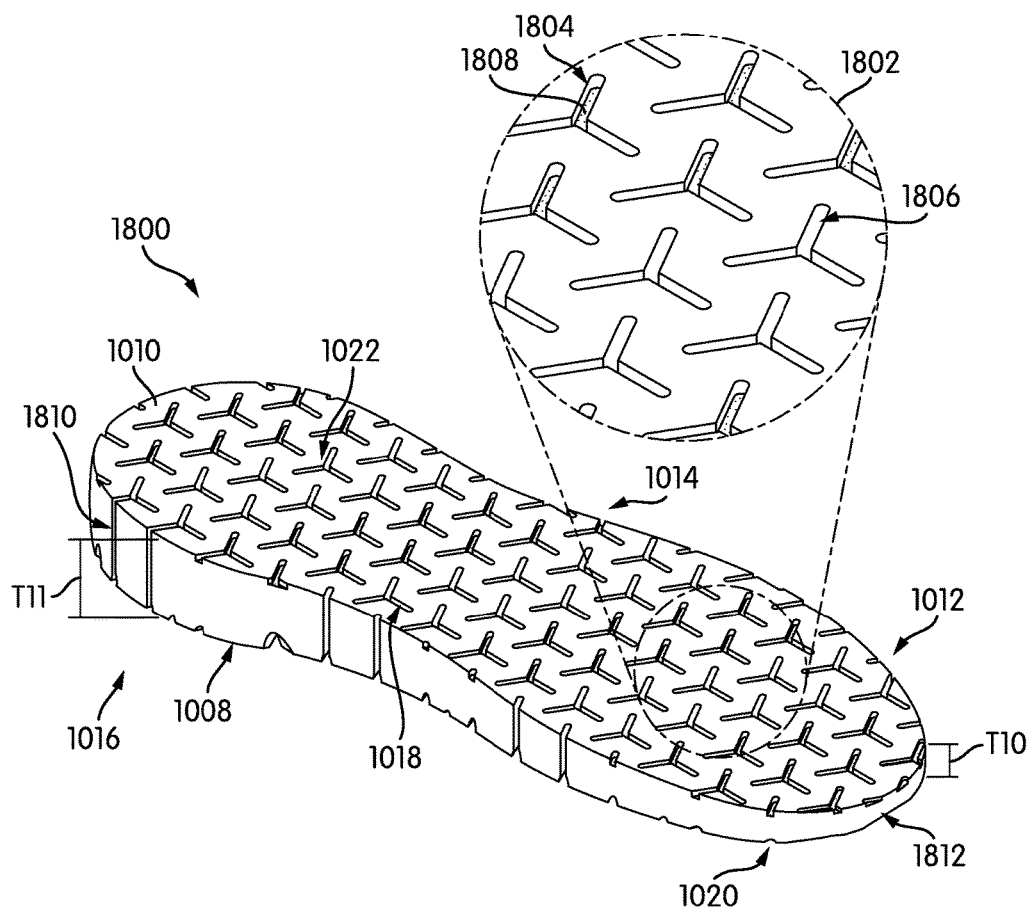
FIG. 57 is an isometric view of an embodiment of an outsole with a plurality of apertures.

In FIG. 57, a first zone 1802 in forefoot region 1012 in one possible embodiment of an outsole 1800 has been magnified to illustrate possible variations in apertures 1018. First zone 1802 includes a plurality of inner recesses 1022. First zone 1802 includes a first inner recess 1804 and a second inner recess 1806. It can be seen that first inner recess 1804 has a closed interior surface, providing access to a third interior surface 1808 along the interior region of outsole 1800. Nearby second inner recess 1806 also provides access to the interior region of outsole 1800, but leads through the full thickness of outsole 1800, and joins with an outer recess to form a single compartment as a through-hole aperture. In other words, second inner recess 1806 is in fluid communication with a corresponding outer recess. Second inner recess 1806 may be described as part of an aperture that extends from inner surface 1010 side to outer surface 1008 side.

In some embodiments, apertures 1018 may extend from inner surface 1010 side to outer surface 1008 side along a perimeter 1812 of outsole 1800. A first aperture 1810 disposed along perimeter 1812 of outsole 1800 may be seen in heel region 1016. First aperture 1810 may include a partially formed or incomplete hole through outsole 1800, as one or more portions of the aperture walls are missing along perimeter 1812.

In different embodiments, outsole 1800 may vary in thickness. In some embodiments, outsole 1800 may have substantially the same thickness throughout outsole 1800. In other embodiments, outsole 1800 may have a first thickness in one region, and a second thickness in another region. In the embodiment of FIG. 57, forefoot region 1012 has a first outsole thickness T10, and heel region has a second outsole thickness T11. In FIG. 57, tenth thickness T10 is thinner than eleventh thickness T11. In other embodiments, tenth thickness T10 may be greater than or equal to eleventh thickness T11. In another embodiment, midfoot region 1014 or other regions of outsole 1800 may also have varying thicknesses. As discussed earlier, the thickness of outsole 1800 may provide variation in bendability of sole structure 1002, and allow a user greater flexibility to specific areas of the foot.

In addition, a greater thickness can permit an increased depth to any inner recesses 1022 and/or height of outer recesses 1020. It should be noted that the depths of any inner recesses and/or the heights of any outer recesses may vary throughout the outsole in different embodiments.

Figure 58:
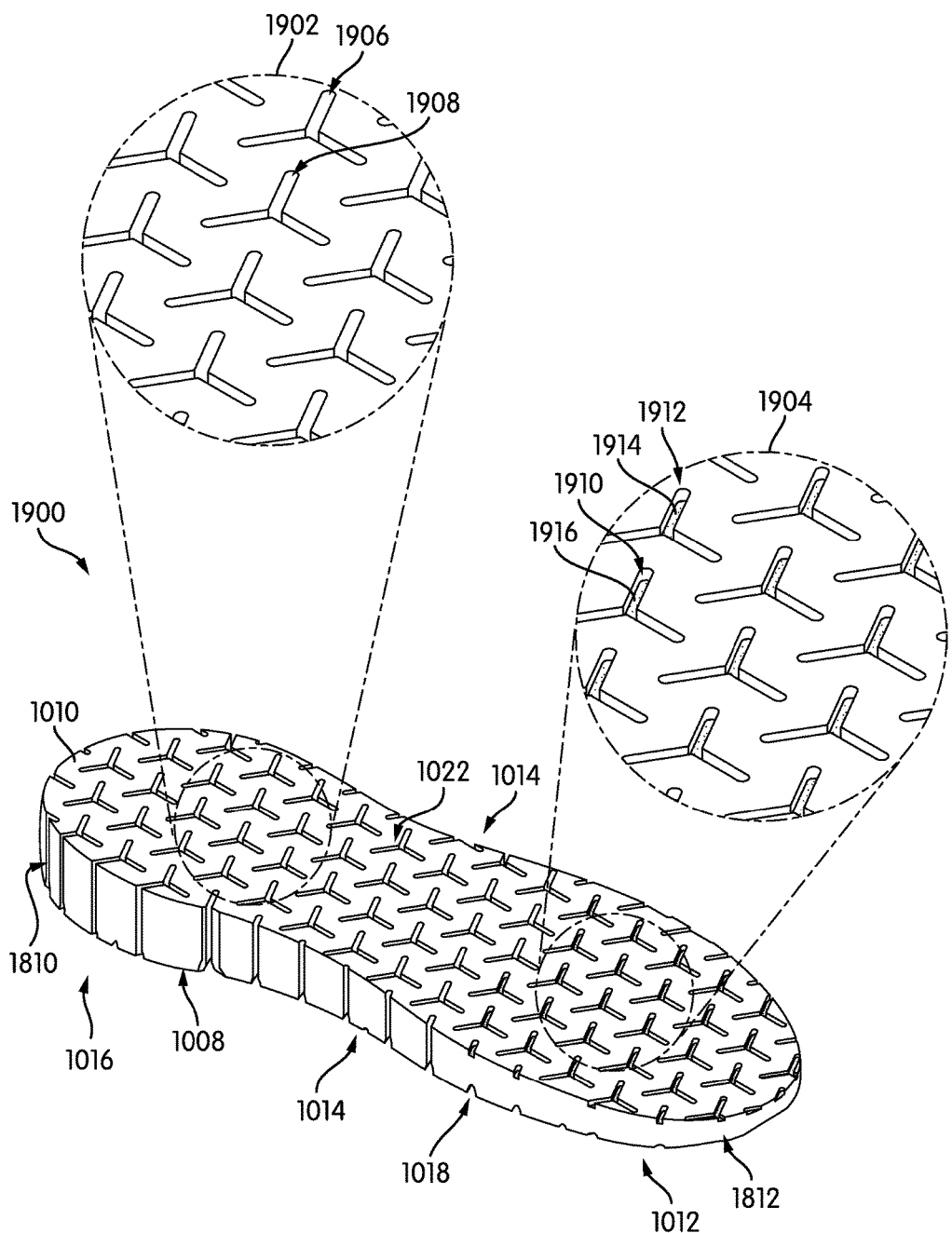
FIG. 58 is an isometric view of an embodiment of an outsole with a plurality of apertures.

In FIG. 58, a second zone 1902 in heel region 1016 and a third zone 1904 in forefoot region 1012 in an embodiment of outsole 1900 have been magnified to illustrate another possible variation of apertures 1018. Second zone 1902 and third zone 1904 each include a plurality of inner recesses 1022. Second zone 1902 includes a third inner recess 1906 and a fourth inner recess 1908. It can be seen that third inner recess 1906 and fourth inner recess 1908 each provide access to the interior region of outsole 1900, and extend through the full thickness of outsole 1900, joining with an outer recess to form a single compartment. Both third inner recess 1906 and fourth inner recess 1908 form through-hole apertures that extend from inner surface 1010 side to outer surface 1008 side. In other words, third inner recess 1906 and fourth inner recess 1908 are in fluid communication with a corresponding outer recess.

Third zone 1904 includes a fifth inner recess 1910 and a sixth inner recess 1912. Both fifth inner recess 1910 and sixth inner recess 1912 have a closed interior surface. Fifth inner recess 1910 provides access to a fourth interior surface 1914, and sixth inner recess 1912 provides access to a fifth interior surface 1916 along the interior region of outsole 1900.

Figure 59:
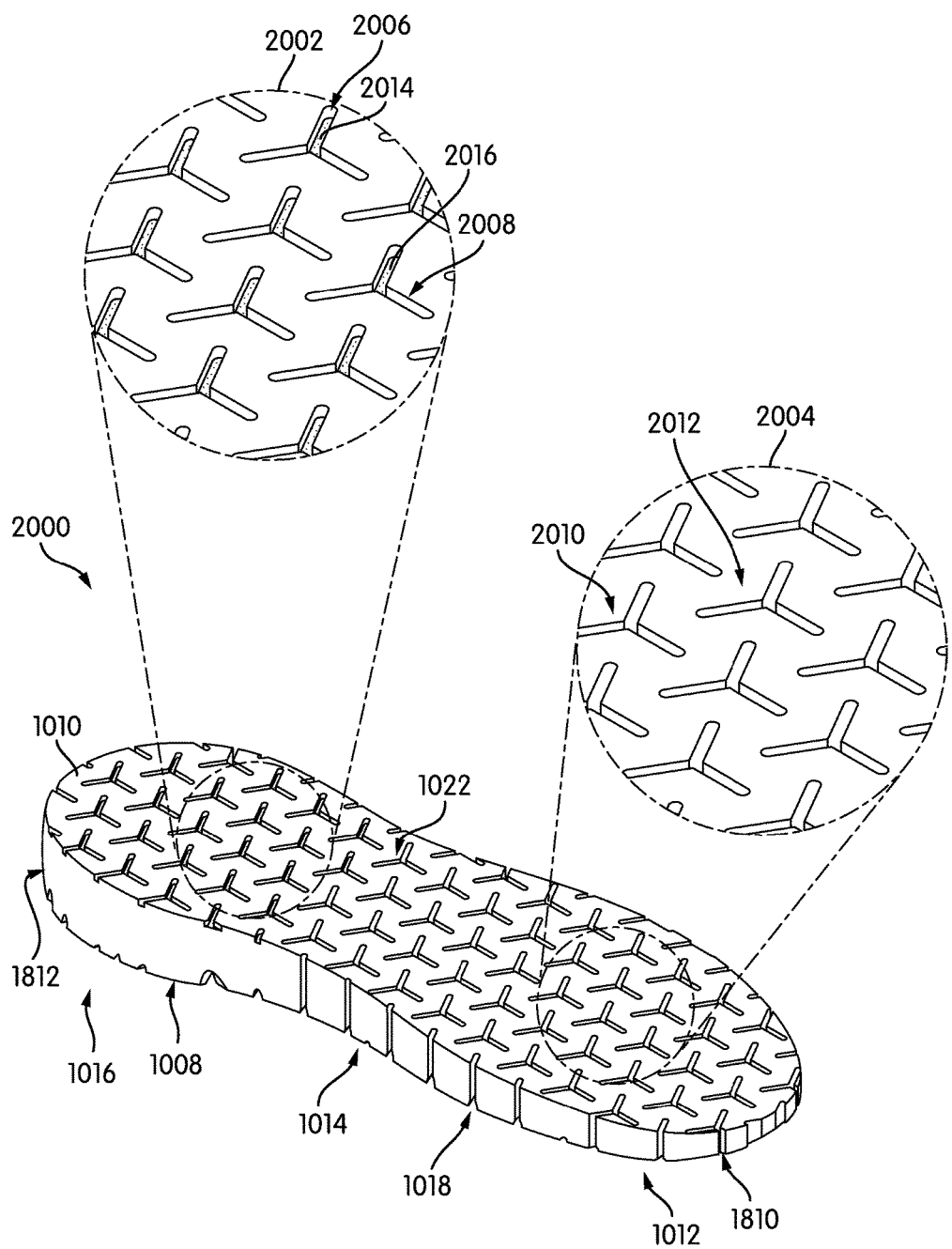
FIG. 59 is an isometric view of an embodiment of an outsole with a plurality of apertures.

In FIG. 59, a fourth zone 2002 in heel region 1016 and a fifth zone 2004 in forefoot region 1012 in an embodiment of outsole 2000 have been magnified to illustrate another possible variation of apertures 1018. Fourth zone 2002 and fifth zone 2004 each include a plurality of inner recesses 1022. Fourth zone 2002 includes a seventh inner recess 2006 and an eighth inner recess 2008. It can be seen that seventh inner recess 2006 and eighth inner recess 2008 each have a closed interior surface. Seventh inner recess 2006 provides access to a sixth interior surface 2014, and eighth inner recess 2008 provides access to a seventh interior surface 2016 along the interior region of outsole 2000.

Fifth zone 2004 includes a ninth inner recess 2010 and a tenth inner recess 2012. Both ninth inner recess 2010 and tenth inner recess 2012 provide access to the interior region of outsole 2000, and extend through the full thickness of outsole 2000, joining with an outer recess to form a single compartment. Ninth inner recess 2010 and tenth inner recess 2012 form through-hole apertures that extend from inner surface 1010 side to outer surface 1008 side. In other words, ninth inner recess 2010 and tenth inner recess 2012 are each in fluid communication with a corresponding outer recess.

Figure 60:
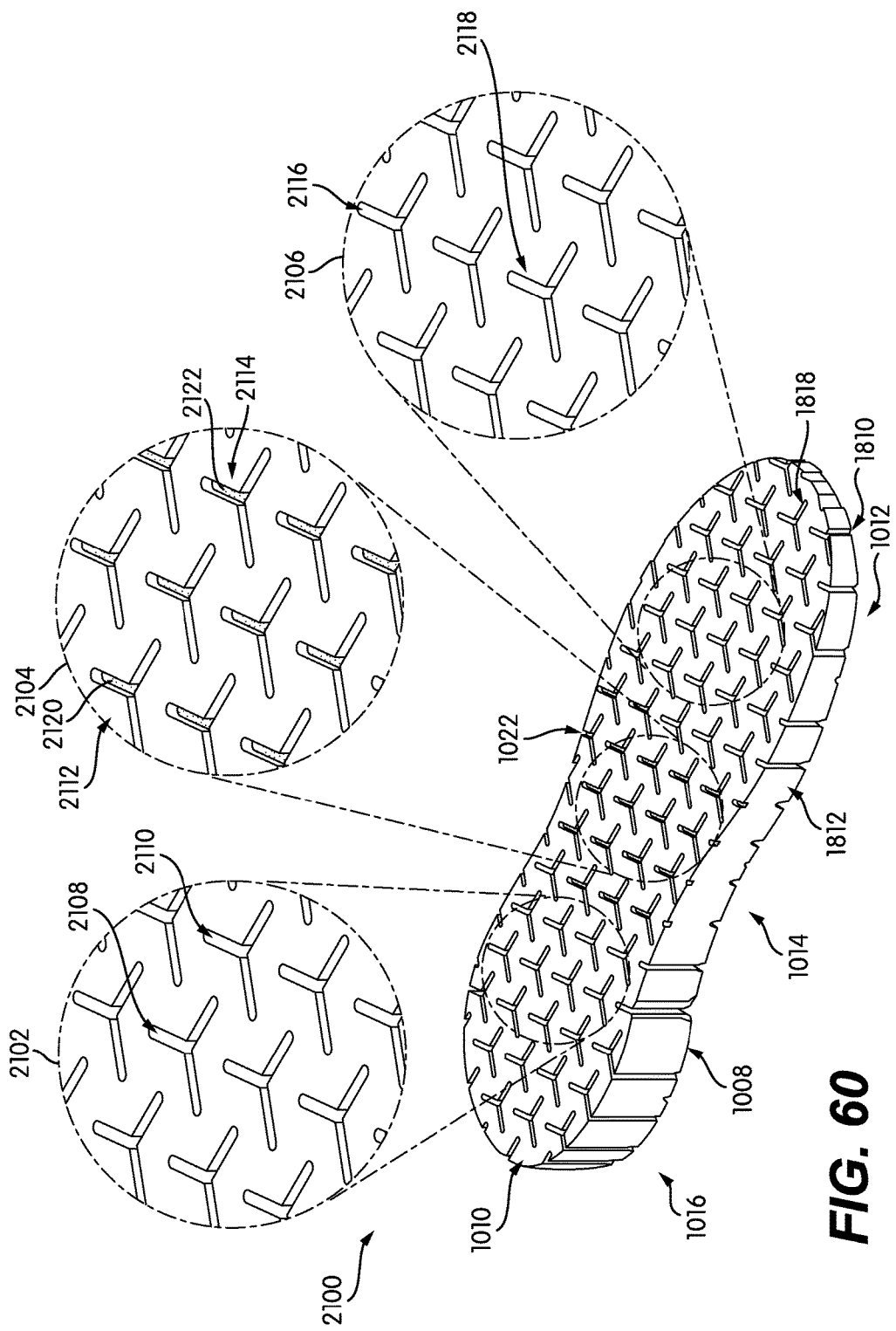
FIG. 60 is an isometric view of an embodiment of an outsole with a plurality of apertures.

In FIG. 60, a sixth zone 2102 in heel region 1016, a seventh zone 2104 in midfoot region 1014, and an eighth zone 2106 in forefoot region 1012 are depicted in an embodiment of outsole 2100. Sixth zone 2102, seventh zone 2104, and eighth zone 2106 have been magnified to illustrate a further variation of apertures 1018. Sixth zone 2102, seventh zone 2104, and eighth zone 2106 each include a plurality of inner recesses 1022. Sixth zone 2102 includes an eleventh inner recess 2108 and a twelfth inner recess 2110. Eighth zone 2106 includes a thirteenth inner recess 2116 and a fourteenth inner recess 2118. It can be seen that eleventh inner recess 2108, twelfth inner recess 2110, thirteenth inner recess 2116, and fourteenth inner recess 2118 each provide access to the interior region of outsole 2100, and extend through the full thickness of outsole 2100, joining with an outer recess to form a single compartment. Eleventh inner recess 2108, twelfth inner recess 2110, thirteenth inner recess 2116, and fourteenth inner recess 2118 may be described as forming through-hole apertures that extend from inner surface 1010 side to outer surface 1008 side. In other words, eleventh inner recess 2108, twelfth inner recess 2110, thirteenth inner recess 2116, and fourteenth inner recess 2118 are in fluid communication with a corresponding outer recess.

Seventh zone 2104 includes a fifteenth inner recess 2112 and a sixteenth inner recess 2114. Both fifteenth inner recess 2112 and sixteenth inner recess 2114 have a closed interior surface. Fifteenth inner recess 2112 provides access to an eighth interior surface 2120, and sixteenth inner recess 2114 provides access to a ninth interior surface 2122 along the interior region of outsole 2100.

Figure 61:
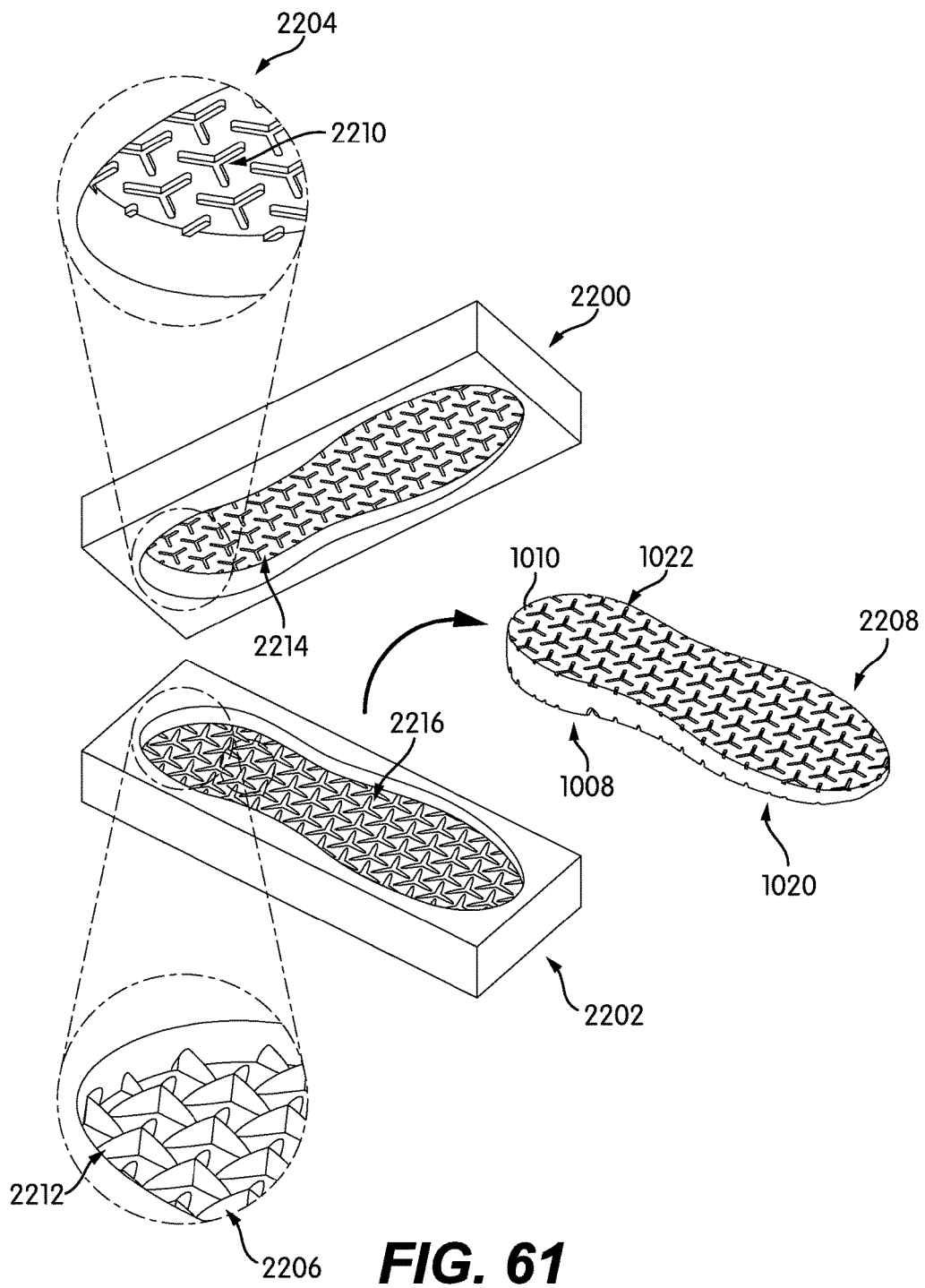
FIG. 61 is a schematic view of an embodiment of a method of making an outsole.

In different embodiments, sole structure 1002 may be manufactured in various ways. FIG. 61 is a schematic diagram of a possible embodiment of one aspect of a manufacturing system used to create an outsole 2208. A first mold 2200 is disposed above and adjacent to a second mold 2202. A molding press or other means of securing first mold 2200 and second mold 2202 may be used in some embodiments.

In some embodiments, first mold 2200 may include a first pattern 2204, and second mold 2202 may include a second pattern 2206. In some embodiments, first pattern 2204 may include a series of one or more first projections 2210, and second pattern 2206 may include a series of one or more second projections 2212. In one embodiment, first pattern 2204 may be substantially similar to second pattern 2206. In other embodiments, first pattern 2204 may differ from second pattern 2206.

In some embodiments, first projections 2210 and second projections 2212 may be substantially solid. In other embodiments, first projections and second projections may be raised surfaces disposed along first mold 2200 and second mold 2202. First projections 2210 and second projections 2212 may be of any shape, size, or geometry. In some embodiments, first projections 2210 and second projections 2212 may encompass one or more characteristics, functions, features, shapes, qualities and/or other aspects described with regard to apertures 131, apertures 321, apertures 421, apertures 521, apertures 621, apertures 721, apertures 830, apertures 920, and/or apertures 1018, as well as inner recesses 1022 and outer recesses 1020.

In different embodiments, first projections 2210 and second projections 2212 may differ. In some embodiments, first projections 2210 and second projections 2212 may comprise a generally three-pointed star shape. In one embodiment, first projections 2210 may have a shape and size substantially similar to the shapes and sizes associated with inner recesses 1022. In another embodiment, second projections 2212 may have a shape and size substantially similar to the shapes and sizes associated with outer recesses 1020.

In some embodiments, first mold 2200 and second mold 2202 may be joined to form an encasing body. The distance between first mold 2200 and second mold 2202 can be varied. An outsole material may be introduced, inserted or injected into the gap between the two molds before first mold 2200 and second mold 2202 are joined, or after they are joined. In general, outsole material may be any type of material used in manufacturing outsoles. In some embodiments, one or more portions of the outsole material may comprise material suited to forming auxetic structures or providing auxetic properties.

In another embodiment, first mold 2200 may be applied onto outsole material independently of the application of second mold 2202. In other words, each mold may form impressions on outsole material at different points in time. Thus, first mold 2200 may have outsole material added or introduced before or after second mold 2202 has had outsole material added or introduced.

In different embodiments, after first mold 2200 and second mold 2202 have formed an impression in the outsole material, the outsole material, now comprising outsole 2208, may be removed from first mold 2200 and second mold 2202.

In some embodiments, individual molds including various arrangements of inner recesses 1022 and outer recesses 1020 may be made. In other embodiments, one or more molds including a standard series of projections may be made. In some embodiments, to modify degrees of flexibility, after molding, some locations in outsole 2208 may be cut or removed or otherwise altered to form deeper inner recesses 1022 and/or outer recesses 1020, or through-hole apertures that extend through the full thickness of outsole 2208.

Figure 62:
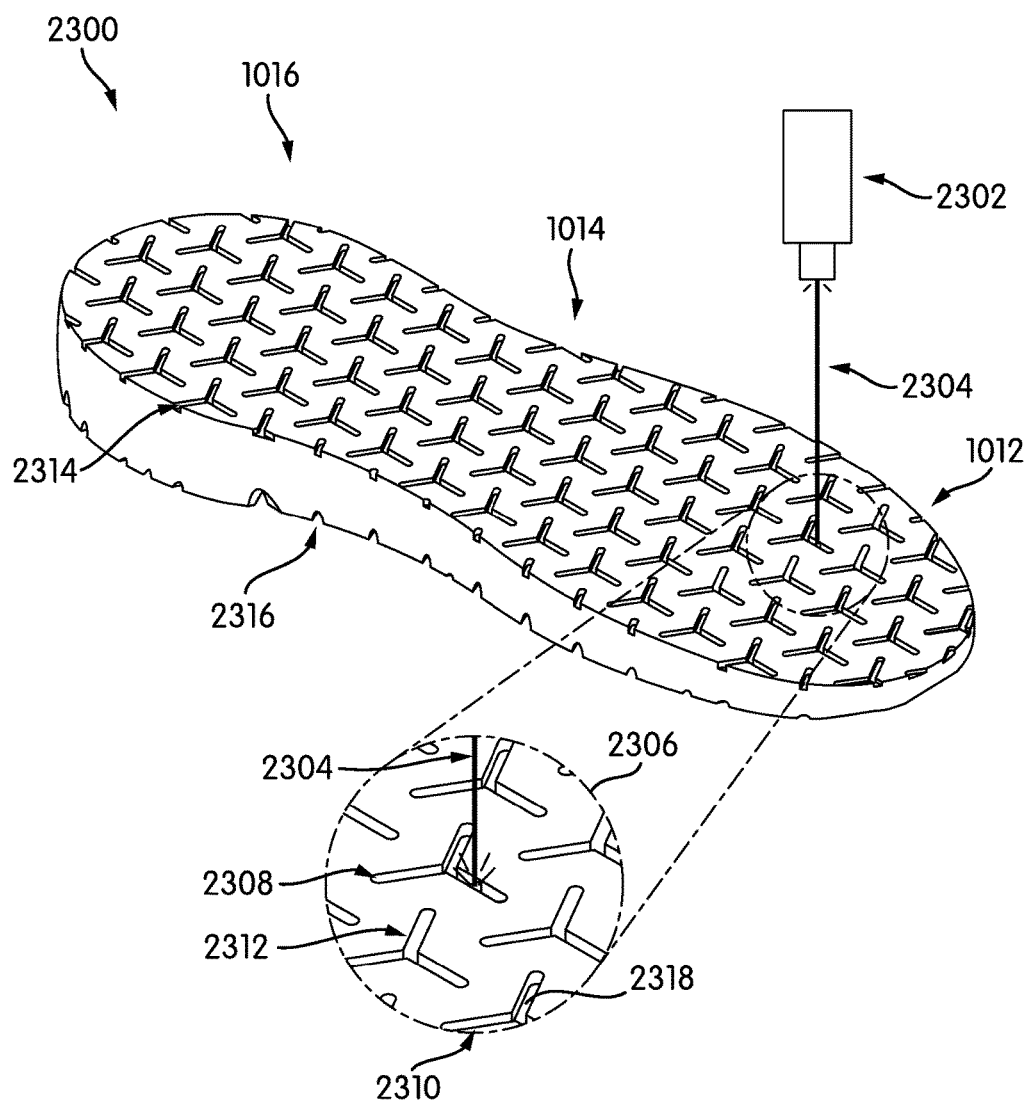
FIG. 62 is an isometric view of an embodiment of a method of adjusting apertures in an outsole.

In FIG. 62, an embodiment of a method is depicted for forming customized apertures after an initial mold of outsole 2300 has been made. An emitting device 2302 may be disposed above, near, or below outsole 2300. Outsole 2300 has pre-formed inner recesses 2314, depicted by dotted lines in FIG. 62, as well as pre-formed outer recesses 2316. Emitting device 2302 produces a laser 2304 that may cut or remove portions of outsole material. Emitting device 2302 may move over outsole 2300, or outsole may move relative to emitting device 2302, or both may move. In a magnified area 2306 of outsole 2300, laser 2304 can be seen cutting into a seventeenth inner recess 2308. Seventeenth inner recess 2308 may be made deeper than standard inner recesses 2314. In one embodiment, seventeenth inner recess 2308 may be cut or otherwise affected by laser 2304 so that it is joined to a corresponding outer recess, forming a through-hole aperture.

In some embodiments, one or more pre-formed inner recesses 2314 and/or pre-formed outer recesses 2316 may be modified by laser 2304. In magnified area 2306, an eighteenth inner recess 2310 and a nineteenth inner recess 2312 are included. Laser 2304 has modified nineteenth inner recess 2312 so that it is now in fluid communication with a corresponding outer recess. In other words, laser 2304 has formed a through-hole aperture. Eighteenth inner recess 2310 has not been modified by laser 2304, and remains closed as a blind hole, with a tenth interior surface 2318 visible.

In other embodiments, other means of customizing, adjusting or altering inner recesses 1022 and/or outer recesses 1020 may be used. In some embodiments a hot-knife process may be applied.

Figure 63:
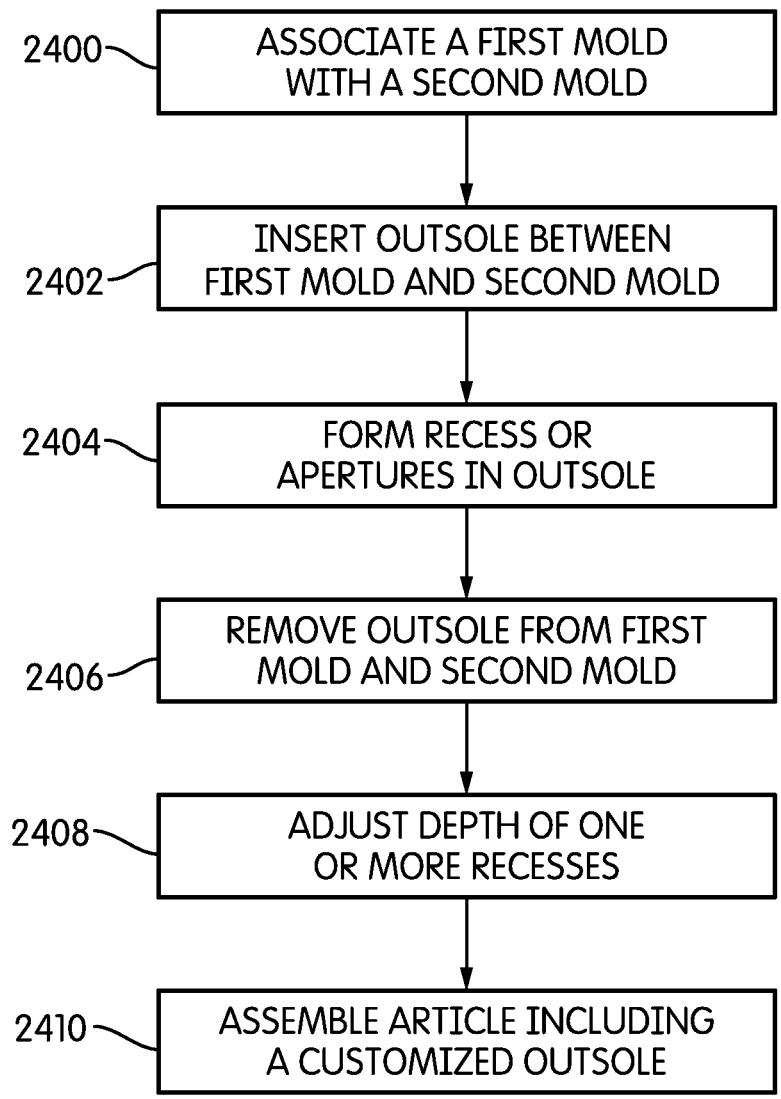
FIG. 63 is a flow chart depicting an embodiment of a method of making an outsole.

The following description discusses the details of the steps outlined and briefly described with reference to FIG. 63. Generally, the steps associated with the method shown in FIG. 63 can be performed by one or more operators/users at a manufacturing facility, retail location or other facility. It will be understood that some of the following steps could be omitted in some embodiments. In still other embodiments, additional steps not discussed here could be included. Moreover, the embodiments are not limited to a particular ordering of steps and so in some cases the ordering of two or more steps in the following method could be changed.

In different embodiments, one or more molds may be used. The method of forming outsole 2208 with auxetic structures may include a first step 2400 of associating a first mold 2200 with a second mold 2202. A second step 2402 may include inserting an outsole material in the gap between the first mold 2200 and second mold 2202. In a third step 2404, recesses and/or apertures may be formed in outsole 2208 during the molding process that forms outsole 2208. Next, in a fourth step 2406, outsole 2208 may be removed from first mold 2200 and second mold 2202. In a fifth step 2408, portions of outsole material in outsole 2208 could be adjusted, cut or removed from one or more inner recesses 1022 and/or outer recesses 1020. This may create a new pattern for the outsole (e.g., outsole 2300). Cutting through the sole or otherwise adjusting the depths of apertures in specific locations may create an engineered sole with different degrees of flexibility in different locations in some embodiments.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A method of customizing a sole structure of an article of footwear, the method comprising:
    adjusting the flexibility of a sole component of the sole structure, the sole component having an inner surface and an opposite-facing outer surface;
        wherein the sole component includes a plurality of inner recesses extending from the inner surface and a plurality of outer recesses extending from the outer surface, the plurality of inner recesses including a blind-hole inner recess, the plurality of outer recesses including a blind-hole outer recess, and wherein the blind-hole inner recess is generally aligned with the blind hole outer recess along a vertical direction;
        wherein the plurality of inner recesses and the plurality of outer recesses are arranged to provide the sole component with an auxetic property; and
    wherein adjusting the flexibility of the sole component includes selectively cutting or removing material from one or both of the blind-hole inner recess and the blind-hole outer recess.

2. The method of claim 1, wherein selectively cutting or removing material from one or both of the blind-hole inner recess and the blind-hole outer recess includes increasing the depth of one or both of the blind-hole inner recess and the blind-hole outer recess.

3. The method of claim 1, wherein selectively cutting or removing material from one or both of the blind-hole inner recess and the blind-hole outer recess fluidly couples the blind-hole inner recess and the blind-hole outer recess.

4. The method of claim 3, wherein fluidly coupling the blind-hole inner recess and the blind-hole outer recess forms a through-hole aperture that is open through both the inner surface and the outer surface of the sole component.

5. The method of claim 1, wherein selectively cutting or removing material includes applying laser energy to the sole component.

6. The method of claim 1, wherein selectively cutting or removing material includes contacting the sole component with a hot-knife.

7. The method of claim 1, wherein the blind-hole inner recess is spaced apart from the blind-hole outer recess by an interior region of the sole component, the interior region having a thickness that extends in the vertical direction between a first interior surface associated with the inner recess and a second interior surface associated with the outer recess; and wherein selectively cutting or removing material includes decreasing the thickness of the interior region.

8. The method of claim 1, wherein providing the sole structure includes forming the sole structure having the plurality of inner recesses and the plurality of outer recesses via molding the sole component.

9. The method of claim 8, wherein molding the sole component includes:

selecting a first mold, wherein the first mold includes one or more first projections for forming the plurality of inner recesses, each having a first depth;

selecting a second mold, wherein the second mold includes one or more second projections for forming the plurality of outer recesses, each having a second depth;

associating the first projections of the first mold with the inner side of the sole component;

wherein the heights of the first projections are less than a thickness of the portion of the sole component they are associated with;

forming a first pattern of the inner recesses on the inner side of the sole component;

associating the second projections of the second mold with the outer side of the sole component;

wherein the height of the second projections are less than the thickness of the portion of the sole component they are associated with;

forming a second pattern of the outer recesses on the outer side of the sole component;

removing the first mold from the sole component; and removing the second mold from the sole component.

10. The method of claim 1, wherein the blind-hole inner recess is three-pointed star-shaped with at least three inner arms, and the blind-hole outer recess is three-pointed star-shaped with at least three outer arms; and wherein selectively cutting or removing material from one or both of the blind-hole inner recess and the blind-hole outer recess includes cutting or removing material from each of the three inner arms and/or each of the three outer arms.

11. The method of claim 1, wherein the blind-hole inner recess is a first blind-hole inner recess and the blind-hole outer recess is a first blind-hole outer recess;

wherein the plurality of inner recesses further includes a second blind-hole inner recess, the plurality of outer recesses further includes a second blind-hole outer recess, and wherein the second blind-hole inner recess is generally aligned with the second blind hole outer recess along a vertical direction; and wherein adjusting the flexibility of the sole component further includes selectively cutting or removing material from one or both of the second blind-hole inner recess and the second blind-hole outer recess.

12. The method of claim 11, wherein the flexibility of the sole component is adjusted differently proximate the first blind-hole inner recess than proximate the second blind-hole inner recess.

\* \* \* \* \*